United States Patent
Carpenter et al.

(10) Patent No.: US 9,189,558 B2
(45) Date of Patent: Nov. 17, 2015

(54) MULTI-PREFIX QUERY OPTIMIZATIONS

(71) Applicant: Tropare, Inc., Laguna Beach, CA (US)

(72) Inventors: G. Gregory Carpenter, Laguna Beach, CA (US); Timothy L. Kay, Los Altos Hills, CA (US)

(73) Assignee: TROPARE, INC., Laguna Beach, CA (US)

( * ) Notice: Subject to any disclaimer, the term of this patent is extended or adjusted under 35 U.S.C. 154(b) by 0 days.

(21) Appl. No.: 14/310,520

(22) Filed: Jun. 20, 2014

(65) Prior Publication Data
US 2014/0304259 A1   Oct. 9, 2014

Related U.S. Application Data

(63) Continuation of application No. 13/563,676, filed on Jul. 31, 2012, now Pat. No. 8,788,518, which is a continuation of application No. 12/620,195, filed on Nov. 17, 2009, now Pat. No. 8,255,411, and a continuation-in-part of application No. 12/142,725, filed on Jun. 19, 2008, now Pat. No. 8,255,382.

(60) Provisional application No. 61/115,665, filed on Nov. 18, 2008, provisional application No. 61/247,440, filed on Sep. 30, 2009, provisional application No. 61/149,281, filed on Feb. 2, 2009.

(51) Int. Cl.
*G06F 17/30* (2006.01)
*G06F 3/0482* (2013.01)

(52) U.S. Cl.
CPC .......... *G06F 17/3087* (2013.01); *G06F 3/0482* (2013.01); *G06F 17/3064* (2013.01); *G06F 17/30424* (2013.01); *G06F 17/30554* (2013.01)

(58) Field of Classification Search
CPC .................................................... G06F 17/3064
USPC .......................................................... 707/724
See application file for complete search history.

(56) References Cited

U.S. PATENT DOCUMENTS

2004/0199491 A1* 10/2004 Bhatt ................................ 707/2
2006/0101503 A1* 5/2006 Venkataraman et al. ..... 725/136

* cited by examiner

Primary Examiner — Belix M Ortiz Ditren
(74) Attorney, Agent, or Firm — Brainspark Associates, LLC

(57) ABSTRACT

The present invention includes systems and methods for retrieving information via a flexible and consistent targeted search model that employs interactive multi-prefix, multi-tier and dynamic menu information retrieval techniques that provide context-specific functionality tailored to particular information channels, as well as to records within or across such channels, and other known state information. Users are presented with a consistent search interface among multiple tiers across and within a large domain of information sources, and need not learn different or special search syntax. A thin-client server-controlled architecture enables users of resource-constrained mobile communications devices to locate targeted information more quickly by entering fewer keystrokes and performing fewer query iterations and web page refreshes, which in turn reduces required network bandwidth.

7 Claims, 43 Drawing Sheets

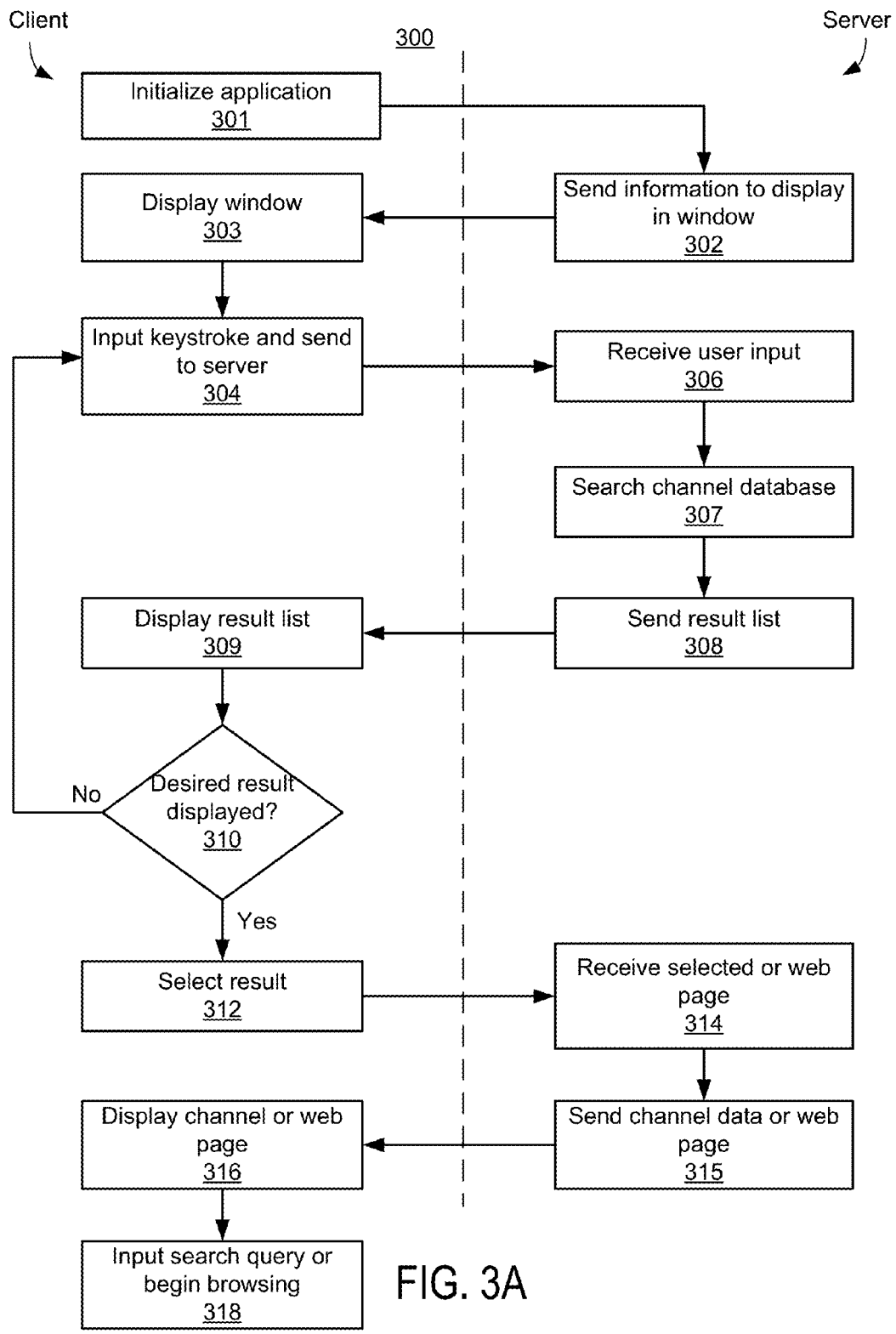

MULTI-PREFIX QUERY OPTIMIZATIONS

CROSS REFERENCE TO RELATED APPLICATIONS

This application is a continuation of U.S. patent application Ser. No. 13/563,676 filed Jul. 31, 2012, entitled "Multi-Prefix Query Optimizations," which in turn claims the benefit (pursuant to 35 U.S.C. §119(e) for provisional patent applications and 35 U.S.C. §120 for non-provisional patent applications) of (i) U.S. patent application Ser. No. 12/620,195 filed Nov. 17, 2009, entitled "Dynamic Menus for Multi-Prefix Interactive Mobile Searches" and issued as U.S. Pat. No. 8,255,411 on Aug. 28, 2012; (ii) U.S. patent application Ser. No. 12/142,725 filed Jun. 19, 2008, entitled "Dynamic Menus for Multi-Prefix Interactive Mobile Searches" and issued as U.S. Pat. No. 8,255,382 on Aug. 28, 2012; (iii) U.S. Provisional Patent Application No. 61/115,665 filed Nov. 18, 2008, entitled "Smart Prefix Query Optimization," (iv) U.S. Provisional Patent Application No. 61/149,281, filed Feb. 2, 2009, entitled "Smart Prefix Query Optimization," and (v) U.S. Provisional Patent Application No. 61/247,440, filed Sep. 30, 2009, entitled "Building and Sharing Apps Using Collaborative Services," each of which is hereby incorporated by reference in its entirety.

BACKGROUND

1. Field of Art

This application relates generally to the field of information retrieval and, in particular, to multi-prefix, multi-tier, dynamic menu and related interactive search techniques that facilitate the retrieval of information within a mobile communications environment.

2. Description of Related Art

In the last few years, web-enabled mobile telephones have become enormously popular. More web-enabled mobile phones ship each year than do desktop and notebook computers combined. Such mobile phones are similar to desktop and mobile computers in that they offer display screens, a keyboard, and, sometimes, a pointing device. However, because of portability requirements, the capabilities of the displays, keyboards, and pointers on mobile phones are significantly reduced. Displays are relatively small with little area to display content as well as menus, toolbars, and other navigation and status information. The keyboards are often telephone keypads or thumb keyboards. The pointer, when provided, is often a scroll wheel or joystick that can be used to indicate a direction of movement or pressed to indicate a click. Sometimes, the pointer is simply a set of arrow keys on the keyboard. Furthermore, because of speed and latency issues, navigation among web pages is typically much slower on mobile phones than on desktop and notebook computers.

The human interface limitations of mobile phones, combined with slower navigation, significantly constrain a user's ability to interact with web pages. Additionally, Hypertext Markup Language (HTML) forms are difficult to use on mobile phones due to data input and related limitations. These difficulties arise in many ways. For example, the mobile keyboard and pointer are less effective than their counterparts on desktop and personal computers.

Keyboards are less effective because their small form factor makes it more difficult to type characters. In some case, the keyboard is smaller and has fewer keys. The smaller keyboards usually require thumbing: typing with one's thumbs rather than using ten fingers. The reduction in keys makes it more difficult to key in digits and special characters. Some keyboards are telephone dial pads with multiple letters on each key. Various technologies, including triple tap (pressing the same key until the desired letter appears) and predictive text, help to improve the effectiveness of such keyboards, but the effectiveness is still far below that of a full-size keyboard.

The pointer is also less effective. HTML forms often contain multiple input fields and the pointer is used to navigate among them. Pointers on mobile phones, when available, are less effective than pointers or mice used with desktop computers for navigating among input fields, as well as hyperlinks and other screen objects. For example, tabbing between fields using a full-size keyboard enables the field for typing when it has received focus. On a mobile phone, the tabbing is typically done via a directional pad and the field often has to subsequently be selected to be enabled for typing. Additionally, on desktop computers, mice can be used to move from one field to another without having to move through the fields in between. On mobile phones, moving from one field to another is typically done sequentially from one field to the next, without the ability to skip any fields along the way.

However, some web-enabled mobile phones have touchscreens that provide for direct interaction with objects on the display screen. For example, users can touch a screen object directly with their fingertip or a stylus, rather than indirectly navigate to that object via a pointing device. Yet, even this "improved" user interface technique raises usability issues, as the distinction between "selecting" and "activating" an object becomes blurred. Potential solutions for distinguishing the two include providing an icon or other visible identifier on a portion of the object, or discerning the number of times a user clicks or taps it, or the amount of time a user "presses down" on the object.

In any event, the ability to select an object without also activating it becomes particularly important in systems that provide alternative functionality specific to a particular object. For example, when a user activates an HTML hyperlink in a web browser, the program typically navigates to a new web page corresponding to the URL embedded within that hyperlink object. The user, however, might want to examine the URL before making the decision to activate the hyperlink.

A common mechanism for offering a user alternative functionality specific to a selected object is a "context menu." Context menus provide a user with one or more alternative functions available within a particular "context" or state of a program or device, such as the selection of a particular object. Context menu items can change dynamically as the context changes, as different objects are selected and as a program enters a different state.

In a mobile communications environment, however, providing context menus with which users can quickly interact is easier said than done. The state of an information retrieval system can change frequently, for example, as new search results are received from remote servers (or as information becomes known to the system, such as the time of day or a user's location as indicated by a mobile phone's GPS equipment). In addition to the problem noted above of distinguishing the selection from the activation of an object, other constraints include processing speed and memory limitations on mobile devices, as well as bandwidth and latency limitations inherent in mobile communications networks. These constraints, coupled with the many different types of information that can be retrieved from remote web sites, for example, make it even more difficult to provide context menu items that are customized to particular objects or categories of objects.

In contrast to the "random" full-text searches users often perform on desktop computers in home and office environments (in which multiple iterative searches and analyses of resulting web pages can be completed relatively quickly due to greater bandwidth and local computing resources), users in a mobile communications environment often perform more "targeted" searches for lists, schedules and other information the existence and perhaps even the location of which is often known in advance. Such information must nevertheless be retrieved relatively quickly in order to be useful. For example, common mobile searches include requests for stock quotes, sports scores, movie times and nearby restaurants or coffee shops, to name a few.

Targeted searches are less amenable to the random keyword search techniques commonly employed on existing desktop and mobile devices, in which users enter complete keywords and navigate through results and web pages across a large domain of web sites. Mobile devices, in particular, are in need of solutions in which targeted information can be found relatively quickly with minimal user interaction. Such solutions ideally would still afford users access to both the breadth of a large domain of information (such as the web with its diverse collection of web sites, or a large enterprise database) and the depth of any particular "channel" or information category (which may lend itself to unique functionality, whether within or across one or more web sites or databases).

Some mobile devices support applications that have been customized for highly targeted information retrieval, such as the "Pocket Express" application from Handmark Inc. (http://express.handmark.com/) which provides discrete modules for retrieving news, stock quotes, sports scores and various other specific types of information. Though useful for rapid retrieval of certain specific data, the domain of available information is inherently very limited, in part because each desired category of information requires its own custom module. Such an approach is not very scalable, given the vast array of information channels available via the web. Moreover, without a generic mechanism to locate information by searching within a particular module, users typically are limited to browsing or selecting items from within each module's predefined data structure. For example, users can browse news headlines and select one to retrieve the full story, but they cannot search for particular news stories, much less headlines Other products have attempted to reduce user interaction to perform targeted searches by enabling users to enter only word prefixes or word fragments, and providing results interactively as a user types characters. See, for example, a presentation at Google (http://video/google.com/videoplay?docid=7012265262667474421&q=type%3Agoogle_engEDU) in this area, or the "vTap" program from Veveo, Inc. (http://wvvw.viap.com), as well as Veveo's various published patent applications, including both PCT publications (WO/2007/062035) and US publications (2008011473, 20080086704, 20070255693, 20070130128, 20070088681, 200701754, 20070050337, 20070005563 and 20060101499). While providing an information retrieval mechanism that is more suitable to targeted searches, such approaches nevertheless lack a generic search mechanism that can be utilized to narrow a search request within a broad domain of information channels (to provide a more focused or targeted search), as well as provide additional functionality specific to particular channels.

Google, in a recent talk (http://jhtc.oremeeting.php?meeting=march08), discussed a "multi-tier" search technique in which a user first searches for a web site (for example, "Wikipedia"), the result of which contains not only a link to that site, but also a search box in which a "second-tier" search can be typed (thus saving the step of clicking on the link and then typing in the second-tier search). Other similar solutions include special search keywords that identify the second-tier site within the search query itself. Such solutions rely, however, on the differing search engines available across various second-tier sites, which not only force users to adapt to different search query formats, but also may provide inferior results when compared to more powerful search engines such as the one provided by Google. A more integrated multitier approach could avoid such anomalies by providing a consistent search mechanism among various tiers (within as well as across particular information channels), particularly one which also offered additional context-specific functionality.

In short, existing technologies have not adequately addressed the problems intrinsic to targeted searches, particularly when conducted in a mobile communications environment. Information must be retrieved more quickly, but with less user interaction, in light of the hardware, user interface, network bandwidth and latency limitations inherent in such an environment. In addition, a more integrated and scalable search mechanism is needed to allow users to request information from a broad domain of information channels and quickly locate desired information within one or more of those channels, preferably with the availability of additional functionality that is tailored to those channels within the context of user requests and other available state information.

SUMMARY

The present invention addresses the problems discussed above by employing novel combinations of various information retrieval techniques designed to facilitate targeted searches, particularly in a mobile communications environment. In one embodiment, multi-prefix search techniques are employed in an effort to minimize a user's data entry requirements. Moreover, user queries can be executed on a remote server interactively, during the query construction process, with results transmitted back for display so as to enable users, prior to entering an entire query, to revise that query or select a desired result.

To facilitate targeted searches, users can employ multi-tier search techniques to constrain queries to one or more information channels. In one embodiment, users can simply select one or more channels from a list, which could include previously designated "favorite" channels. In another embodiment, users can employ multi-prefix searches to locate desired channels as well as desired information within particular channels (and, in some cases, within multiple tiers of one or more such channels).

For example, after locating a "yellow pages" channel with a "first-tier" search (such as "yel pag"), the user might be presented with a "second-tier" opportunity to search for "zip codes." After entering only a few digits, the user might see the desired zip code result displayed and, upon selecting it, be presented with a "third-tier" opportunity to search for a vendor within that selected zip code. Such a multi-tier approach facilitates targeted mobile searches by reducing user interaction and data entry, and, in another embodiment, by leveraging a consistent multi-prefix search mechanism among multiple tiers.

In one embodiment, a mobile communications device includes a window, which comprises a search area and a results area. An application is launched and a landing page is displayed in a display area of the mobile communications device. The search area includes a search query field. A keystroke is inputted into a search query field and a multi-prefix search is performed. The landing page within the display area is replaced by the results of the search. The results contain a first tier of search results, which can include channels or links to web pages associated with the user input. If the selected search result is a channel, the channel is displayed. If it is a web page, the web page is displayed. In other embodiments, a separate web browser application is launched and the web page is displayed via the web browser application. The channel or the web page may then be searched or explored. If the desired channel is not displayed within the first tier of search results, one or more additional keystrokes may be inputted. Again, the results page refreshes accordingly and additional keystrokes may be entered until the desired channel is displayed.

The above-described embodiments provide for multi-prefix, interactive search capability on a mobile communications device. Prefix delimiters denote the beginning of another search prefix. In some embodiments, space characters may be used as prefix delimiters. In other embodiments, users may input space character keystrokes as well as alphabetic or numeric keystrokes. If a user's query seeks results containing multiple words, the user might enter one or more prefixes of such words separated by spaces to create a multi-prefix search query. The embodiments described above enable users to enter fewer keystrokes to obtain a desired search result. The search is interactive because a user is provided feedback (the displayed search results are refreshed) with each keystroke (or, in another embodiment, after a predefined time lapse between keystrokes). Based on partial query results, a user can determine that a search is complete and obtain the desired search result without having to enter the entire text or word of one or more search terms.

To further leverage targeted searches, in which search results often share common attributes (including similar types of fields and data formats), the data extracted from an information channel (from a given web site, for example, or a portion thereof) can, in one embodiment, be pre-processed for functional as well as aesthetic display purposes. Whether captured as keywords via a "web crawling" engine, or as structured data via higher-level data extraction techniques (with or without the assistance of the proprietor of the data), such channel data typically is or can be organized into separate "records" (such as individual restaurants, books or movies) containing discrete "fields" that represent different types of data (such as titles, dates, addresses and phone numbers) common to some or all records. This is primarily due to the fact that most web sites employ databases (typically standard relational, flat-file or object-oriented databases) as the underlying organizational structure for their data.

In one embodiment, channel data records and fields can be indexed as such in order to enable structured searches based upon these records and fields. In another embodiment, the indexing process ignores data field distinctions but is optimized for multi-prefix searches. The frequency of extracting data from remote information sources (whether for indexing or otherwise) will vary depending upon how frequently such data typically will be updated. For example, sports scores may be updated more frequently than movie listings, which in turn may be updated more frequently than restaurant listings. Whether or not field (or other) metadata is retained during the indexing process (if any), the channel data still may be susceptible to "field recognition" sufficient to enable the performance of discrete actions specific to a particular field. For example, if standard ten-digit phone numbers can be extracted from individual channel data records, such as restaurants, then such extracted data can be used to enable actions specific to a particular record, such as using a mobile phone device to call one of the restaurants displayed in the result list of a user's query.

Having extracted and maintained field data related to one or more channels (or even to particular records within one or more channels), various contextual actions can be enabled as alternatives to simply selecting and activating a particular record (which might activate a hyperlink to a web page related to that record). In one embodiment, "dynamic menus" are employed to enable a wide variety of alternative actions specific to a selected record, including calling a person or a place, sending a selected person an email, SMS or other type of message, utilizing a known location (of a user's mobile device, for example, via GPS data, or of a particular place in the result list of a user's query) to view the location of, or directions to, nearby places, or to obtain a map of a desired area, or even linking to a web page related to a particular aspect of a record (to display, for example, images of a selected person). The possibilities are virtually limitless, as they may involve not only actions of which a mobile communications device is capable (such as initiating phone calls and sending messages), but also actions relating to the channel data being retrieved, which are as numerous as the many different types of information available throughout the Internet.

This relationship, between different fields or types of available data and the actions that relate to such data, can be leveraged, even in a mobile communications environment, not only by pre-processing the channel data itself, but by pre-defining the related actions specific to that channel data (with or without the assistance of the proprietor of the channel data) and transmitting them, in response to user queries, along with the channel data query results. In one embodiment, these actions are transmitted to a user's mobile device in the form of Hypertext Transfer Protocol ("HTTP") headers that define both the name of a dynamic menu item and the action to be taken if the user selects and/or activates that item (and are followed by the "body" of the transmission including, for example, the results of a user's query). In another embodiment, if the functionality of the client application on the user's mobile device is integrated into a web browser (using, for example, Javascript and an Ajax application), then these HTTP headers can be incorporated into the body of the transmission itself.

For example, if a user employs a multi-prefix query to search a channel containing a collection of restaurant records, the server might return a series of HTTP headers (followed by the resulting restaurant records matching the user's query) representing dynamic menu items that enable the user to initiate a call to a selected restaurant, or obtain a map and directions to that restaurant from a given location. Yet, if that user queried a different channel containing, for example, a collection of movie records, then the HTTP headers delivered with the results of the user's query might represent a different set of dynamic menu items providing actions such as displaying movie reviews, or playing video trailers.

In other embodiments, these dynamic menu items and their associated actions might vary depending not only upon the channel being queried, but upon the particular channel records the user selects. For example, in one embodiment, if a selected record did not contain a value for a particular field (such as a phone number), then any corresponding dynamic menu item relating to that field (such as a "Call Restaurant" item) would not appear, because the action could not be performed. More generic "dynamic dynamic menus" can be implemented, in another embodiment, by integrating menu item names and associated actions as discrete data fields within one or more channel records. As a result, menu item names and actions will vary as a user selects different records, even within a given channel. In yet another embodiment, certain actions, such as dialing a selected restaurant, can be invoked without requiring a user to display, select or activate a dynamic menu item. Instead, a user might simply press a key or push a button on the user's mobile device (such as the "Talk" button) to which such actions have been mapped. As noted above, dynamic menu items might also vary depending upon any particular state of a user's query or other known information, such as whether a user has logged into a particular web site (in which case a "Log In" menu item and associated action might alternate with a "Log Out" menu item and action, depending upon the user's login state).

In other embodiments, information channels can be implemented as a type of "smart bookmark" in a mobile web browser. After a user selects (or searches for) one or more channels, the user may perform a "second-tier" search constrained to that channel utilizing, for example, an interactive multi-prefix query. A mobile search engine can provide similar functionality, whether or not integrated into a mobile web browser. Such functionality can be enabled, in one embodiment, by pre-processing channel data as described above at a remote server from which search results are transmitted. Moreover, dynamic menus can be implemented in a manner similar to that described above by transmitting menu items and associated actions along with such interactive search results. In yet another embodiment, such functionality can be implemented as a standalone application limited to one or more predefined channels.

When a consistent targeted search mechanism (such as one that employs the interactive multi-prefix and multi-tier information retrieval techniques described above) is coupled with a dynamic menu mechanism that provides context-specific functionality (tailored, for example, to particular channels, records within or across those channels, or other state information), users are presented with a consistent search interface among multiple tiers across and within information channels, and need not learn different or special search syntax. Moreover, due to the constraints of a mobile communications environment, data entry requirements are limited, enabling users to enter fewer keystrokes and perform fewer query iterations, which in turn reduces network bandwidth in both directions, due in part to the interactive nature of the multi-prefix search mechanism. As a result, users can obtain desired results quickly, or revise queries, even before completing an intended query.

For example, a user with a particular preference for Starbucks coffee might want to locate the closest Starbucks coffee shop quickly while traveling in an unfamiliar city, and then call that shop to ensure the user's order is ready upon arrival. Upon entering a few keystrokes into a mobile phone device, a local yellow pages channel can be located (assuming a "favorite" Starbucks channel was not present) and queried for a nearby Starbucks coffee shop, perhaps using the phone's GPS data by default as a base location. Due to a consistent multi-prefix search interface, data entry is limited, and channel-specific functionality can then be invoked. For example, a phone number field, associated with the user's selected Starbucks record, can then be leveraged via a simple mechanism, such as a phone button or dynamic menu item, to enable the user to call the desired Starbucks coffee shop and place an order. Another dynamic menu item might provide a map and directions to that Starbucks, enabling the user to arrive in time to pick up that order. Most importantly, all of this functionality can be provided within the context of a highly constrained mobile communications environment.

The features and advantages described in the specification are not all inclusive, and, in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIG. 3A is a flowchart illustrating a process of client-server interaction during multi-prefix, interactive searching in accordance with some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted from the following discussion that alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. Search Architecture

Figure 1A:
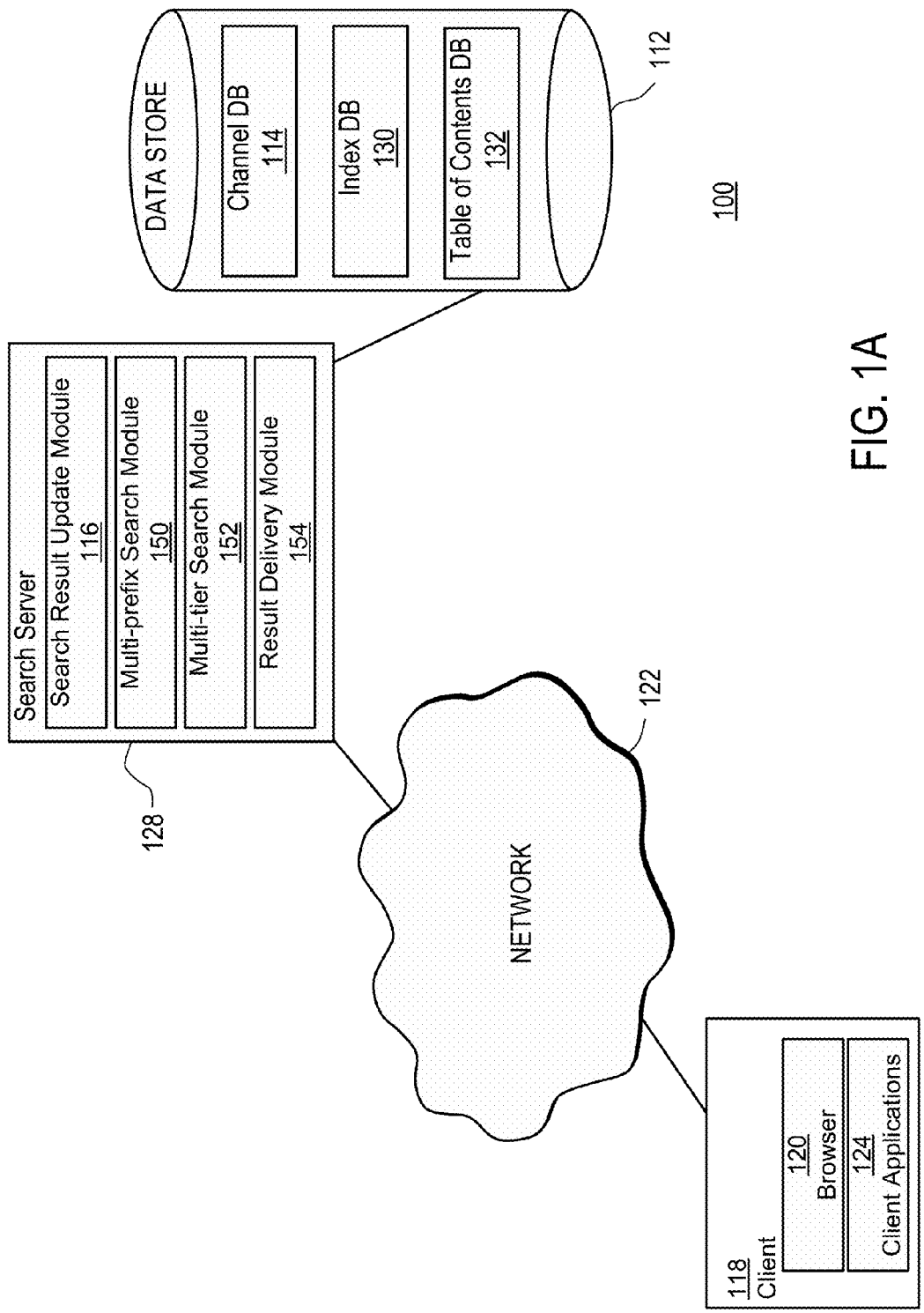
FIG. 1A illustrates an environment adapted to support multi-prefix, interactive searching on a mobile communications device in accordance with some embodiments.

FIG. 1A is a block diagram illustrating an architecture for providing multi-prefix, interactive search capability on a mobile communications device. The network 122 enables communications between a client 118 and a search server 128 coupled to a data store 112. Thus, the network 122 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 122 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 122 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 122 can also include links to other networks such as the Internet.

The client 118 executes a browser 120, comprises client applications 124 and can connect to the search server 128 via a network 122, which is typically the Internet, but may also be any network, including but not limited to a LAN, a MAN, a WAN, a mobile, wired or wireless network, a private network, or a virtual private network, and any combination thereof. While only a single client 118 is shown, it is understood that very large numbers (e.g., millions) of clients are supported and can be in communication with the search server 128 and search result update module 116 at any time. The client 118 may be a mobile communications device similar to the one described in FIG. 2.

The search server 128 includes a search result update module 116, a multi-prefix search module 150, a multi-tier search module 152, and a result delivery search module 154. The search server 128 facilitates multi-prefix, multi-tier, interactive searching by enabling a user to enter prefixes of words or text of a search query to obtain various tier levels of search results. The search server 128 also facilitates multi-prefix, interactive, result delivery searching by enabling a user to enter prefixes of words or text to obtain desired results without having to go through intermediary steps to get those results. The search server 128 also facilitates multi-prefix searching on a mobile communications device.

The search result update module 116 facilitates the update of the search results when a user inputs a keystroke (or pauses for a certain amount of time after entering multiple keystrokes), therefore allowing for interactive search capability. Multi-prefix search module 150 facilitates multi-prefix searching by providing the user the ability to enter the prefix of one or more words of an entire query to obtain desired search results. The multi-tier search module 152 facilitates multi-tier searching by providing different tier levels of results. The result delivery search module 154 facilitates result delivery by searching a plurality of data fields associated with a particular data set in order to produce desired results. Further description regarding usage of these modules is provided below.

The search server 128 is coupled to a data store 112. The data store 112 includes a channel database 114, an index database 130 and a table of contents database 132. A channel represents a content category, such as news, flight information, recipes, etc. The channel database 114 contains records. Each record contains a heading and one or more URLs. The record also contains an indication as to whether each URL references a channel. Then index database 130 contains lists of prefixes and, for each prefix, a list of record IDs that contain words with the prefix, as well as relevancy factors for use in ranking. The table of contents database 132 contains prefix entries to aid in traversing the index. The number of entries contained in the table of contents database 132 affects the time spent traversing the index to find relevant record ID lists. A greater number of entries in the table of contents will slow down the search of the table of contents database 132, but reduce the time spent traversing the index to find relevant record ID lists. Fewer entries contained in the table of contents database 132 will speed up the search of the table of contents, but increase the time spent traversing the index to find relevant record ID lists. Further description regarding usage of these modules is provided below.

Figure 1B:
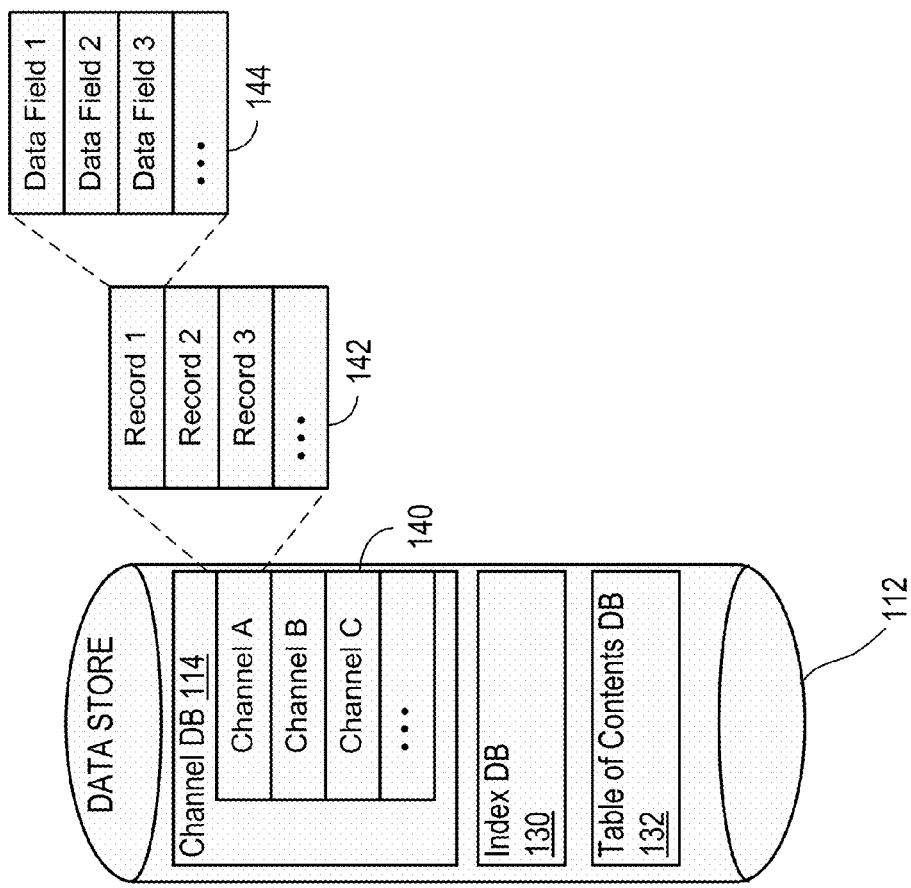
FIG. 1B is a high level block diagram illustrating the data structure contained within the channel database in accordance with some embodiments.

As illustrated in FIG. 1B, the channel database 114 includes channel data sets 140. Each channel data set 140 includes a list of records 142. Each record contains data fields 144. Each record is associated with at least one heading and a "deep link" (a hypertext link to a page or a web site other than its home page). In some embodiments, each record contains a heading and a parameter that can be inserted into a URL template to create a deep link. A heading may be the displayed title associated with a particular record. For example, in a list of Wikipedia articles, an example of a heading may be "John Fitzgerald Kennedy," "High School Musical," or "World Wide Web." Headings in a directory of people might include a person's name, telephone number or address.

Each data field 144 contains identifying information related to that particular channel. A data field 144 may also contain other information related to that particular channel. For example, in an AMAZON™. Books channel, the data fields 144 may contain items such as a title, an author, an International Standard Book Number (ISBN) and a price. In a White Pages channel, the data fields 144 may contain a name, an address, a home phone number and a mobile phone number. In some embodiments, one data field 144 contains multiple items. In other embodiments, each data field 144 contains separate items.

In some embodiments, a data field 144 may be associated with additional items that represent terms that are equivalent to the original items contained in the data field. For example, in a name data field containing "Robert," that data field may be associated with terms such as "Bob," "Bobby" or "Rob" (i.e. terms that are equivalent to the term "Robert").

Those skilled in the art will recognize that the search server 128 is implemented as a server program executed on a desktop computer, laptop computer, or server-class computer comprising a CPU, memory, network interface, peripheral interfaces and other well known components. The computers themselves preferably run an open-source operating system such as LINUX, have generally high performance CPUs, 1G or more of memory, and 100G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

For purposes of illustration, FIG. 1A shows the search result update module 116, the multi-prefix search module 150, the multi-tier search module 152, the result delivery search module 154, the channel database 114, the index database 130 and the table of contents database 132 as discrete modules. However, in various embodiments, any or all of the result update module 116, the multi-prefix search module 150, the multi-tier search module 152, the result delivery search module 154, the channel database 114, the index database 130, and the table of contents database 142 can be combined for operation on a single computing device having storage. This allows a single module to perform the functions of one or more of the above-described modules. Further, the search server 128 and the data store 112 are shown as discrete components for purposes of illustration. In other embodiments, the search server 128 and the data store 112 can also be combined for operation on a single computing device having storage.

Figure 2:
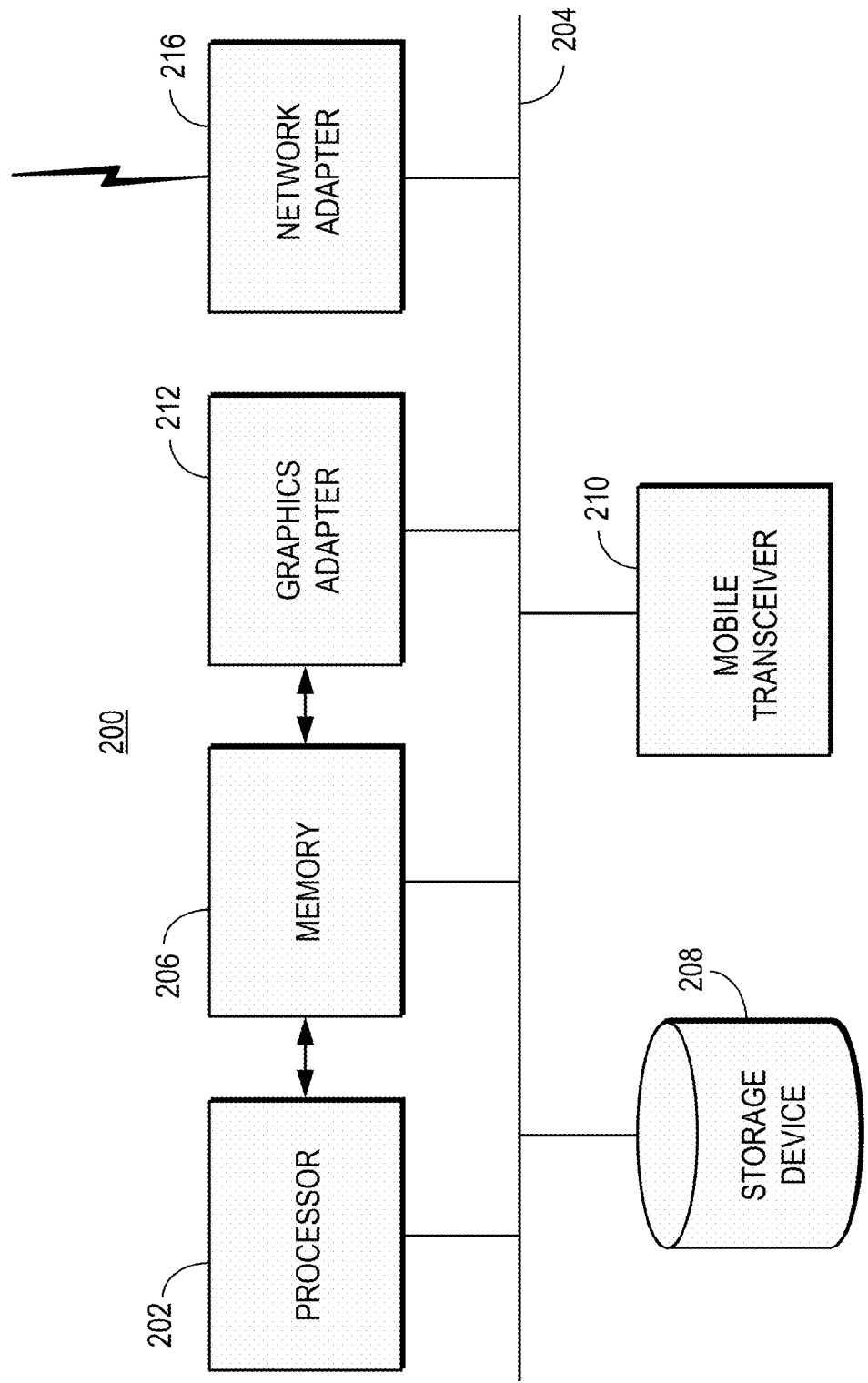
FIG. 2 is a high level block diagram illustrating a functional view of a typical mobile communications device in accordance with some embodiments.

FIG. 2 is a high level block diagram illustrating a functional view of a typical mobile communications device 200 in accordance with some embodiments. Illustrated are at least one processor 202 coupled to a bus 204. Also coupled to the bus 204 are a memory 206, a storage device 208, a graphics adapter 212, a network adapter, and a mobile transceiver 210 including a display, keyboard, and optionally, a pointing device (not shown). In some embodiments, the display is a touchscreen display. In one embodiment, the functionality of the bus 204 is provided by an interconnecting chipset.

The storage device 208 is any device capable of storing data, such as a memory stick, a secure digital (SD) card, a solid-state memory device or a hard drive. The memory 206 stores instructions and data used by the processor 202. The optional pointing device (not shown) is used in combination with the keyboard (also not shown) to input data into the mobile communications device 200. The graphics adapter 212 displays images and other information on the display of the mobile communications device 200. The network adapter 216 couples the mobile communications device 200 to a local or wide area network.

As is known in the art, a mobile communications device 200 can have different components from those shown in FIG. 2. Furthermore, the mobile communications device 200 can lack certain illustrated components or include certain components not shown.

As is known in the art, the mobile communications device 200 is adapted to execute computer program modules for providing functionality described herein. As used herein, the term "module" refers to computer program logic utilized to provide the specified functionality. Thus, a module can be implemented in hardware, firmware and/or software. In one embodiment, program modules are stored on the storage device 208, loaded into the memory 206 and executed by the processor 202. The modules may be loaded as part of the client applications 124.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

II. Search Operation

A. General Search Operation

Figure 9A:
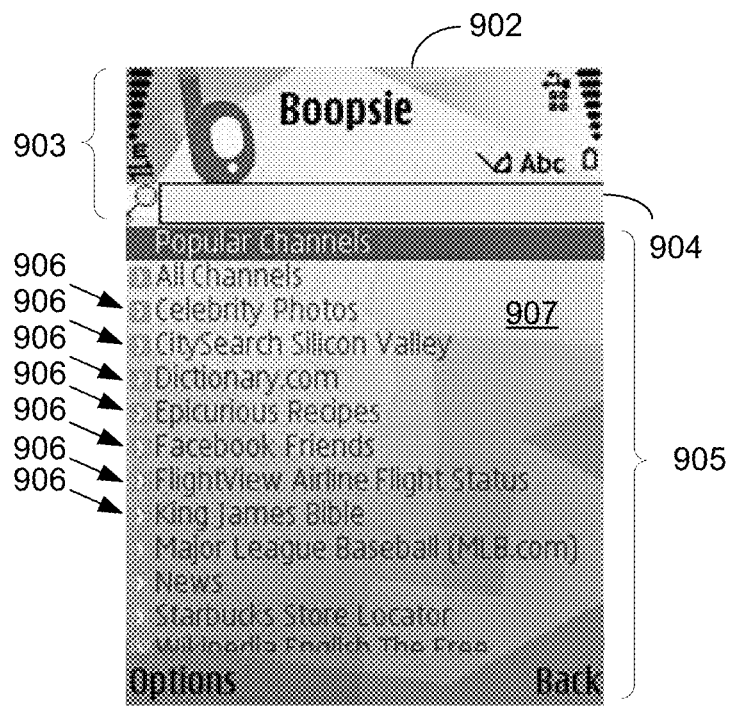
FIGS. 9A-9M illustrate graphical representations of screenshots of a display of a mobile communications device in accordance with some embodiments.
Figure 9B:
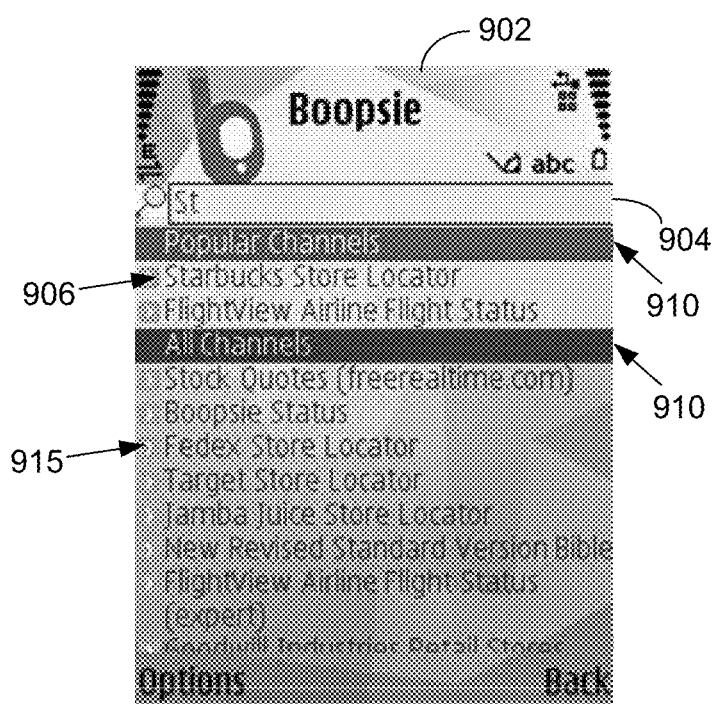

FIG. 3A is a flowchart illustrating a process 300 of client-server interaction during multi-prefix, multi-tier, interactive searching in accordance with some embodiments. An application for multi-prefix, multi-tier, interactive searching is initialized 301 by a mobile communications device. The server sends 302 an initial information to display in a window of the mobile communications device. The window is displayed 303 on a display of the client device. In one embodiment, the window appears like the window 902 as illustrated in FIG. 9A. The window 902 includes a search area 903, which includes a search query field 904, and a display area 905. The display area 905 includes a landing page 901, which contains headings 906 for associated channels for user selection. Each heading 906 refers to either another channel (list of headings) or to a URL, which may be a deep link into a web site. The headings 906 are links to categorized information, such as news, celebrity photos or flight status. The headings 906 may also be links to various websites, such as gmail.com and fandango.com. A keystroke associated with an alphanumeric character is input 304 on the mobile communications device in the search query field 904 as shown in FIG. 9A, and sent 304 to the server. The user input is received 306, a search 307 of the channel database 114 is performed using the input, and sent 308 to the client. The display area 905 is updated accordingly. The display area 905 displays 309 a first tier of search results, which include channels associated with the user input. As shown in FIG. 9B, a user inputs "St" in the search query field 904, and the display area is refreshed to display results corresponding to the "St" search query. In this example, "St" corresponds to search results "STARBUCKS™ Store Locator," "FlightView Airline Flight Status," "Stock Quotes," etc. In one embodiment, the displayed result, such as shown in FIG. 9B, may also include other organizational information such as the labels 910 ("Popular Channels" or "All Channels") to provide the user with additional information such that the headings are intuitively recognized and understood by the user. The displayed results may also include selectable links 915 to channels or websites as shown in FIG. 9B.

Figure 9C:
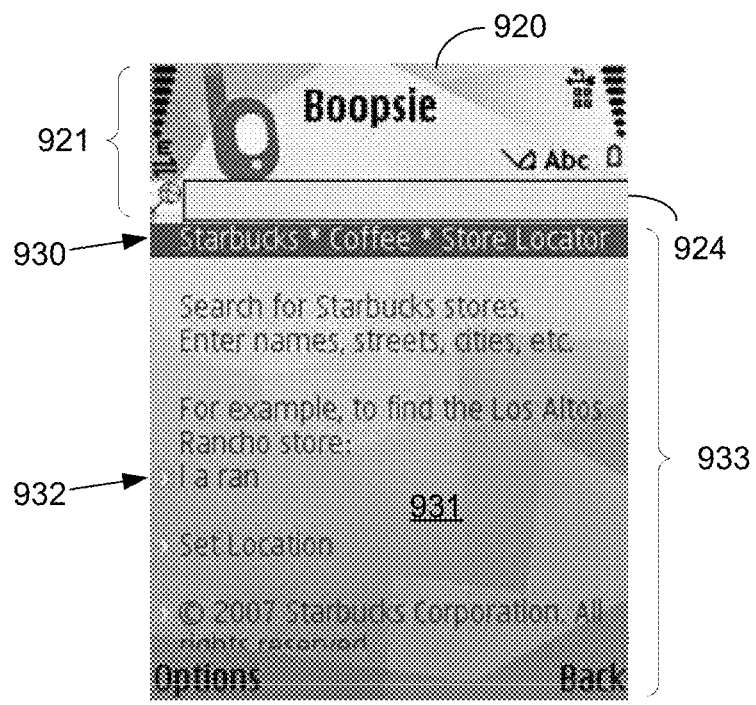

If the desired result is displayed (310—Yes), a result may be selected 312. The result selection is received 314 and the corresponding channel or web page is sent 315 to the client. The channel or web page is then displayed 316 on the display of the mobile communications device. The selection directs the user to the channel or website corresponding to the selected result where the user can input 318 a search query in the channel or web page or simply explore 318 the displayed page. In some embodiments, if the result selected is a web page, a separate web browser is launched to display the web page. As shown in FIG. 9C, the user has selected the STARBUCKS™ Store Locator channel 906 (FIG. 9B). This selection directs the user to the STARBUCKS™ Coffee Store Locator channel as shown in FIG. 9C.

If the desired result is not displayed (310—No) within the search results, another keystroke may be inputted 304. Again, the user input is received 306, the channel database 114 is searched 307, results are sent 308, and the display area is refreshed accordingly by displaying 309 the search results. Additional keystrokes may be entered until the desired channel is displayed. With each keystroke, the results list is updated by the search result update module 116.

In some other embodiments, users may input space character keystrokes as well as alphabetic or numeric character keystrokes. As shown in FIGS. 9E and 9F, a user has selected the Starbucks Coffee Locator channel and has entered a search query in the search query field 904 that includes a prefix delimiter, such as a space character. The user's search entry in the search query field 904 represents the prefixes for each word of a multi-prefix search query. The user has entered a first prefix (first letter or first several letters of a word or text), separated by a space character, and a second prefix, and is provided with a list of search results corresponding to the user input by the multi-prefix search module 150. This allows users to input fewer keystrokes to obtain the desired search results. In other embodiments, a wild card character or a symbol can be used in place of spaces between multiple prefixes of a search.

The method described above provides for a multi-prefix, interactive search capability. The search is multi-prefix because if the search term contains multiple words, the user enters the prefix of one or more words of the multi-term search query, therefore, providing the capability for users to enter less keystrokes and obtain a desired search result. The search is interactive because a user is provided feedback (displayed search results) with each keystroke. Based on partial query results, a user can determine when the search is complete and can obtain the desired search result without having to enter the entire search term. Therefore, fewer keystrokes are needed as compared to searching using the current technologies available.

Figure 3B:
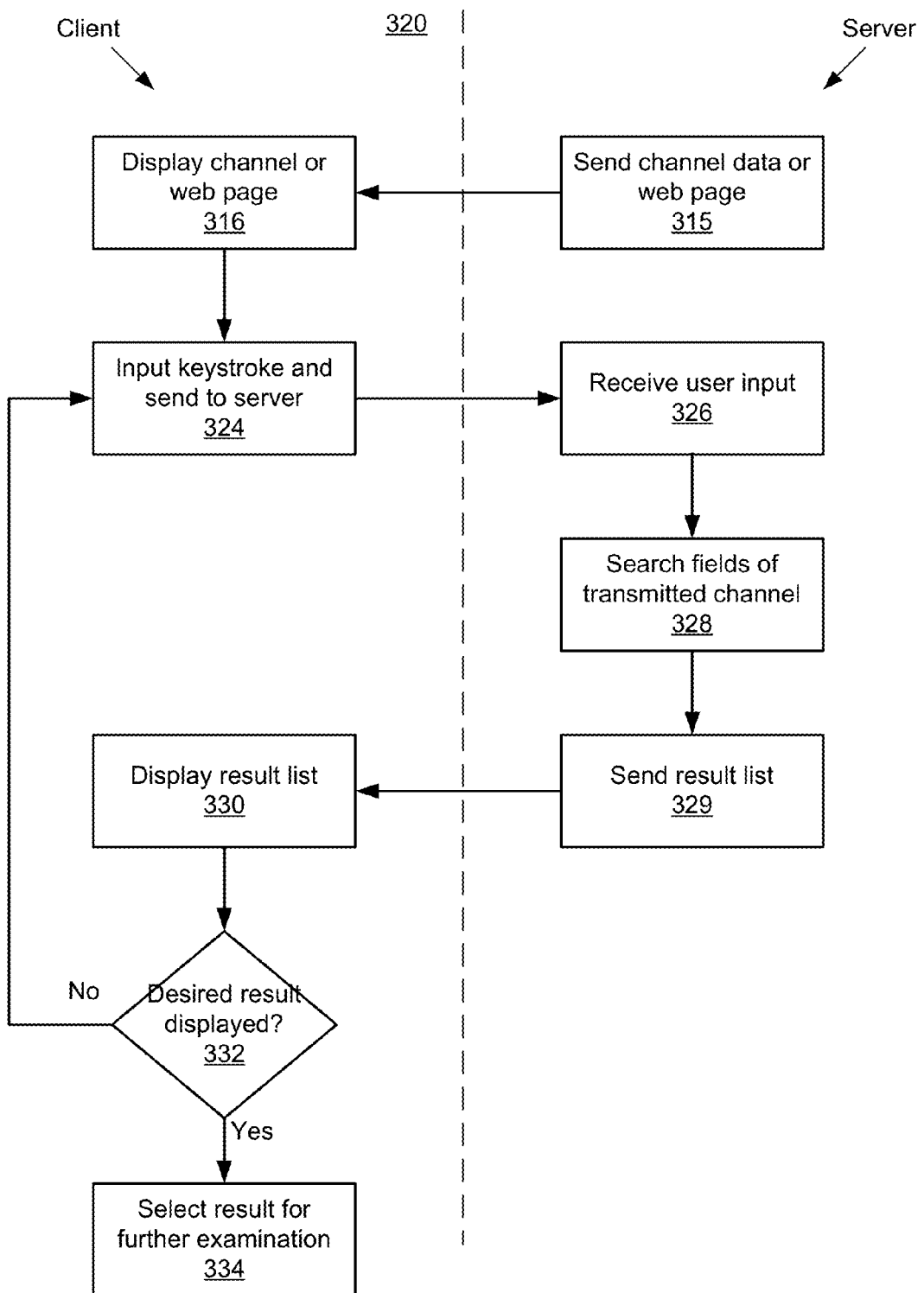
FIG. 3B is a flowchart illustrating a process of client-server interaction during multi-prefix, interactive searching in accordance with some other embodiments.

FIG. 3B is a flowchart illustrating a process 320 of client-server interaction during multi-prefix, interactive searching in accordance with another embodiment. A channel or web page is sent 315 to the client. The window, including a search area and a display area, of the channel or web page is then displayed 316 on the display of the mobile communications device. In one embodiment, the window may look like the window 920 as illustrated in FIG. 9C or 9I. The search area 921 includes a search query field 924. A user inputs 324 keystrokes in the search query field 924. The server receives 326 the user input and searches 328 the data fields of the records in the channel for search results that match the search query. For example, if the White Pages channel was being searched, the server would receive the search query and search the name, address, and telephone number fields of the records to determine if there was a match for the received search query. The result list is then sent 329 to the mobile communications device.

Figure 9D:
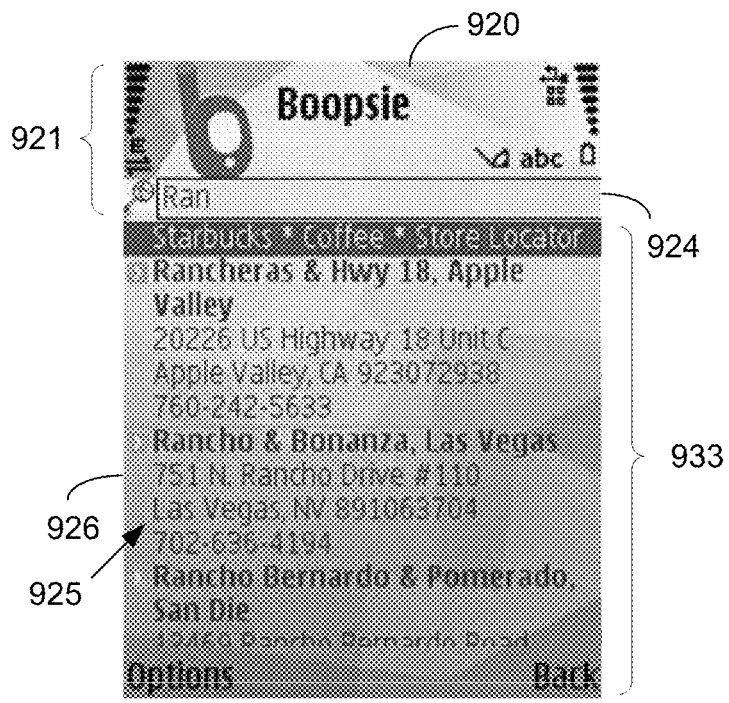
Figure 9E:
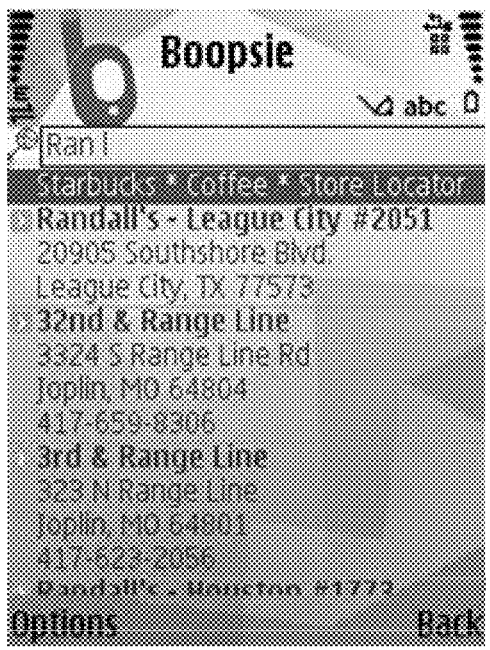
Figure 9F:
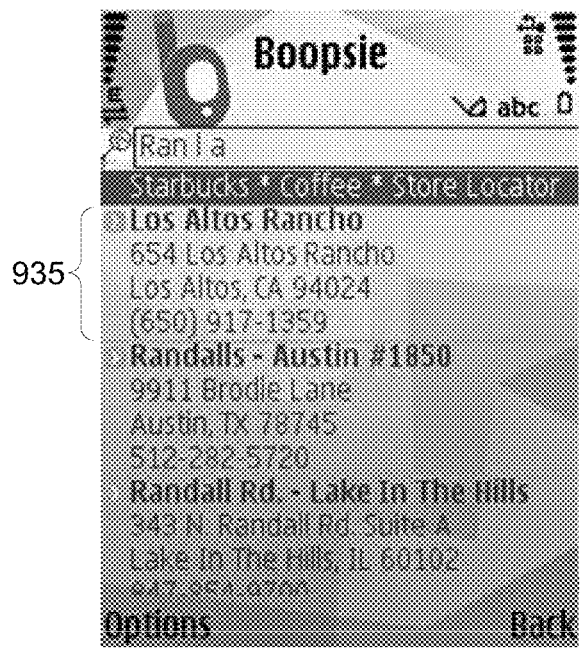

Search results 926 that match the search query are displayed 330 in the display area 933 as shown in FIG. 9D. In some embodiments, as shown in FIG. 9D, additional information 925 associated with the search result is displayed in the display area 933 along with the search result 926. If the desired result in the list of results 926 is displayed (332—Yes), then the desired result may be selected 334 and additional information about the result may be displayed. However, if the desired result is not displayed in the list of results (332—No), another keystroke may be inputted 324 to receive and display different search results. Space character keystrokes may also be inputted to indicate that the search query has multiple terms.

When the server 128 searches for a search result that matches the search query, the server searches the various data fields and records within a channel data set. In one embodiment, the search is performed on structured data, such as the data set described in the channel database 114. In other embodiments, the search is performed on unstructured data, which includes data and links without categorized fields.

Figure 9G:
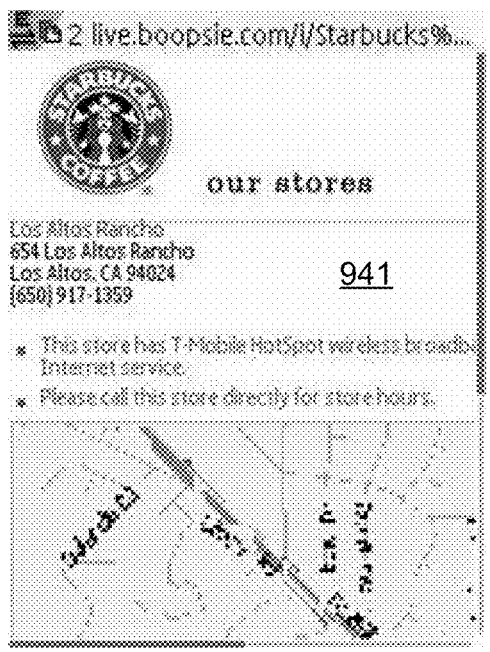
Figure 9H:
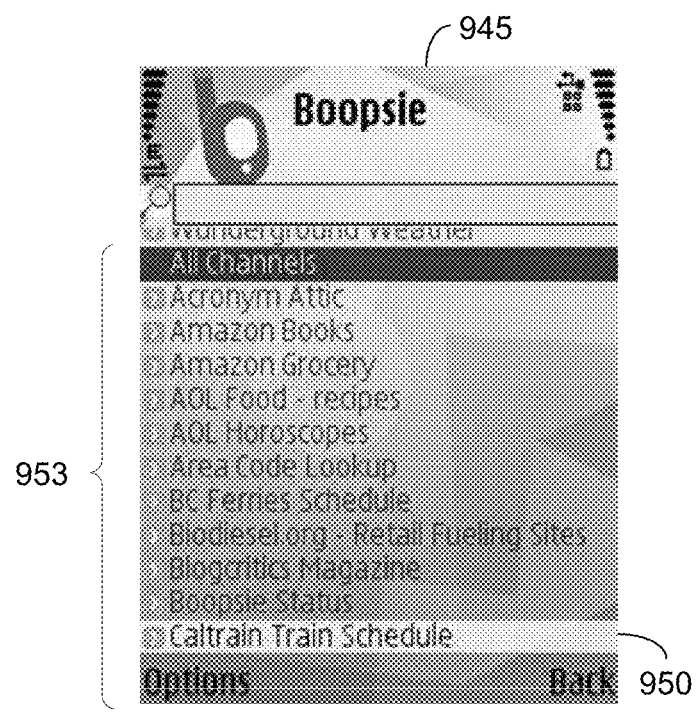
Figure 9I:
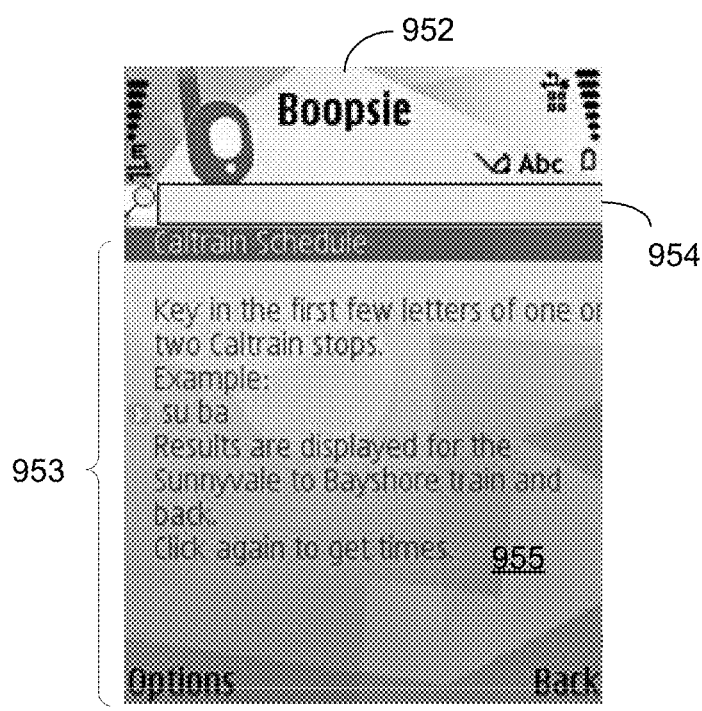
Figure 9J:
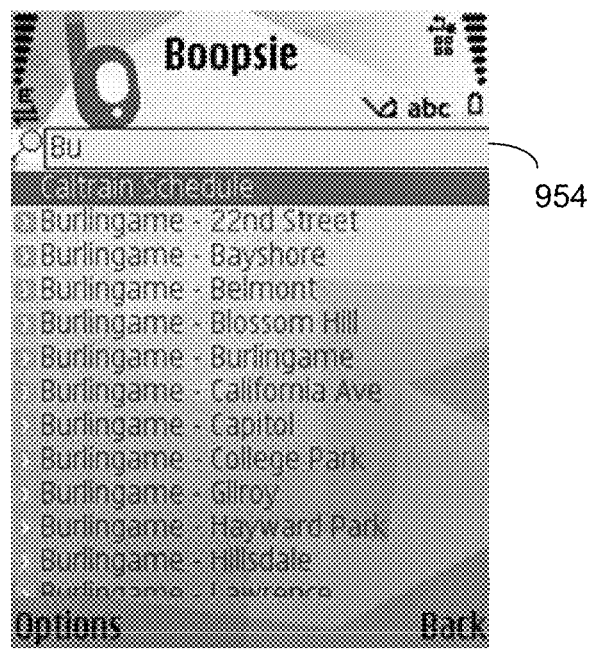
Figure 9K:
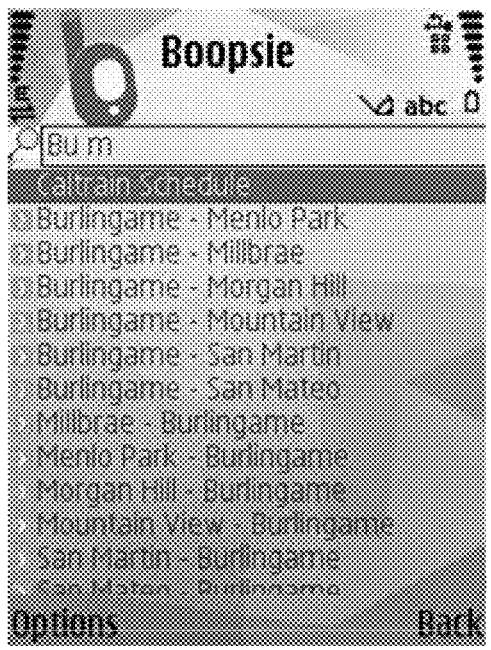
Figure 9L:
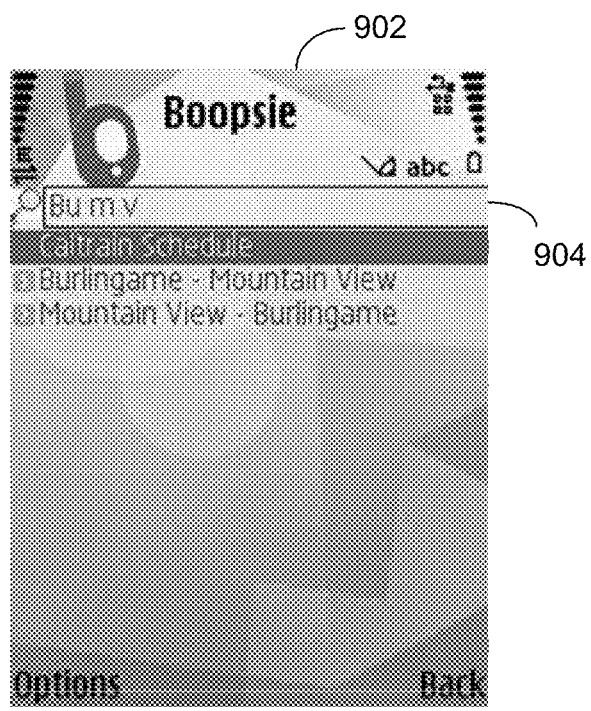
Figure 9M:
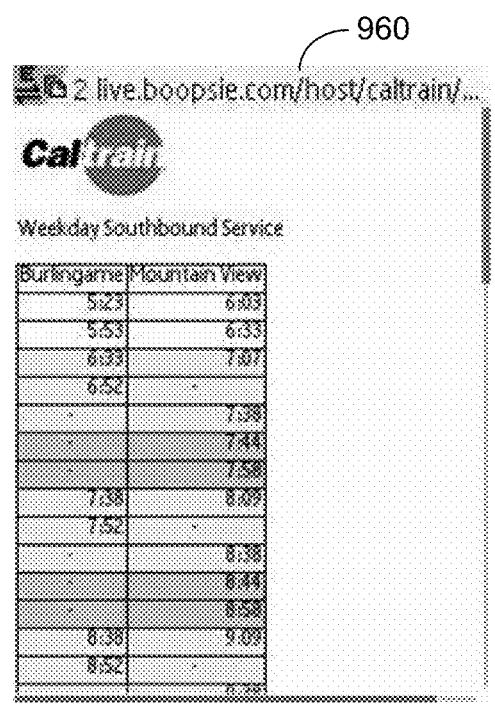

FIGS. 9C-9G provide an illustration of the method. In FIG. 9C, the window 920 for the STARBUCKS™ Coffee Locator includes a search area 921 and display area 933. The search area 921 includes a search query field 924. The display area 933 in FIG. 9C shows an initial landing page 931. In some embodiments, the landing page 931 may also include selectable links 932 to additional information. Keystrokes, which include alphanumeric characters, are entered into the search query field 924 as seen in FIG. 9D. Search results 926 are displayed in the display area 933 as shown in FIG. 9D. Additional keystrokes are entered into the search query field 924 (FIGS. 9E and 9F) to input a second prefix, and the search results list 926 is refreshed with search results that match the updated search query having two prefixes. In the illustrations provided in FIGS. 9E and 9F, the prefix of a word is entered into the search query field 924, followed by a space character and the prefix of another word of the search term. A prefix is the first letter or first few letters of a word of the search term. When the desired result is displayed, a result is selected and the display area 933 is updated to display additional information regarding the search query. In this example, the records and data fields of the STARBUCKS™ Coffee Locator channel have been searched to determine the matching search results. In this case, the data fields contain information related to location and telephone contact of the STARBUCKS™ stores that match the search query. Those skilled in the art will understand how the present invention is advantageous because simply by entering the keystrokes and selecting a single channel, the mobile communications device displays the exact web page or channel the user is seeking FIGS. 9H-9M also provide an illustration of the above. The Caltrain Train Schedule channel (950 in FIG. 9H) has been selected to display the associated landing page 955 (FIG. 9I) in the display area 953 of the window 952 of the channel. Characters of a search query are entered into the search query field 954. When the desired result is displayed, such as in FIG. 9I, the result heading may be selected and additional information may be received. In this example, the Burlingame-Mountain View schedule is selected and the schedule page 960 is displayed as shown in FIG. 9M.

Figure 10A:
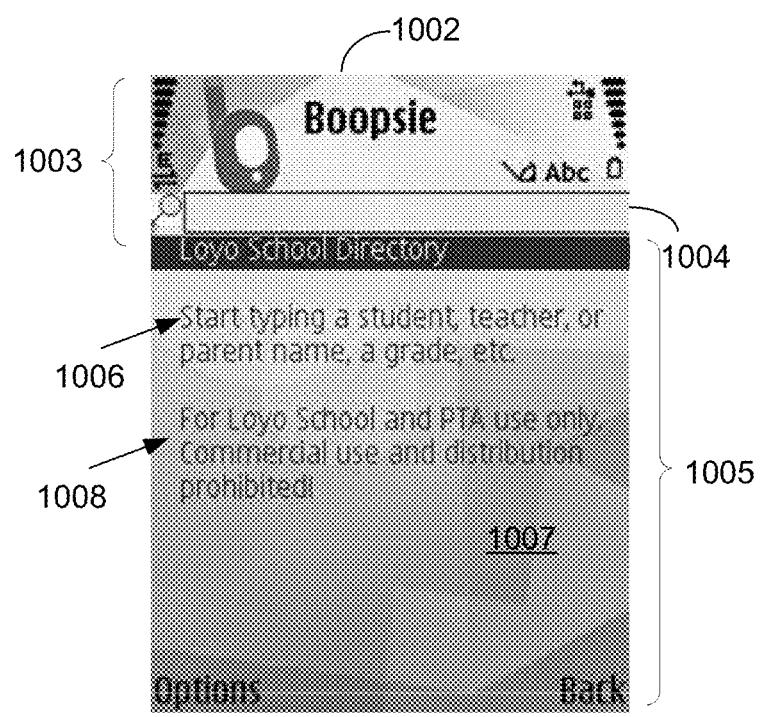
FIGS. 10A-10C illustrate graphical representations of screenshots of a display of a mobile communications device in accordance with another embodiment.
Figure 10B:
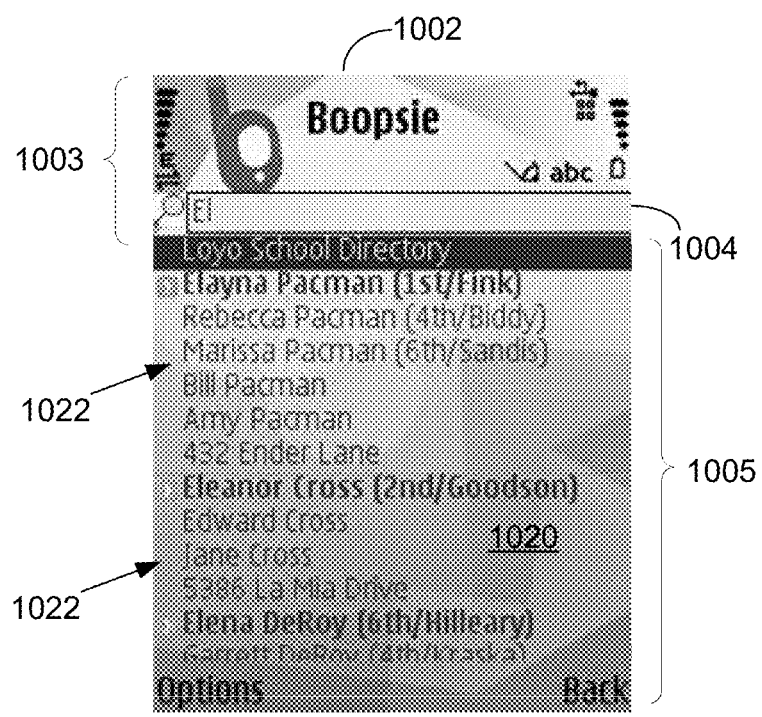
Figure 10C:
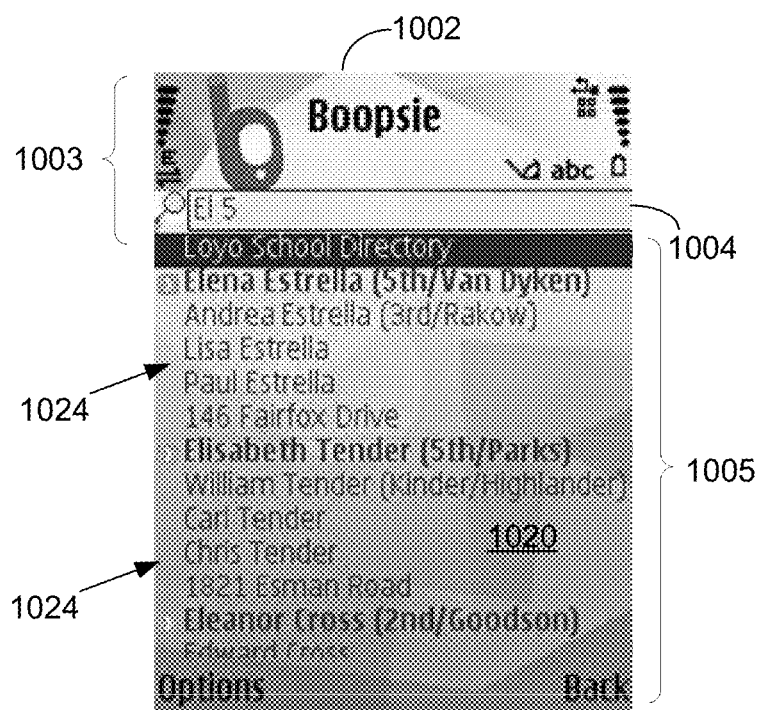

Another illustrative example of the flow chart in FIG. 3B may be seen in FIGS. 10A-10C. FIG. 10A shows a window 1002 displaying the Loyola School Directory channel. The window 1002 includes a search area 1003 and a display area 1005. The search area 1003 includes a search query field 1004. The display area 1005 of FIG. 10A includes a landing page 1007 that contains instructions 1006 and other information 1008. In some embodiments, the landing page 1007 may also include links to additional information (not shown). In this example, a prefix is entered into the search query field 1004 and display area 1005 is refreshed to show results 1022 as shown in FIG. 10B. The search results 1022 include information associated with a record. The information represents the items contained in the data fields associated with the record. In this example, the additional information 1014 includes name of parent(s), name(s) of siblings, grade and name of teacher, and address, which is associated with the record "Elayna Pacman." As shown in FIG. 10C, when an additional prefix is entered into the search query field 1004, the display area 1005 is refreshed with new results 1024. In this example, the prefixes ("El 5") are found across multiple data fields, therefore displaying results matching a name that includes "El" and a grade that includes "5." In some embodiments, the result 1022 or 1024 may be selected to display additional results.

Figure 3C:
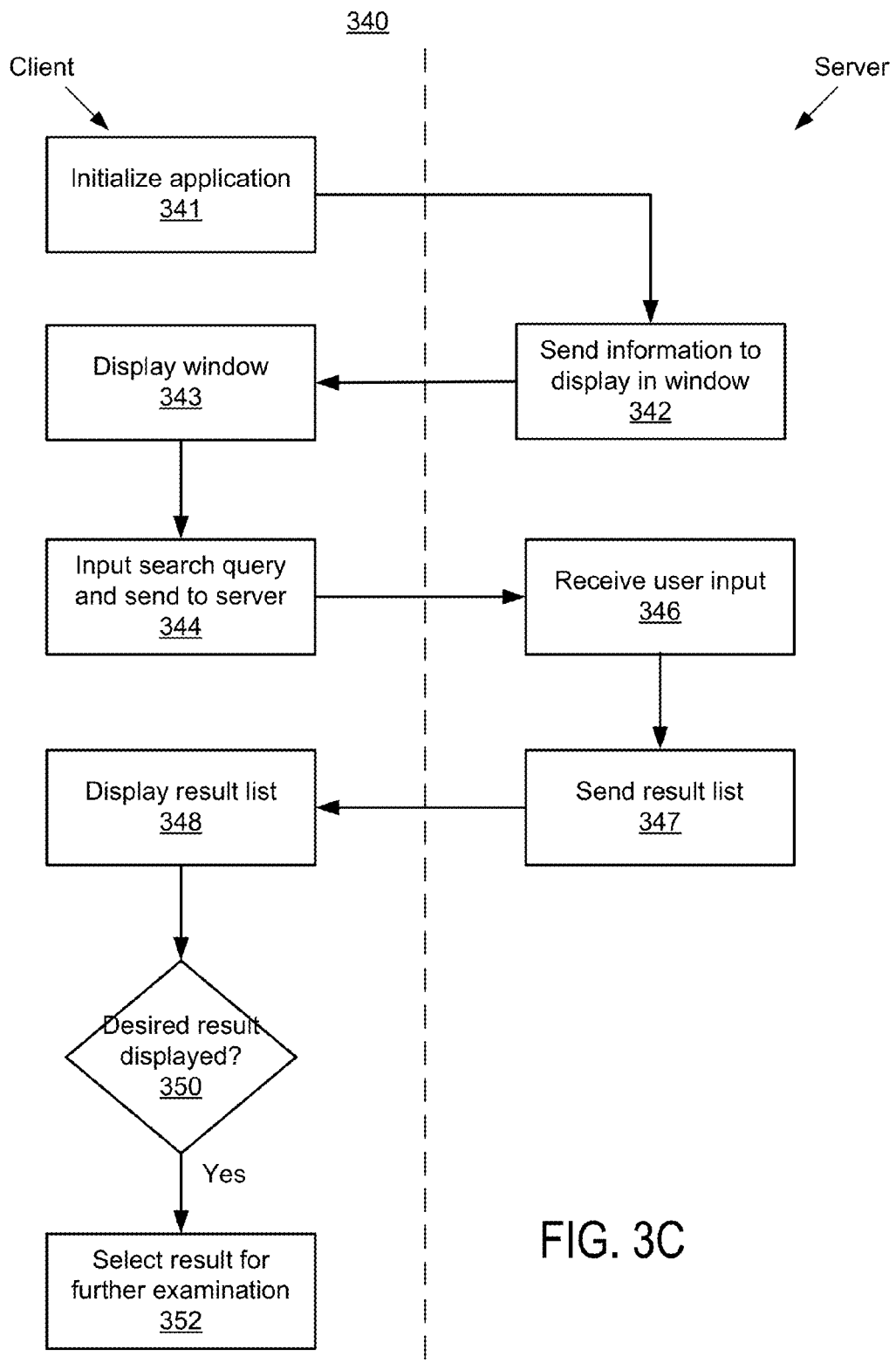
FIG. 3C is a flowchart illustrating a process of client-server interaction during multi-prefix, interactive searching in accordance with some other embodiments.

FIG. 3C is a flowchart illustrating a process 340 of client-server interaction during multi-prefix searching on a mobile communications device in accordance with some embodiments. An application for multi-prefix searching is initialized 341 and information is sent 342 to be displayed in a window of the mobile communications device. A window is displayed 343 on a display of a mobile communications device. A search query is input 344 into a search query field, and a confirmation is made to indicate that the search query string is complete and the search query is sent 344 to the server. The search query is a multi-term search query and contains the prefix of at least one of the terms of the entire search query. The search query is received 346 by the server, which sends 347 a result list to be displayed 348 on the mobile communications device. If the desired result is displayed (350—Yes), the result may be selected 352 and additional information may be displayed. If the desired result is not displayed (350—No) the process is started again when another search query is input and sent to the server.

Figure 4:
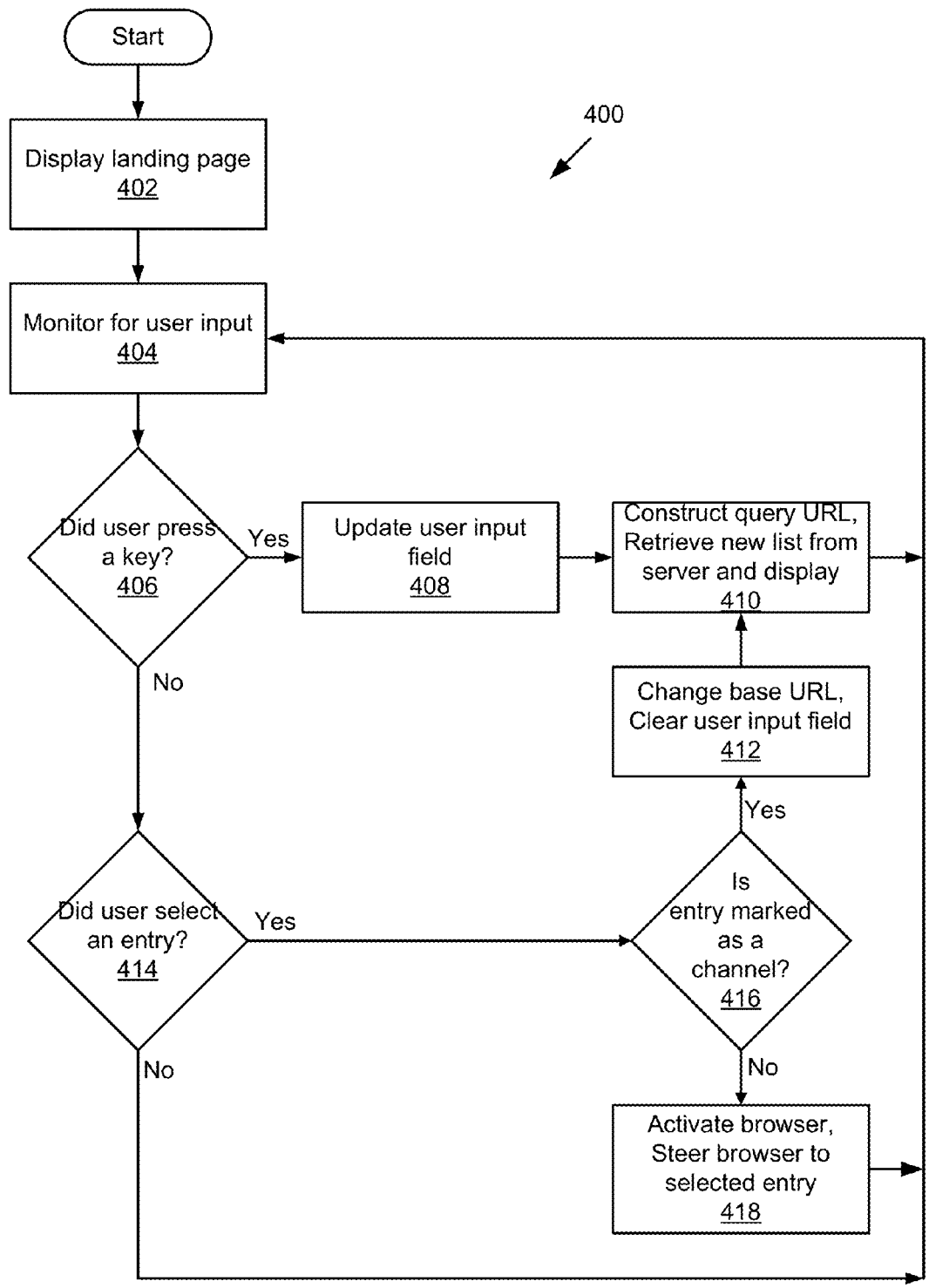
FIG. 4 is a flowchart illustrating a process for interactive searching in accordance with some embodiments.

FIG. 4 is a flowchart illustrating a process 400 for interactive searching in accordance with some embodiments. The mobile communications device displays 402 a window (902, FIG. 9A), which contains instructions. In some embodiments, the display of the mobile communications device initially displays a first tier of channels, which is obtained by submitting a base channel uniform resource location (URL) with no search terms. The system monitors 404 for the user input. The user then performs a sequence of actions. The user can key characters into the input area (as shown in FIG. 9B), or the user can select an item from the list of headings displayed on the window. If the user inputs a key character, or keystroke, into the input area (406—Yes), the user input field is updated 408. A query URL is constructed 410 and submitted by combining the base URL with the characters that the user has inputted in the search query field. The resulting records from the URL are retrieved and the headings containing those results records is displayed in the output area. The system continues to wait 404 for another user input. The aforementioned steps are repeated until the user selects an entry.

If the user did not input a key character, or keystroke (406—No), a determination 414 is made as to whether an entry is selected. If the user selects an entry (414—Yes), a determination 416 is made to determine whether the entry is marked as a channel. If the entry is marked as a channel (416—Yes), the base URL is updated 412 to the URL in the selected record and the search query field is cleared 412. If the entry is not marked as a channel (416—No), the web browser is activated and the browser is directed 418 to the URL in the selected record.

Figure 5:
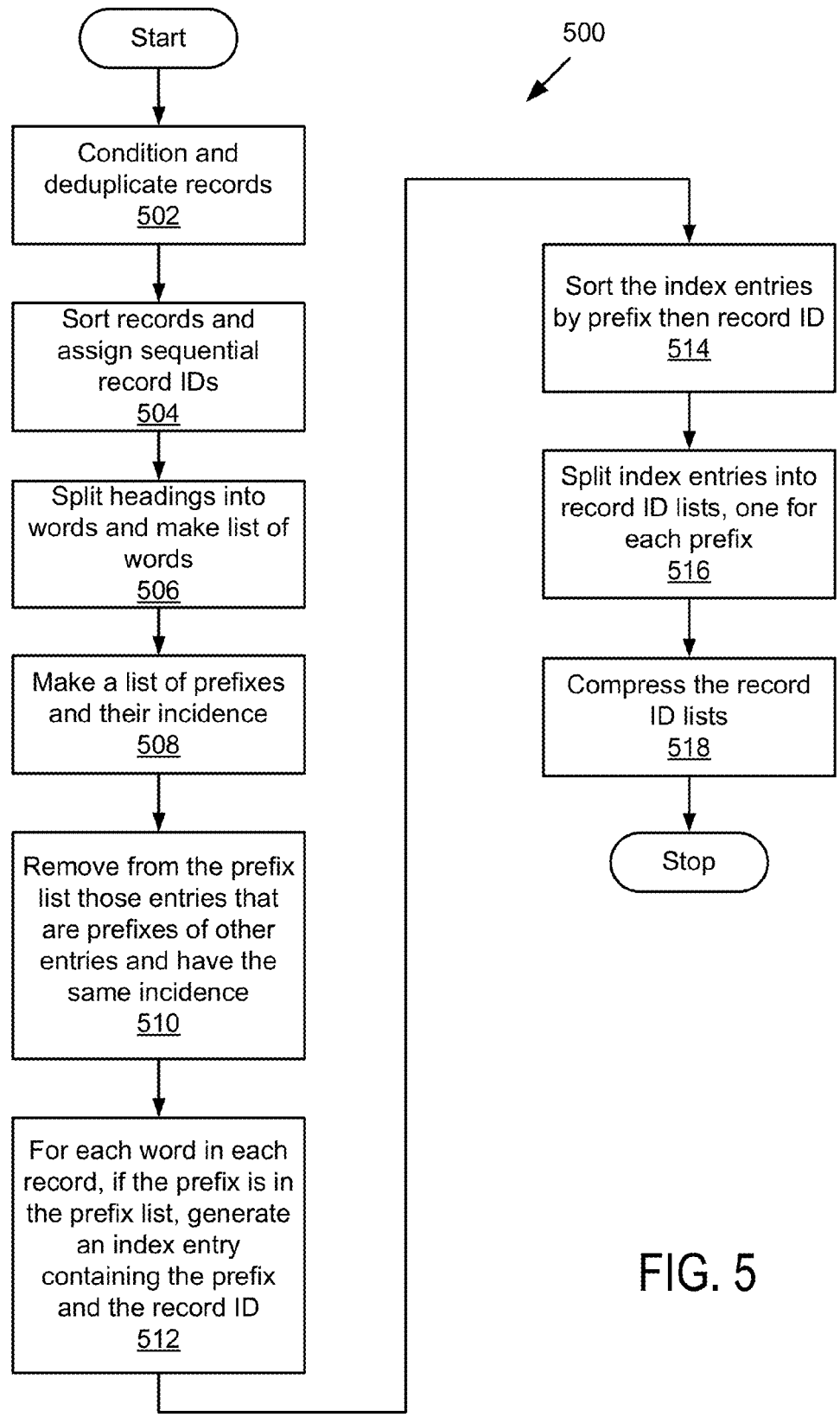
FIG. 5 is a flowchart illustrating a process for creating a multi-term prefix index in accordance with some embodiments.

FIG. 5 is a flowchart illustrating a process 500 for creating a multi-term prefix index in accordance with some embodiments. Each record of the database contains a heading and one or more URLs. The record also contains an indication whether each URL references a channel. The headings in each record are conditioned 502, which includes removing extra space characters from the beginning and end of the headings. Records with duplicate headings are removed 502. The records are sorted and assigned 504 sequential IDs. In some embodiments, the record IDs can be used as the relevancy factors when ranking the results, thereby causing the results to be displayed in sorted heading order without having to sort the headings themselves. The headings are split into words and a list of words is constructed 506. Utilizing the list of words, a list of word prefixes is created and the number of incidences is counted 508. An optimization of the list is performed. Prefixes that do not help to disambiguate between headings are not needed in the index. For example, given the headings "rat," "sat," "saw" and "say," the prefix "sa" disambiguates as well as the prefix "s," so "s" does not need to be included in the index. Entries that are prefixes of other prefixes and have the same incidence are removed 510 from the list of word prefixes. From the example above, "s" is a prefix of "sa" and both occur three times; therefore, "s" does not need to be included in the index.

Index entries are created 512 for each prefix in each word in each heading of the record if the prefix is in the list of disambiguating prefixes. Each entry contains the prefix and the record ID, as well as the position that the word occurred in the heading, which is used as a relevancy factor in ranking. The entries are sorted 514 in alphabetical order by prefix. The list of index entries is split 516 into lists—one list for each prefix. The list of record IDs is compressed 518.

Figure 6:
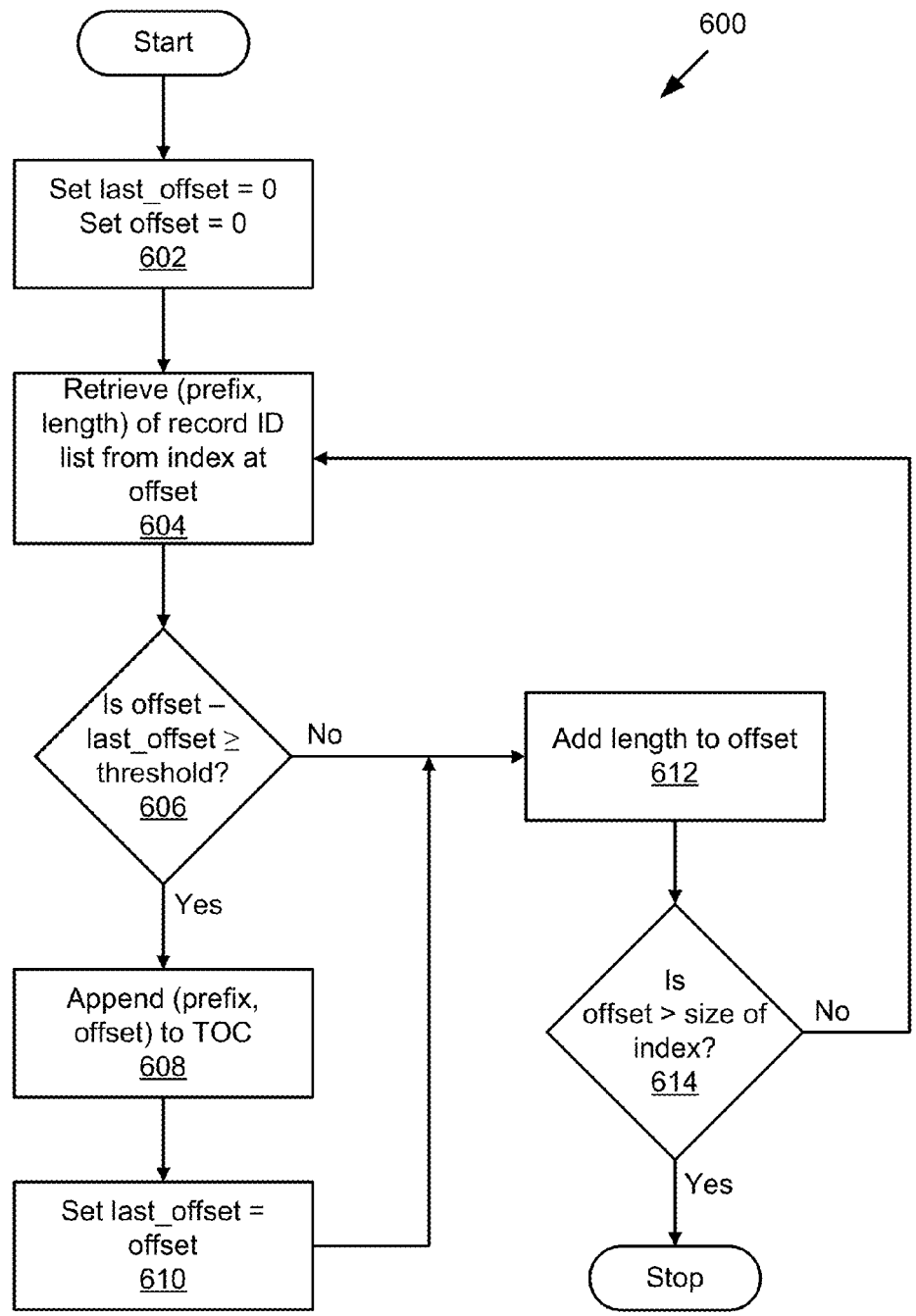
FIG. 6 is a flowchart illustrating a process for creating a table of contents in accordance with some embodiments.

FIG. 6 is a flowchart illustrating a process 600 for creating a table of contents in accordance with some embodiments. The table of contents is created based on a threshold. Smaller threshold values cause the table of contents to contain more entries, which slows the search of the table of contents, but reduces the time spent traversing the index to find relevant record ID lists. Larger threshold values cause the table of contents to contain fewer entries, which speeds the search of the table of contents, but increases the time spent traversing the index to find relevant record ID lists. With this trade-off in mind, the threshold value is user-definable and can be adjusted to maximize prefix search performance on a particular hardware system and user preferences.

Process 600 begins and two offsets are initialized 602 at the start of the index. The record ID list that begins at the offset is retrieved 604 from the index. The prefix and length are retrieved from the record ID list. The difference between the offset and the last offset is determined 606. If the difference between the offset and the last offset is smaller than the predetermined threshold (606—No), the length is added 612 to the offset. A determination 614 is then made as to whether the offset is greater than the size of the index. If the offset is greater than the size of the index (614—Yes), then the creation of the table of contents is complete. If the offset is not greater than the size of the index, the record ID list that begins at the offset is retrieved 604 from the index.

If the difference between the offset and the last offset is at least as large as the threshold (greater or equal to the threshold) (606—Yes), then the prefix and offset are appended 608 to the table of contents. The last offset is then set 610 to the offset and the length is added 612 to the offset.

Figure 7:
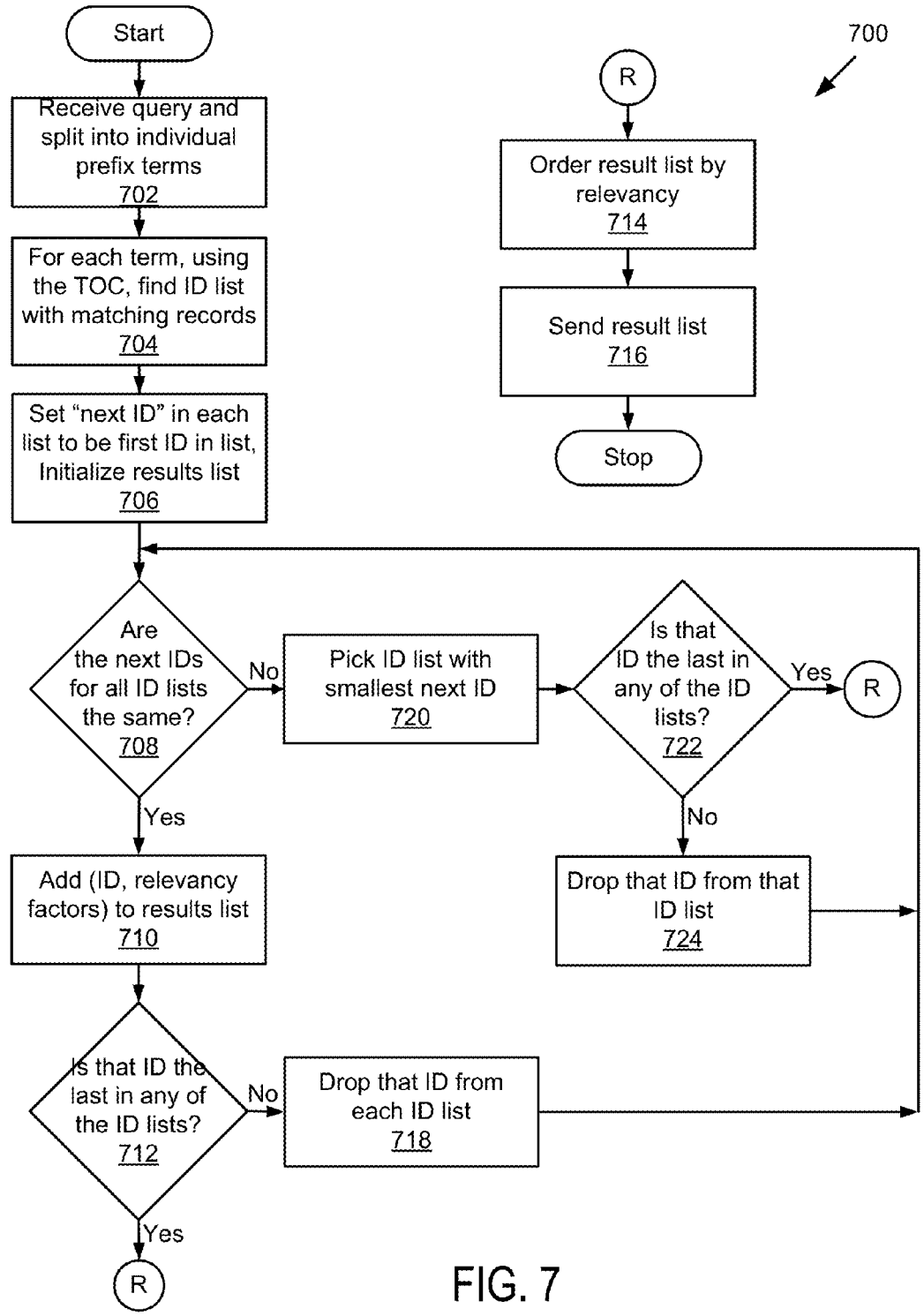
FIG. 7 is a flowchart illustrating a process for sending interactive search results in accordance with some embodiments.

FIG. 7 is a flowchart illustrating a process 400 for sending interactive search results in accordance with some embodiments. When a query is received, it is split 702 into individual prefix terms. For each prefix, the record ID list corresponding to the particular prefix is retrieved 704 (a detailed description of the process of this step is outlined in the description for FIG. 8 below). A "next ID" for each list is set to be the first ID in each list and a results list that holds certain information regarding each match is initialized 706. A determination 708 is made as to whether the next IDs are the same for all ID lists. If they are the same (708—Yes), the ID and relevancy factors are added 710 to the result list, which contains a list of all record IDs that occurred in each of the prefix lists, and, therefore, match the query. If that ID is the last ID in any of the ID lists (712—Yes), then the results are ordered 714 by relevancy and the result list sent 716 for display.

If the ID is not the last ID on the list (712—No), the current ID is dropped 718 from each list. Again, a determination 708 is made as to whether the next IDs are the same for all ID lists. If the next IDs are not the same (708—No), the list with the smallest next ID is selected 720. If that ID is the last ID in any of the ID lists (722—Yes), the result list is ordered 714 by relevancy and sent 716 for display. If that ID is not the last ID in any of the ID lists (722—No), that ID is dropped 724 from that ID list and a determination 708 is made as to whether the next IDs are the same for all ID lists.

Figure 8:
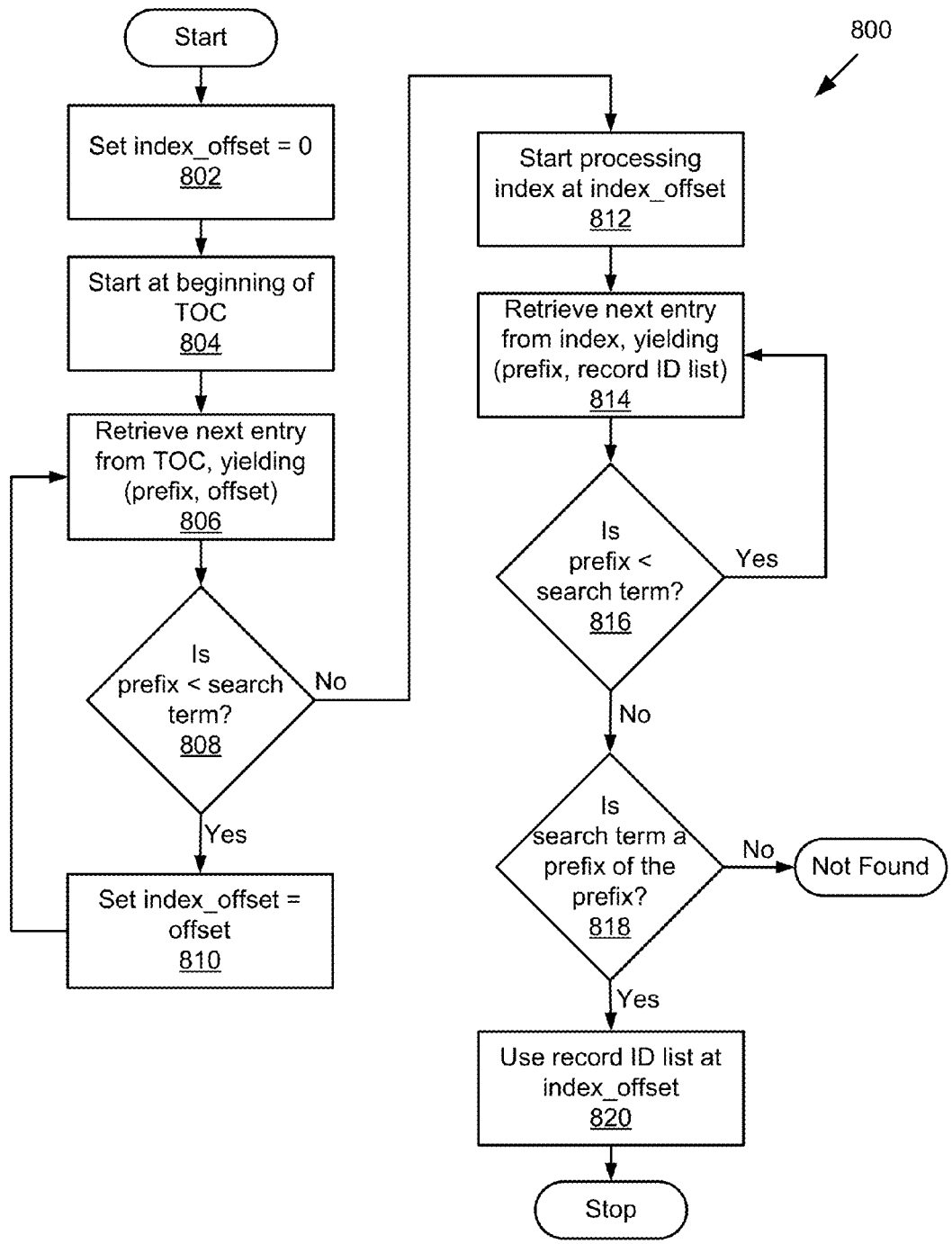
FIG. 8 is a flowchart illustrating a process for sending interactive search results in accordance with some embodiments.

FIG. 8 is a flowchart illustrating a process 800 for sending interactive search results in accordance with some embodiments. In particular, FIG. 8 is a detailed description of step 704 from FIG. 7 and illustrates the retrieval of a record ID list that corresponds to a given search term. The first part of the process 800 involves scanning the table of contents to find the largest entry that is no larger than the search term. An index offset is initialized 802 to the beginning of the index. The process is initialized 804 to start at the beginning of the table of contents. The next entry in the table of contents is retrieved 806, thus yielding a prefix and an offset into the index. A determination 808 is made as to whether the prefix is less than the search term. If the prefix is smaller than the search term (808—Yes), then the index offset is set to the offset that was retrieved from the table of contents and the process repeats at step 806.

If the prefix is not smaller than the search term (808—No), then the index is processed 812 at the index offset and the table of contents scan is complete. The next entry from the index is retrieved 814. A determination 816 is made as to whether the prefix is smaller than the search term. If the prefix is smaller than the search term (816—Yes), the process repeats at step 814.

If the prefix is greater than the search term (816—No), the scanning of the index is completed and a determination 818 is made as to whether the search term is prefix of the prefix. If the search term is a prefix of the prefix, then the record ID list is used 820 at the index offset. If the search term is not a prefix of the prefix, then no match is found for the particular search term.

B. Smart Prefix Query Optimizations

In certain situations, such as those involving relatively large data sets, the performance of the processes described above can be improved by implementing certain optimizations (described below) that are targeted to relatively large information domains without significantly impacting performance with respect to smaller data sets. For example, the English version of Wikipedia includes over 3 million articles containing over 1 billion words, and is roughly 25 times as large as the Encylopedia Britannica (the next largest English language encyclopedia). Yet, even without these optimizations, the performance of certain embodiments of the above processes could be considered acceptable. Yet, the performance of such processes with respect to the WorldCat bibliographic database (which contains over 150 million records from over 70,000 libraries, and is roughly 60 times larger than Wikipedia English) is noticeably slower unless certain optimizations are implemented.

To understand certain performance bottlenecks that result from processing relatively large information domains, and to identify potential optimizations or other improvements, it is helpful to examine certain steps illustrated in FIGS. 7 and 8 discussed above. For example, after splitting a query into multiple prefixes in step 702 of FIG. 7, each prefix is processed in step 704 (illustrated in greater detail in FIG. 8), using the TOC to retrieve the record ID list identifying those records which contain that prefix.

In one embodiment, the TOC for typical data sets contains between a few hundred and a few thousand entries. The WorldCat TOC contains over 325,000 entries. Nevertheless, even searching this many entries in a linear fashion does not impose a noticeable performance penalty, indicating that this step is not a significant bottleneck. A multi-tier TOC could of course be generated if desired (ie, creating "next-level" TOCs for each higher-level TOC) to reduce the time required to linearly search the TOC.

The lists of record IDs corresponding to each prefix in a query are then retrieved (eg, from disk into memory) and intersected to yield a result list of record IDs satisfying the constraints of the query. In one embodiment, the record ID lists corresponding to each prefix in the query are retrieved and intersected with one another simultaneously. In other words, because the lists have been previously sorted in this embodiment, it is relatively straightforward to process multiple lists in parallel to generate a sorted result list containing only those items found in every list.

The result list is then ranked to display to the user an ordered list of the most "relevant" results. In one embodiment, rather than ranking all of the elements in the result list (since only the "top N" elements will be displayed to the user), a "heap" is employed to identify and rank the top N elements without having to rank the remaining elements in the result list.

As a general matter, the processing time required to generate a result list is affected by a number of different factors. One significant factor is the "retrieval time"—ie, the time required to retrieve the lists from memory, which increases significantly for longer lists that require more disk accesses. Longer lists, even if stored entirely in RAM, may also significantly impact overall processing time. The overall processing time is typically proportional to the "intersection time" or time required to generate a single list by intersecting multiple lists. This intersection time is in turn proportional to the number of elements in the longest list, and in the result list. In addition, the overall processing time is proportional to the "ranking time" or time required to rank the elements in each list. Even when a "heap" is employed to identify and rank only the top N elements for display to the user, the ranking time required for this heap-based ranking is proportional to the number of elements in the result list.

Thus, it is apparent that one key factor or bottleneck affecting the overall query-processing performance time is the size of the lists corresponding to each prefix in the query, in particular the existence of one or more lists with a relatively large number of elements. Not surprisingly, lists corresponding to single-letter prefixes (such as the letter "a") are exponentially larger than those corresponding to longer prefixes. The size of a list drops quickly as the length of the corresponding prefix increases, and as the number of prefixes in a query increases. In fact, particularly short queries (eg, queries having a length of 3 or fewer characters, measuring the total number of characters in a query, even including the spaces between prefix terms) tend to require significantly more overall processing time than do longer queries.

For example, the "a" list for the WorldCat data set contains over 60 million record IDs, while the "ab" list contains fewer than 3 million record IDs and the "a be" list contains fewer than 250,000 record IDs. Moreover, the result list from the "a b" query (ie, the list of IDs for those records that contain both word(s) beginning with "a" and word(s) beginning with "b") contains fewer than 4 million record IDs and the "a b e" query yields a result list containing fewer than 2 million record IDs. As noted above, retrieving long lists into memory can result in multiple disk accesses that significantly increase overall processing time, in addition to the time required to intersect long lists with one another and rank a relatively long result list.

In one embodiment, query processing time is reduced significantly by caching the lists that result from processing extremely short queries (eg, with a length of 3 or less). The first time such a short query is encountered, the sorted result list of record IDs is stored for use should the same short query be encountered in the future. It should be noted that relatively short queries are also more likely to recur than are longer queries, thus further justifying the caching of such queries. During the processing of these subsequent queries, the results will be available instantly, as the entire ranked result list will already be stored in the cache.

Moreover, in one embodiment, the cache can be preloaded with result lists representing certain very short queries, such as those corresponding to single-character prefixes ("1", "a", etc) or even queries with combinations of these very short prefixes (eg, all pairs of single-character prefixes). In one embodiment, result lists are cached corresponding to queries containing every paired combination of 1-character, 2-character and even 3-character prefixes (or even pairs of longer prefixes, depending upon available memory). Although the number of query result lists stored in the cache may be quite large (thousands or even millions), the sizes of such lists tend to be relatively small (as noted above, exponentially smaller than the sizes of the original lists corresponding to single-character and other short prefixes). A few gigabytes of cache storage can thus yield dramatic performance improvements.

In one embodiment, a threshold overall query length (eg, L=3) can be employed to cache only those prefixes (whether preloaded or encountered at query time) whose total length (even including spaces between prefix terms) does not exceed that threshold. In another embodiment, a threshold processing time (eg, t=0.1 seconds) can be employed to cache only those queries whose overall processing time (including retrieval and intersection of all lists and ranking of the result list) exceeds that threshold.

Of course, these optimizations can also be combined—eg, preloading the cache with all result lists of 3-character and shorter queries, and then supplementing the cache with all result lists from queries that require more than 0.1 seconds to process. Moreover, other factors (beyond the overall query length and query processing time) can also be considered, individually and in combination. For example, the existence or prevalence of short prefixes (eg, those with no more than 2 characters) could be a factor in the determination of whether to cache a query containing such prefixes. The number of prefix terms (eg a threshold of 3 or fewer terms) could be another such factor. Such factors can be weighted (eg, based on relative priority) and combined to calculate a threshold function that can be used to determine whether to cache the results of a particular query (whether preloaded or at query time).

Moreover, the result lists from queries for which those factors or combinations thereof can be predetermined (eg, all queries of 3 or fewer characters) can be preloaded into the cache, while the lists resulting from queries for which certain factors cannot be predetermined (eg, the overall query processing time or the number of prefix terms in a query) must be computed at query time, after which a determination can be made as to whether to cache such lists of query results. The overall query processing time might even differ for the same query due to other real-time factors (eg, memory usage), and could be outweighed by factors such as the overall query length, the length of individual prefix terms or the number of prefix terms (or perhaps other factors).

Regardless of which function or specific combination of these optimizations is employed, the goal is the same—to cache the record ID lists corresponding to queries that require (or will likely require) significant processing time when first encountered and/or will (or may be likely to) recur in a subsequent search in the future.

Figure 13A:
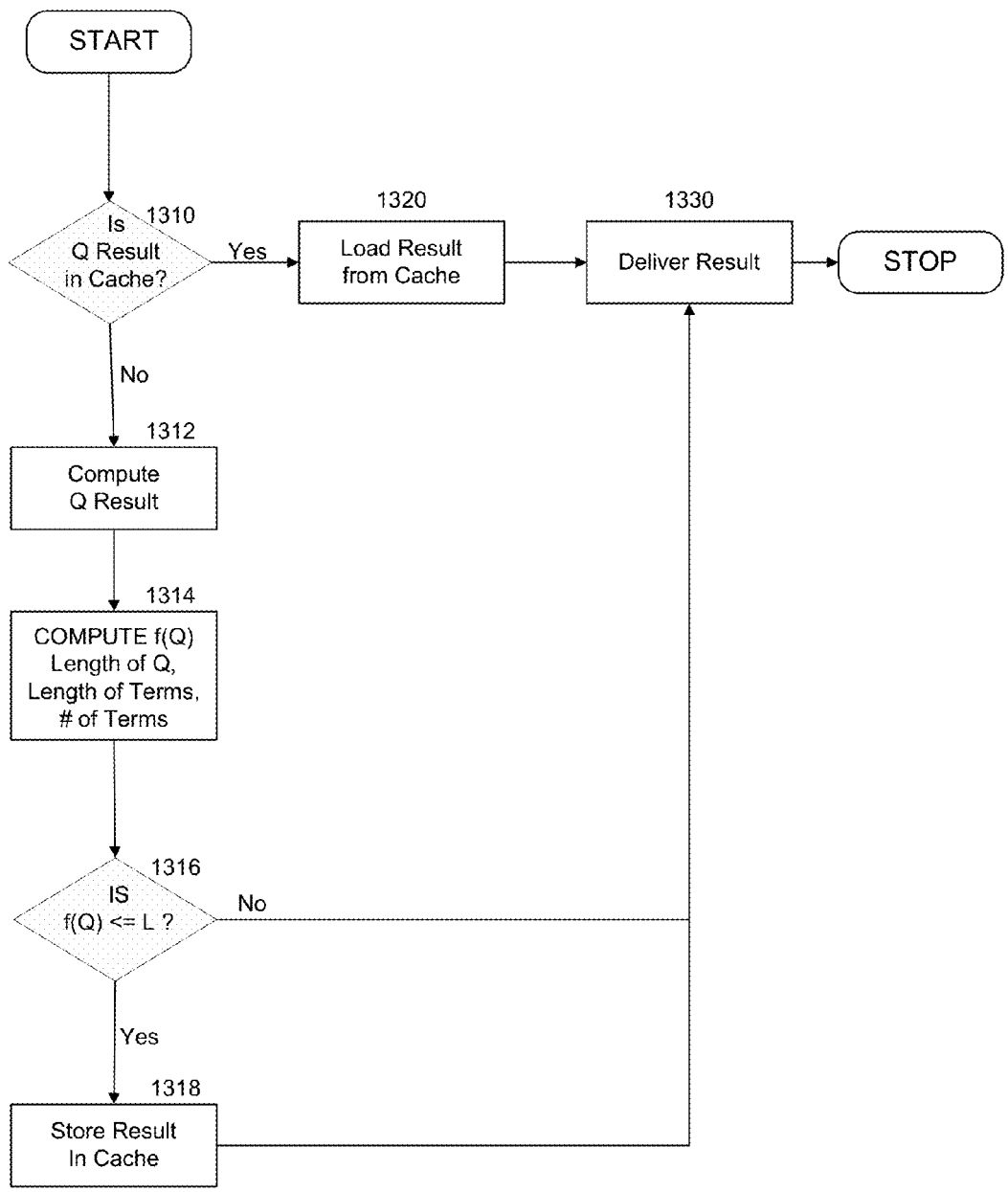
FIGS. 13A-13B are flowcharts illustrating processes for caching portions of queries to decrease the amount of time required to process similar future queries in accordance with some embodiments.

Turning to the query-processing embodiment illustrated in FIG. 13A, it can be assumed that the lists of record IDs corresponding to the prefixes in the query being processed have been retrieved from the index. In addition, the cache may or may not be preloaded with certain query result lists as noted above. The cache is inspected in step 1310 to determine whether it already contains the result list for the current query. If so, that cached query result list is loaded in step 1320 and the results are delivered to the user in step 1330. It should be noted that no further processing is required because the results were previously ranked.

In the event that step 1310 reveals that the result list for the current query had not previously been cached, then the result list for the current query is computed in step 1312 (including, as described above, the intersection of the lists of record IDs for each prefix and ranking of the result list). In addition, a function of this query is computed in step 1314. As noted above, that function might be as simple as returning the overall length of the query, or, in another embodiment, the function's value might be calculated by assigning a weight (eg, a multiplier) to that overall length, as well as to the number of prefix terms in the query and the length of those terms (and perhaps other factors potentially relevant to the overall processing time).

In any case, the value of this function is then compared in step 1316 to a predetermined threshold (L) to determine whether to cache the result list for the current query before the results are delivered to the user in step 1330. If the function does not exceed the predetermined threshold, then the result list is first stored in the cache in step 1318. In either case, the results are then delivered to the user in step 1330.

As noted above, regardless of whether the cache is preloaded, the decision as to whether the cache the results of processing a query can be based solely on the time required for that processing to occur. In other words, to avoid repeating a relatively lengthy query processing procedure should that same query occur in the future, the results can simply be cached if they exceed a certain processing time threshold.

Figure 13B:
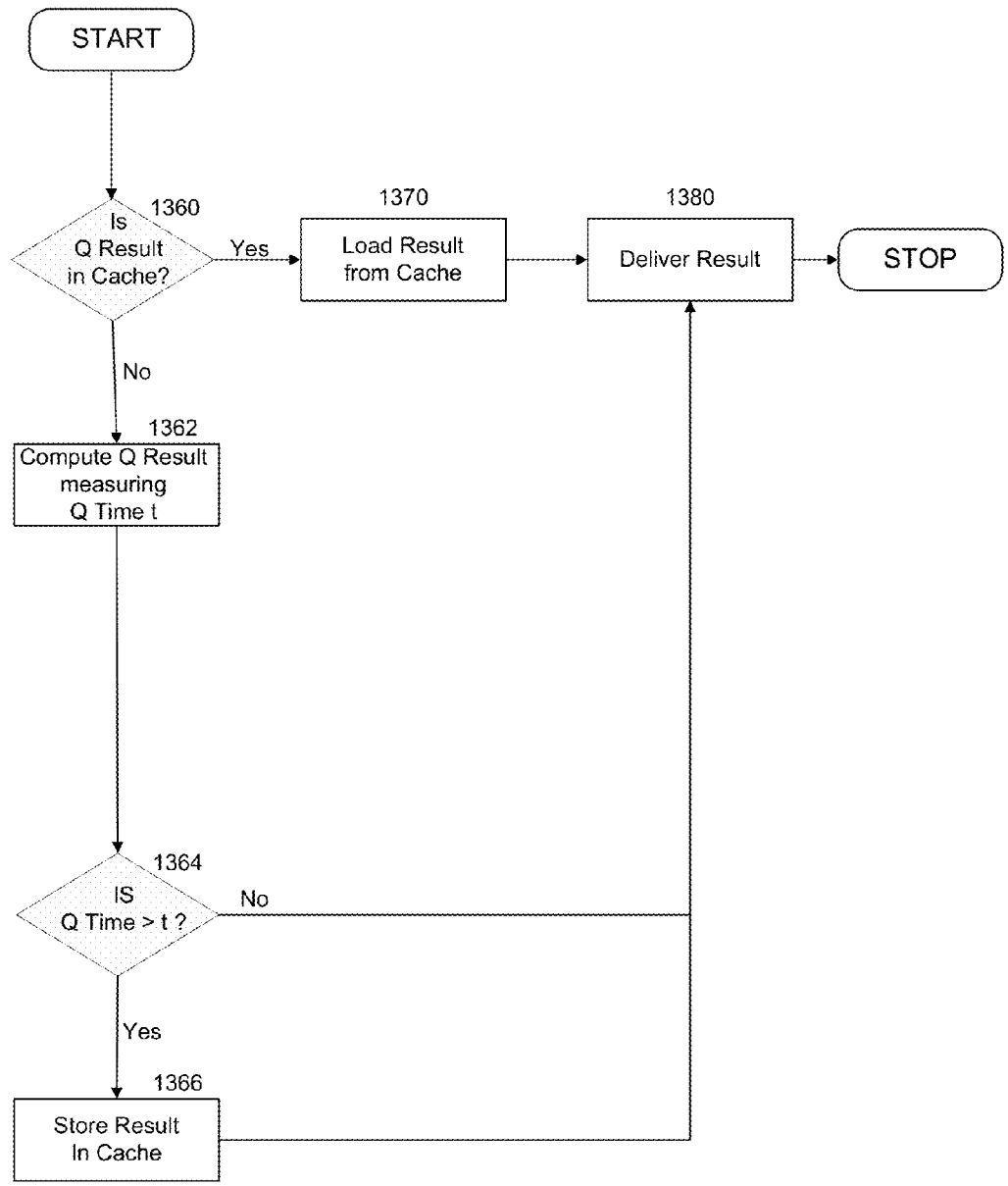

Turning to the query-processing embodiment illustrated in FIG. 13B, it can again be assumed that the lists of record IDs corresponding to the prefixes in the query being processed have been retrieved from the index, and that the cache may or may not be preloaded with certain query result lists as noted above. The cache is inspected in step 1360 to determine whether it already contains the result list for the current query. If so, that cached query result list is loaded in step 1370 and the results are delivered to the user in step 1380. As before, no further processing is required because the results were previously ranked.

In the event that step 1360 reveals that the result list for the current query had not previously been cached, then the result list for the current query is computed in step 1362 (including, as described above, the intersection of the lists of record IDs for each prefix and ranking of the result list), while measuring the overall time (eg, t seconds) required to process this query.

This overall time (t) is then compared in step 1364 to a predetermined threshold (T seconds) to determine whether to cache the result list for the current query before the results are delivered to the user in step 1380. If the query processing time (t) exceeds the predetermined threshold (T), then the result list is first stored in the cache in step 1366. In either case, the results are then delivered to the user in step 1380.

As noted above, relatively short prefixes (such as the single-letter prefixes) tend to correspond to relatively long lists of record IDs that require a significant amount of processing time to load into memory and intersect with other lists. Moreover, exponentially smaller lists can be generated by intersecting such lists with one another, in effect creating "hybrid prefix lists" that correspond to multiple prefixes. In this regard, the nomenclature "a~b" represents the hybrid list resulting from the intersection of the "a" and "b" single-prefix lists, which includes those records that contain both word(s) beginning with "a" and word(s) beginning with "b." As noted above with respect to the WorldCat data set, the list of record IDs corresponding to the single prefix "a" exceeded 60 million, while the query "a b" (equivalent to the hybrid prefix list "a~b") yielded a result list of fewer than 4 million IDs.

In addition to preloading the cache at query time with certain of these hybrid prefix lists (as well as single-prefix lists), significant performance improvements in overall query processing time can also be achieved by generating and including certain of these hybrid prefix lists in the index, and then identifying at query time relevant hybrid prefix lists from the current query (which, by definition, were previously generated and are thus stored in the index) and retrieving them from the index. As a result, the relevant hybrid lists need not be regenerated at query time, thereby avoiding the processing time otherwise required to retrieve and intersect multiple lists (eg, retrieving the "a" and "b" lists into memory, and then intersecting them to create the "a~b" list, as opposed to simply retrieving the "a~b" list from the index).

Because long-term disk storage space is available in relatively larger capacities and is relatively less expensive than is short-term memory (eg, RAM), a relatively larger number of combinations of these hybrid prefix lists can be precomputed and stored in the index (as compared with those that can be precomputed and stored in a memory cache). Cost-benefit analyses can be made on a case-by-case basis with respect to the particular data set being indexed in order to determine the relevant set of "slow" prefixes—ie, those prefixes that occur frequently in the data set and thus correspond to relatively long lists of record IDs that will require large amounts of query processing time to retrieve, intersect with other lists and rank.

Moreover, in one embodiment, a given amount of available disk space is used to determine the number of average-sized hybrid lists that can be added to the index. By generating and sorting all single-prefix candidate lists at index time, and selecting the longest N lists as "slow" candidates for hybridization, these N lists can be intersected with one another to yield approximately N(N−1)/2 hybrid ("faster") lists. In other embodiments the square of N is used for simplification. In other words, for a given amount of disk space, one can determine the number N of longest "slow" list candidates to select for hybridization at index time. At query time, any such "slow" prefix terms can be extracted from the query and combined with any other "slow" prefix term to create a hybrid prefix whose corresponding list has already been precomputed and stored in the index. These hybrid prefix lists can be extracted from the index, along with the remaining single-prefix lists present in the query, and then simultaneously intersected to generate a result list that can be ranked for delivery to the user.

For example, for a large library catalog data set containing roughly 150 million records, the relevant set of "slow" prefixes might include certain prefixes that are common to this particular data set, such as "book" (as well as "boo" and "bo" and "b"), "19" and "1" (due to the common publication year "19xx"), "fiction" (and its prefixes), "non" (and its prefixes, "by" (and its prefixes, typically preceding the list of authors), etc.

These particular "slow" prefixes can be combined, for example, with the single-letter prefixes (which can also be combined with one another) to generate hybrid prefix lists that are exponentially smaller than their single-prefix counterparts. It should also be noted that hybrid prefixes that share a common prefix (eg, "1~1" or "by~b") need not be generated, as they would yield the same list as the longest single-prefix component. As will be discussed in greater detail below, however, certain of these "repeated" hybrid prefixes can be redefined to be useful in the context of identifying records containing multiple instances of a prefix.

Figure 14A:
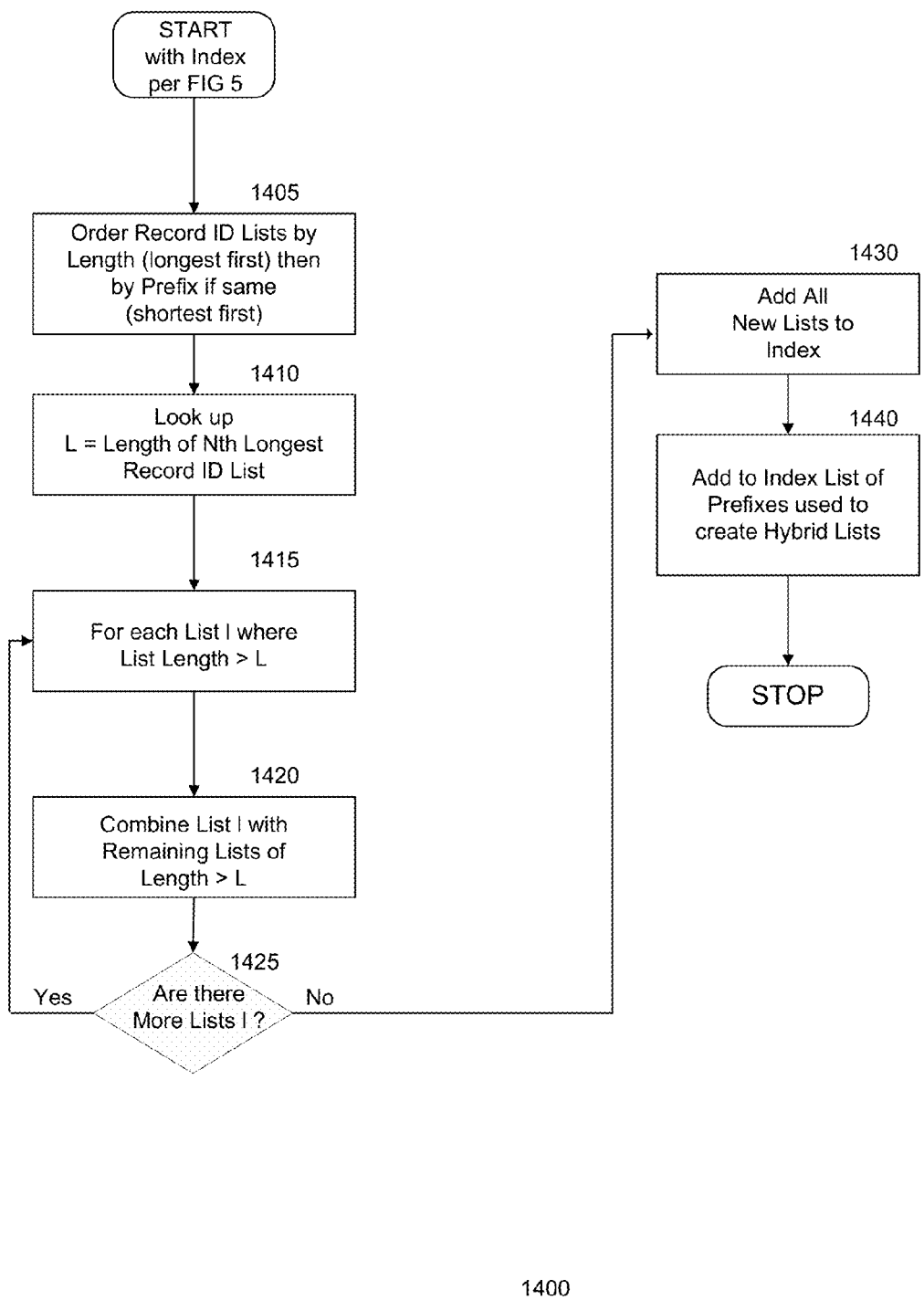
FIGS. 14A-14B are flowcharts illustrating processes for generating and utilizing hybrid lists representing records that match combinations of multiple query prefixes in accordance with some embodiments.
Figure 14B:
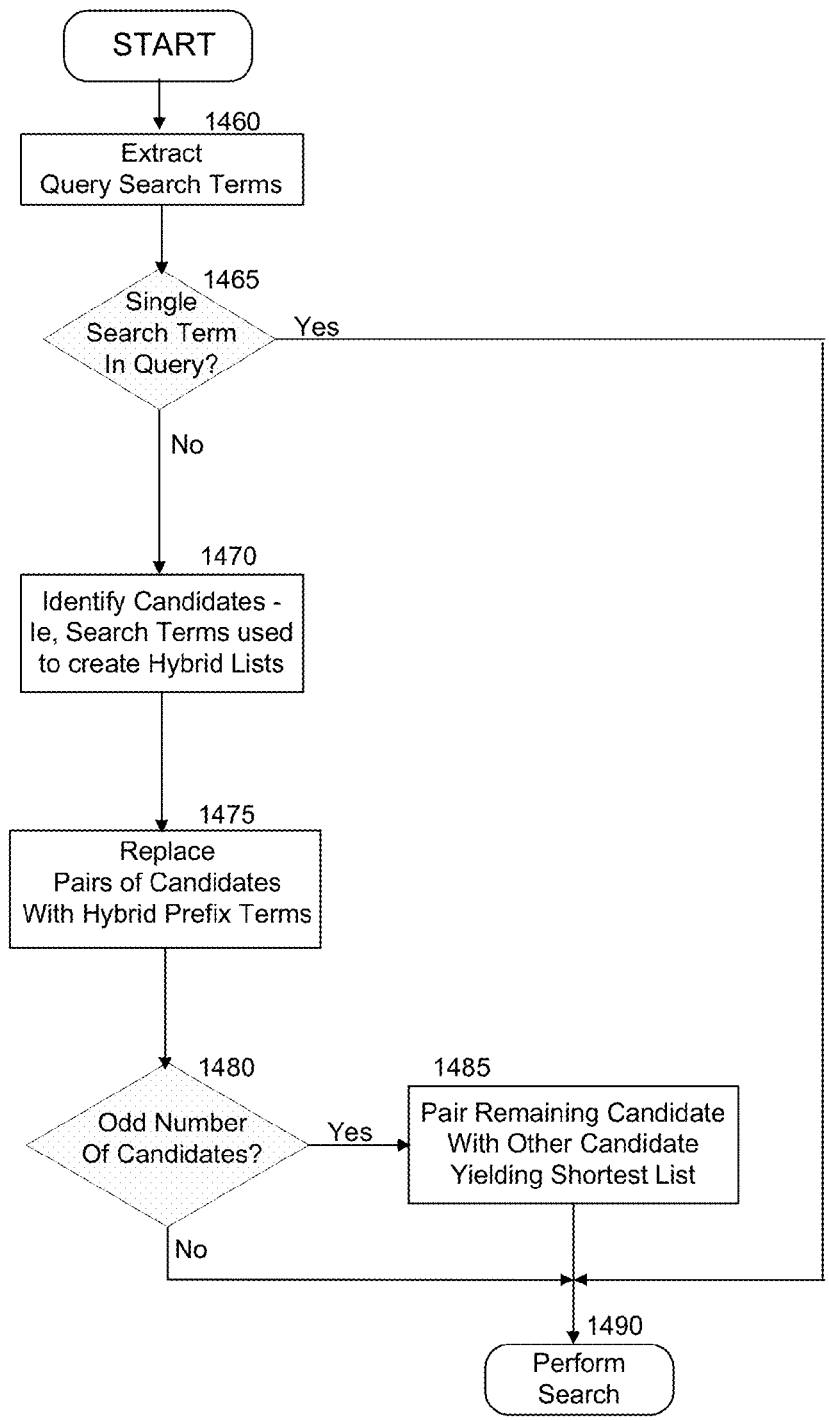

To implement hybrid prefixes in one embodiment, hybrid prefix candidates are selected (eg, as noted above from the N longest single-prefix lists, and perhaps also including all single-character prefixes) and intersected with one another to generate a set of hybrid prefix lists, which are then added to the index along with the single-prefix lists, as illustrated in FIG. 14A. The "~" character is used to distinguish single-prefix from hybrid-prefix lists. At query time, as illustrated in FIG. 14B, hybrid prefixes are generated from the current query by identifying, extracting and combining "slow" hybrid prefix candidates whose corresponding hybrid prefix lists can be loaded into memory from the index, and then intersected with the remaining single-prefix terms from the query to generate a result list that is then ranked for delivery to the user.

It should be noted that, in one embodiment, the ranking of a prefix in a record is the index of the first word in the record to which the prefix corresponds. For example, the prefix "h" in the record "mary had a little lamb" would have a rank of 2 because it matches the second word in that record. In one embodiment, the rank for hybrid prefixes is the same as the rank for the first component prefix of the hybrid prefix. For example, the hybrid prefix "a~1" would have a rank of 3 for that same record (where "a" had a rank of 3 and "1" had a rank of 4). In other embodiments, both ranking entries (3 and 4) are maintained in the list. Ranking optimizations are discussed in greater detail below.

Turning to the hybrid prefix list generation indexing embodiment illustrated in FIG. 14A, it can be assumed that all single-prefix lists of record IDs have already been generated and sorted (as described above), at which point these lists are ordered by length in step 1405, with the longest lists first (and then shortest prefix first for equal-length lists). The length (L) of the Nth longest list is identified in step 1410 (eg, as noted above, where N is determined based upon the available disk space for hybrid lists to be added to the index), and each list (i)

(looping at step 1415 from i=1 to N) is intersected (paired in this embodiment) in step 1420 with each of the remaining ((i+1)th to Nth) lists having a length greater than L.

For example, if there are 100 hybrid candidate (single prefix) lists, each having a length greater than 1000 records (eg, the smallest hybrid candidate, the $100^{th}$ list, might contain 1003 records, while the largest hybrid candidate, the $1^{st}$ list, might contain 50,000 records), step 1420 would initially involve the intersection of the $1^{st}$ list with the $2^{nd}$ list, the $1^{st}$ list with the $3^{rd}$ list, ... and the $1^{st}$ list with the $100^{th}$ list. The next time through the loop, it would involve the intersection of the $2^{nd}$ list with the $3^{rd}$ list, the $2^{nd}$ list with the $4^{th}$ list, ... and the $2^{nd}$ list with the $100^{th}$ list, and so on until the $99^{th}$ list is intersected with the $100^{th}$ list.

In another embodiment, this process could continue (eg, the first time through the loop) until none of the hybrid lists involving the $1^{st}$ list had a length exceeding L. For example, if the hybrid list resulting from the intersection of the $1^{st}$ list and $2^{nd}$ list had a length exceeding L, that list might be further intersected (ie, a hybrid triple) with the $3^{rd}$ list, and so on, until its length no longer exceeded L. One problem with this alternative approach, however, is that the number of lists, and thus the utilization of disk space, can become unwieldy. Moreover, it is typically the case that the intersection of two lists results in a significantly shorter list, thus making this approach of relatively limited value in most cases.

Continuing, however, with the current embodiment, at step 1425, a determination is made as to whether more lists remain to be processed (i.e., incrementing i and determining whether it yet equals N) and, if so, repeating the loop at step 1415. Once all hybrid lists have been generated (ie, all combinations of hybrid candidate lists with one another), then these hybrid lists are added to the index in step 1430.

The list of the hybrid prefix candidates (ie, the list of "slow" prefixes whose corresponding single-prefix lists were used to generate the hybrid prefix lists) is then added to the index in step 1440 for use at query time. At this point, the index includes not only single-prefix lists of record IDs, but hybrid prefix lists as well, in addition to a list of "slow" prefixes that were used to create such hybrid prefix lists. At query time, as illustrated below with respect to FIG. 14B, the list of "slow" prefixes is utilized to determine whether a query prefix term is a "slow" prefix that should be combined with another "slow" prefix from the query to create a hybrid prefix whose corresponding hybrid prefix list can be loaded from the index (rather than recomputed by loading multiple single-prefix lists into memory and intersecting them).

Turning to the hybrid prefix query embodiment illustrated in FIG. 14B, it can be assumed that the index includes single-prefix lists of record IDs and the hybrid prefix lists generated during indexing, as well as the list of "slow" prefixes used to generated the hybrid prefix lists. The individual query terms are extracted from the query in step 1460.

Instead of simply intersecting lists from the index corresponding to the single-prefix terms of the query, the purpose of this process illustrated in FIG. 14B is to identify pairs of "slow" single-prefix terms in the query (ie, those on the list of "slow" prefixes that was used to create the hybrid prefix lists in the index) and combine them to be replaced by hybrid lists from the index, which can then be intersected (in parallel) with one another and with any remaining (non-"slow") single-prefix lists to generate a result list that can be ranked and delivered to the user as discussed above.

Before identifying these "slow" single-prefix terms, the query is analyzed in step 1465 to determine whether the query contains only one prefix term. If so, the search can be performed in step 1490 by simply loading the list of record IDs corresponding to that sole prefix term (ie, the result list), ranking that list and delivering the results to the user as discussed above.

If, however, the query contains more than one prefix term, each prefix term is compared against the list of "slow" prefixes in the index in step 1470 to determine which of these prefix terms is on that list, and is thus a "candidate" for hybridization. At this point, each of these hybrid candidate prefix terms is paired with another such candidate in step 1475. Each such pair will identify a hybrid list that can be loaded from the index (effectively replacing the pair of "slow" prefix terms) and intersected in parallel (together with the lists from the index corresponding to the remaining "non-slow" single-prefix terms in the query) to generate a result list as discussed above.

However, various additional optimizations of this pairing of hybrid candidates can be performed in step 1475—ie, to select the pairs that will ultimately yield the result list in the shortest amount of time. All pairings will yield the same results, but some may do so faster than others. For example, all possible pairings could be considered, and those yielding the shortest average hybrid lists could be chosen. Or perhaps the pairings that generate the single shortest hybrid list could be chosen, or the pairings that yield the shortest "longest hybrid list."

Regardless of how this pairing process is performed in step 1475, each such pairing will yield a hybrid list that can be loaded from the index—by definition, because the lists corresponding to every combination of the "slow" prefixes were intersected to generate a hybrid list stored in the index, as discussed above with respect to FIG. 14A.

However, if step 1480 reveals that there are an odd number of these hybrid candidate prefix terms, then one such candidate will remain after the others have been paired. If so, then that remaining candidate is paired in step 1485 with any of the other hybrid candidates (even though all of them have already have been paired with another candidate). In one embodiment, that remaining candidate is paired with whichever other candidate yields the shortest list. Given the relatively small number of prefix terms (much less "slow" prefix candidates) in most queries, the performance penalty associated with conducting multiple such comparisons is relatively small.

After having generated all hybrid prefix pairings (including any odd candidate), the search can be performed in step 1490 by loading from the index the lists of record IDs corresponding to these hybrid prefixes (and to the remaining single prefix terms), intersecting these lists in parallel as discussed above to generate the result list, ranking the result list and then delivering the results to the user.

One wrinkle (alluded to above) involves the problem of queries containing "repeated" prefixes. For example, the query "m t m" (eg, seeking records relating to "Mary Tyler Moore") must retrieve records that contain multiple (in this case, 2 or more) words beginning with the "m" prefix. Yet, if the list of record IDs generated for the single prefix "m" is simply intersected with itself, it will retrieve the same list, ie, a superset list of the desired list (because it may include records that do not contain 2 words beginning with the "m" prefix).

One optimization that addresses this problem is to generate hybrid lists at index time to reflect all repeated instances of each prefix within a given record. For example, in one embodiment, the hybrid prefix "m~m" reflects the second occurrence in a record of a word beginning with the "m" prefix. This process is discussed in greater detail below with respect to FIG. 15A. At query time, the query is parsed not only (as discussed above) to replace "slow" single-prefix query terms with hybrid prefixes, but also to replace repeated single-prefix query terms with repeated hybrid prefixes (eg, "m~m", "m~m~m", etc) that are used to select hybrid lists to be loaded from the index (if present) and intersected in parallel to generate a result list from which ranked results are delivered to the user. This process of parsing the query to generate these repeated hybrid prefixes is discussed in greater detail below with respect to FIG. 15B.

Figure 15A:
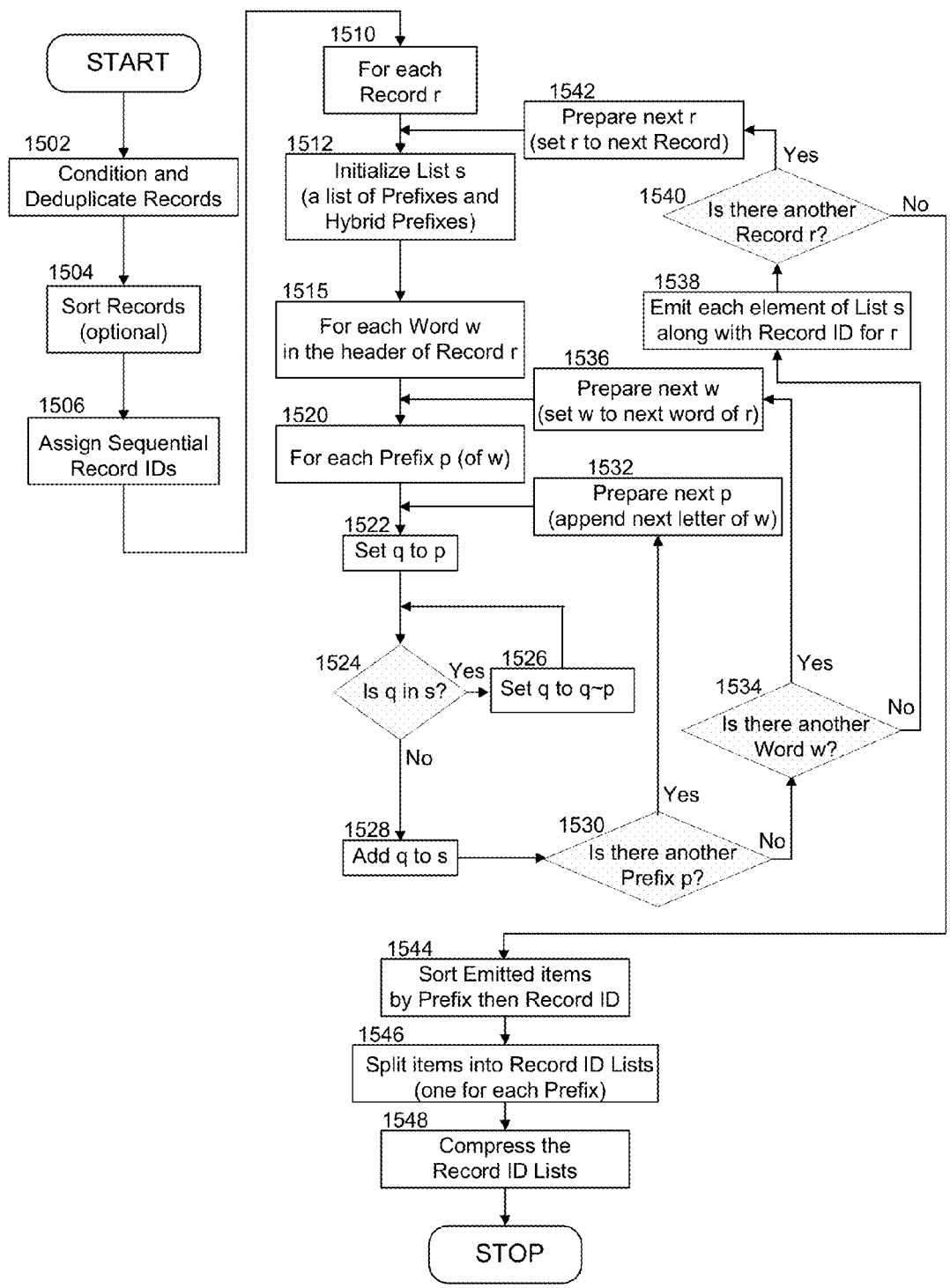
FIGS. 15A-15B are flowcharts illustrating processes for generating and utilizing hybrid lists representing records that match combinations of multiple repeated query prefixes in accordance with some embodiments.

Turning to the repeated hybrid prefix list generation indexing embodiment illustrated in FIG. 15A, the records are initially conditioned and deduplicated in step 1502, and optionally sorted in step 1504, as explained above with respect to respective steps 502 and 504 of FIG. 5. They are also assigned sequential IDs in step 1506, which can be used for ranking purposes in the event the records are not sorted in step 1504.

Each record (r) is then processed in a loop beginning with step 1510, for which a list (s) is initialized in step 1512 that will contain a list of all single and hybrid prefixes found in the words in that record. Each word (w) within the headers of the current record (r) is then processed in an inner loop beginning with step 1515. Each prefix (p) within the current word (w) is then processed in yet another inner loop beginning with step 1520 (starting with the first character of that word).

Hybrid prefix (q) is initialized to prefix (p) in step 1522, and is then used to accumulate a repeated hybrid prefix if necessary. For example, if the letter "b" was a prefix found in the first word ("big") of a particular record, and was added to list (s), and was then also found in a subsequent word ("ball") of that record, the hybrid prefix (q) would be generated while processing the first letter of that subsequent word (ie, transforming the value of (q) from "b" to "b~b") once it was recognized that the prefix "b" was already present in list (s)—ie, because it had been added while processing the first word ("ball") of that record. These steps are explained below.

Hybrid prefix (q) is processed in step 1524 by searching to determine whether it is present in list (s). If it is present (as "b" was present in the example above), then hybrid prefix (q) is transformed in step 1526 by appending to it the tilde character ("~") and the current prefix (p)—just as "b" was transformed into "b~b" in the example above. Steps 1524 and 1526 are then repeated with respect to this newly transformed hybrid prefix (q) until it is no longer found in list (s).

In other words, continuing our example above, if a subsequent word of the record ("bounce") was being processed, the single prefix "b" and the hybrid prefix ("b~b") would already be present in list(s)—ie, because they were added while processing the words "big" and "ball" respectively. As a result of processing the word "bounce," the hybrid prefix (q) would be initialized to "b," then transformed into "b~b" (upon finding "b" in list (s)), and finally transformed into "b~b~b" (upon finding "b~b" in list (s)) which would not yet be present in list (s).

Eventually, however, this hybrid prefix (q) will not be found in list (s) at step 1524, and will be added to list (s) in step 1528. It should be noted that single prefixes will also be added in step 1528—eg, while processing the first occurrence of a word in a record that begins with that single prefix (such as the prefix "b" first encountered in the word "big" or the prefix "ba" first encountered in the word "ball" in the example above).

After adding the single or hybrid prefix to list (s) in step 1528, the next prefix, if any, of the current word (w) is processed. Continuing with our example, while processing the first character (prefix) "b" of the first word "big," the initial prefix "b" is added to list (s). Because additional characters of that word have yet to be processed, the next prefix "bi" is processed, later followed by the final prefix "big," at which point no more characters remain and the next word will be processed.

This search for remaining characters (and thus prefixes) in the current word occurs at step 1530. If a next character is present, it is appended to prefix (p) in step 1532, and processing returns to step 1522 where hybrid prefix (q) is set equal to prefix (p) so that this next (longer) prefix can be processed as discussed above. In other words, this longer prefix (or perhaps a hybrid prefix generated therefrom) will be added to list (s) in step 1528, and this processing of word (w) will continue until all of its characters have been processed, at which point the next word (w), if any, of record (r) will be processed.

The search for remaining words in the current record (r) occurs in step 1534. If a next word is present, then word (w) is set to that next word in step 1536, and processing returns to step 1520 where new word (w) is processed starting with the first character (prefix) of that word (w), as described above. If no more words are present in the headers of the current record (r), then the processing of that record is almost complete.

The index is then updated in step 1538, by updating the list of prefixes (including hybrid prefixes) for the entire set of records covered by the index. In other words, if a prefix of list (s) was not yet present in that list, it is added to the list. If it was present, a new entry is generated, including the record ID of current record (r) and a ranking offset—ie, the position within record (r) of the word corresponding to that prefix entry (eg, "4" if the first occurrence of a word beginning with that prefix is the $4^{th}$ word of that record). In addition, any "slow" single prefixes can also be replaced with lists of corresponding hybrid prefixes as discussed above with respect to FIG. 14A.

It should be noted that, for repeated hybrid prefixes, the ranking offset will correspond to the nth occurrence of a word beginning with that hybrid prefix. In other words, the prefix "m" might have a rank of 4 if the $4^{th}$ word of the record is the first occurrence of a word beginning with "m," while the repeated hybrid prefix "m~m" might have a rank of 7 if the $7^{th}$ word of the record is the second occurrence of a word beginning with "m" (and so forth for as many repeated instances of a word beginning with "m" as are present in the record). In another embodiment, the list corresponding to a hybrid prefix (eg, "m~m") could contain multiple entries (repeating the same record ID) associated with the multiple occurrences of a word having that prefix within a given record.

After updating the index, and completing the processing of the current record (r), the search for remaining records in the data set occurs in step 1540. If remaining records exist, then record (r) is set to the next record in step 1542, and processing returns to step 1512 where list (s) is reinitialized for use with new record (r), which is processed as described above.

Once all records in the current data set have been processed, the index is sorted in step 1544 by prefix, and by record ID within each prefix. The index is then split in step 1546 into separate lists of record IDs for each prefix. Finally, each record ID list is compressed in step 1548 (using any of various well-known compression techniques). A table of contents (TOC) is then created as described above with respect to FIG. 6.

Figure 15B:
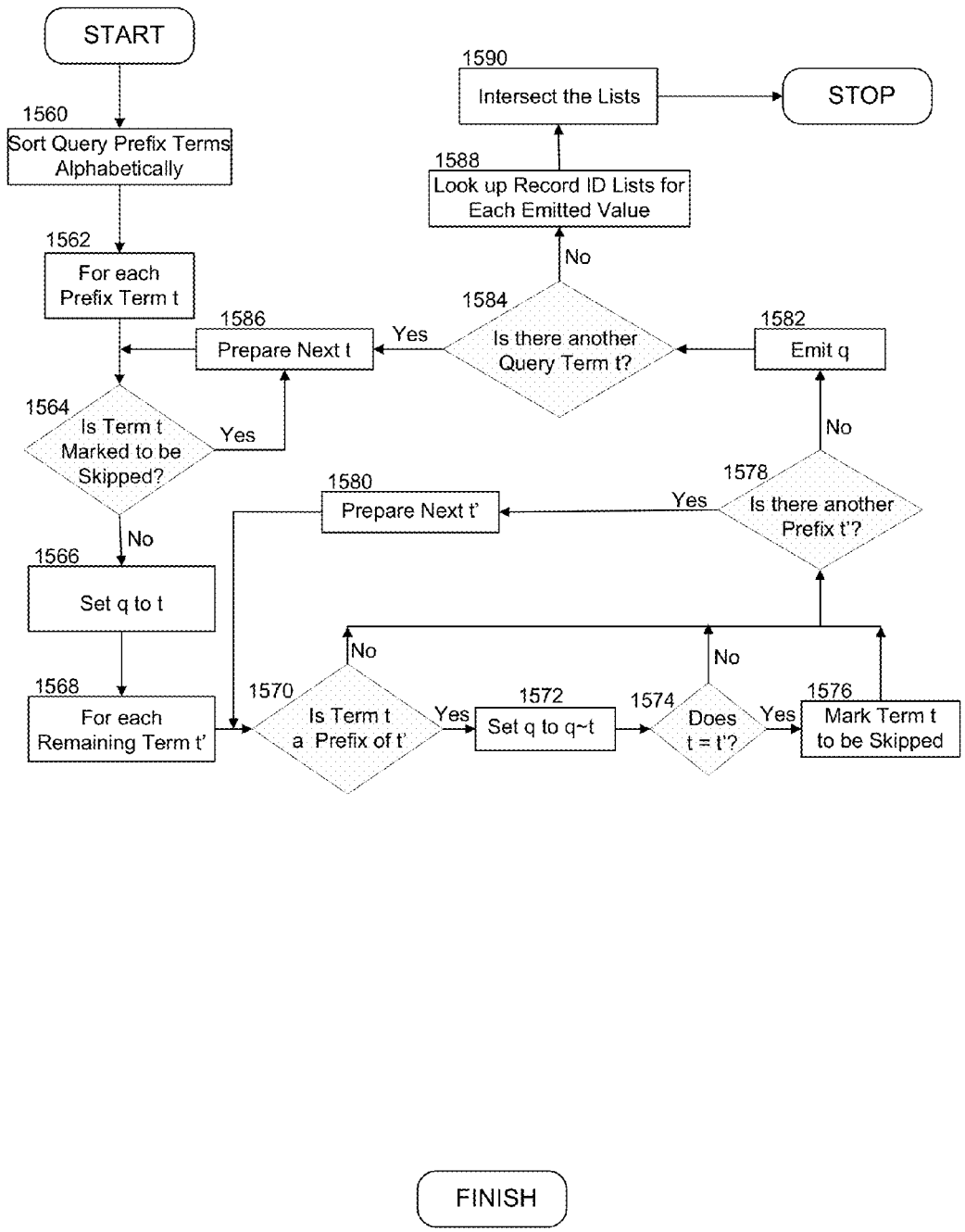

At query time, queries are parsed, in one embodiment, not only to replace "slow" single-prefix query terms with hybrid prefixes (as discussed above), but also to replace repeated single-prefix query terms with repeated hybrid prefixes (eg, "m~m", "m~m~m", etc) that are generated and used to search the index, as shown in the repeated hybrid prefix query embodiment illustrated in FIG. 15B.

The query is parsed into separate prefix terms which are sorted alphabetically in step 1560. As will become clear, this alphabetical sorting facilitates the determination of which prefix terms are prefixes of other prefix terms, indicating the existence of a "repeated" prefix in the query (ie, the search for records having multiple occurrences of words beginning with the same repeated prefix). Each prefix term (t) is processed in a loop starting at step 1562.

The prefix term (t) is checked in step 1564 to determine whether it has been marked to be skipped—ie, whether an identical prefix term exists in the query, in which case such repeated prefix terms were already used to construct a repeated hybrid prefix term which reflects multiple occurrences within a record of words having that prefix.

If the prefix term (t) was not marked to be skipped, then the query (q) is set to that term (t) in step 1566. Then, that term (t) is compared to each remaining prefix term in the query in a loop beginning with step 1568. The prefix term (t) is compared in step 1570 to the next remaining prefix term (t') to determine whether term (t) is a prefix of term (t'). If so, then a repeated prefix exists in the query, and a tilde (~) followed by the prefix term (t) is appended to the query (q) in step 1572. Moreover, If that next prefix term (t') is found to be identical, in step 1574, to the prefix (t) being processed, then the prefix (t) is marked to be skipped in step 1576 (ie, when that next prefix term (t') is processed and compared to all subsequent prefix terms in the query).

Otherwise, if the prefix term (t) is not identical to the next prefix term (t'), or is not a prefix of that term, then the processing of prefix term (t) continues in step 1578 by determining whether there exists another subsequent prefix term (t'). If so, then t' is set to that next prefix term in step 1580, and processing resumes at step 1570 to determine whether prefix term (t) (still being processed) is a prefix of that next remaining prefix term t'.

Eventually, after prefix term (t) has been compared to all remaining subsequent prefix terms (t'), then no remaining prefix terms will be found in the query in step 1578. At that point, the query (q) is emitted in step 1582, effectively saving either that single prefix term (t), or a repeated hybrid prefix term (t') to be used in its place, to load a corresponding list from the index once all prefix terms of the query have been processed.

Having processed prefix term (t) by comparing it to all subsequent prefix terms (t') in the query, the query is further analyzed in step 1584 to determine whether any subsequent terms exist in the query. If so, then the next prefix term (t) is prepared for processing in step 1586, and processing returns to step 1564 to determine whether prefix term (t) has been marked to be skipped (ie, whether an identical prefix term (t) has already been processed and replaced with a repeated hybrid prefix term). This new prefix term (t) will be compared with all subsequent prefix terms in the query as discussed above until no unprocessed prefix terms remain in the query.

At that point, each single or repeated hybrid prefix term emitted in step 1582 is used in step 1588 to load its corresponding list of record IDs from the index, which are (as discussed above) intersected in parallel in step 1590 to generate a result set of record IDs that is ranked and delivered to the user.

It should be noted that skipped prefix terms (ie, those replaced by repeated hybrid prefix terms) may also be used at this point to load corresponding lists from the index. Although these lists will not alter which record IDs are present in the result list, they could impact the subsequent ranking of those records in the result list. Alternatively, as noted above, the list in the index corresponding to a hybrid prefix (eg, "m~m") could contain multiple entries (repeating the same record ID) associated with the multiple occurrences of a word having that prefix within a given record. In any event, sufficient information is available in the index to enable the records in the result list to be ranked in accordance with a desired ranking scheme.

Another set of optimizations relates to the issue of ranking or ordering the records in the result set before delivering the results to the user. These optimizations involve both index-time and query-time modifications to the processes discussed above. Table 0 below highlights some of these ranking concerns, by illustrating a result set of 5 records as delivered to the user after implementing certain ranking optimizations discussed below.

For example, without these optimizations, a query of "twain" might have resulted in a ranking of these 5 resulting records as 2, 2, 7, 10 and 2, based on the position of the word (prefix) "twain" within each record, and thus would have resulted in a different ordering than is illustrated in Table 0. In fact, books about Mark Twain would generally be ranked ahead of books by Mark Twain, which may not be the desired result.

One optimization involves a prioritized set of factors used for ordering the records in a result set. For example, if the top 20 results will be displayed to the user, then the first factor would be applied to generate the top 20 results from the result list. Any of those results which are equal with respect to this first factor would be further ordered based on the second factor, and so on, until all 20 results are distinguished from one another (or, if still equal, simply left in the order in which they were extracted from the index, or ordered alphabetically, etc).

In one embodiment, there exist 4 such factors which, in prioritized order, include: (1) Number of Adjacent Pairs of Query Prefix Terms (ie, the number of adjacent query prefix terms that are prefixes of adjacent words in each record of the result set; (2) GPS or related "geographic proximity" of a record (eg, from a data set of restaurants) to a known geographic location (eg, a specified geographic location, such as an address or a zip code, the present location of a mobile device, etc); (3) Positional Ranking of a record based on the position of the words matching the prefix query terms relative to the beginning of the record and/or the beginning of one or more fields of the record; and (4) Popularity of a record based on external information (eg, the popularity of songs in a data set, book sales or availability in multiple libraries, articles that are most frequently updated over time, etc). In other embodiments, these (and other) factors can be weighted and a function of these weighted factors can be computed and used as a single ranking criterion.

These factors will be discussed in reverse priority order, beginning with Popularity, which, in one embodiment, only comes into play in the ranking process with respect to records that score equally with respect to the other 3 higher priority factors. For example, in a data set of song titles, various publicly available measures of each song's popularity can be stored in the index and extracted to distinguish and rank those records of the result set which are otherwise equally ranked after consideration of the other higher priority factors. Similarly, articles from the English Wikipedia data set could be distinguished based upon the frequency of their revision over time (ie, an indirect measure of public popularity). A nationwide or worldwide library catalog data set could utilize the number of libraries (or other locations) at which each title is available as a rough measure of each title's popularity. English-language titles could be given preference (at least for queries originating in English-speaking countries), or the title having the most recent year of publication could be deemed the most "popular" title. It should be noted that the measure of popularity employed will typically be targeted to the particular data set being indexed.

Turning to the Positional Ranking factor, this factor, in one embodiment, involves simply determining the lowest offset into the record of any word having as a prefix one of the prefix search terms. For example, looking at the first record in Table 0, that record could have resulted from a "finn twain" query. The record would have a rank of 2 (second word in the record) with respect to the prefix term "twain" and a rank of 6 with respect to the prefix term "finn." In one embodiment, the rank could simply be computed as the lowest of such rankings (ie, 2). It should also be noted that, in this embodiment, the initial occurrence of the word in the record was used to determine the rank stored in the index.

One problem with this methodology, however, is the fact that data sets, such as those illustrated in Table 0, often contain "structured data" that is regularly divided into "fields" of data, such as titles, authors, genre, publisher name, year of publication, etc. As noted above, storing a word's offset into a record, as opposed to its offset into a particular field of that record, may yield unintended results. One solution to this problem is to delimit the fields of a record and assign periodic ranking values (eg, 10, 20, 30, etc) to the delimiters (using relative position to determine intra-field ranking, and essentially "padding" the fields to avoid accidental adjacency across fields). Alternatively, individual fields could be ranked relative to one another by assigning the delimiter ranking values accordingly or utilizing different types of delimiters (eg, to equate multiple author fields to one another, but rank them higher than a "publication year" field).

In short, by taking into account intra-field position and relative inter-field importance, this Positional Ranking factor will better reflect the intentions of the user initiating the query. Accidental adjacency across fields can be avoided. Moreover, the relevant importance of fields can be distinguished based upon the particular data set being searched. Yet, as will be discussed below, other factors beyond Positional Ranking are, in some embodiments, of even greater importance.

The GPS (or geographic proximity) field is particularly useful with respect to certain types of data sets. It may have no meaning, however, with respect to other data sets, such as a library catalog database of books, as illustrated in Table 0. Yet, for a domain of restaurants, users may be particularly interested in those restaurants that are closest to a pre-specified geographic location (eg, a particular zip code or address), or to the user's current location—eg, as indicated via a GPS device on the user's mobile phone. In one embodiment, a separate table is maintained with entries for each record containing corresponding GPS (latitude/longitude) information. While processing a given record of the result list, the relevant corresponding entry is retrieved from this table, the distance to the reference location is calculated and added to the record's entry in the result list, and a heap is employed (as discussed above) to process the result list moving the "best" record (eg, the one closest to the reference point) to the top of the heap. The best N elements are then extracted from the top of the heap and delivered to the user.

Finally, the "Number of Adjacent Pairs of Query Prefix Terms" is considered. This factor is (in one embodiment) prioritized above the others because most queries include relatively few (typically one or two) prefix terms. As more terms are added to a query, adjacent query prefix terms tend to yield results with adjacent words having those prefixes (eg, first and last names, common phrases, etc). Yet, other records may inadvertently be included simply because they contain words having all of the query prefix terms, and even at early positions within the record or a field of the record. This factor will distinguish such inadvertently included records with a level of effectiveness that improves dramatically as the number of query prefix terms increases.

Turning to Table 0, it is evident that a query "twain" would rank these 5 records relatively high, as they all include "Mark Twain" in either the title or author fields. Additional query terms (eg, "Mark Twain Huck Finn") would further distinguish certain records in the result set, moving those whose titles included "Mark Twain" and/or "Huckleberry Finn" or whose authors included "Mark Twain" to higher ranked positions, while moving other records to lower ranked positions (such as books about "Huckleberry Finn" by authors coincidentally having the first name "Mark," or other such inadvertent matches of the query term prefixes).

In one embodiment, the scoring based on this factor is simply the number of adjacent prefix query terms yielding adjacent corresponding words. For example, for the query "Mark Twain Huck Finn," the scoring would either be 0, 1, 2 or 3, with a point contributed for each adjacent pair of terms— "Mark Twain," "Twain Huck," and "Huck Finn". This factor alone accounts for much of the ranking process in this embodiment.

However, to the extent records scored equally with respect to this factor, the next factor (GPS) would then be considered, if relevant to the data set being searched. When relevant, this factor is also of particular importance (eg, when searching for the closest "Starbucks" locations while traveling, and relying on the user's mobile phone GPS unit). It is unlikely that the next two factors will even be considered when the GPS factor is relevant.

When the GPS factor is not relevant, the Positional Ranking factor will likely move records such as the 5 records shown in Table 0 toward the top of the list. Yet, the 5 records shown in Table 0 score equally with respect to this factor (ie, all scoring 2 due to the position of "Twain" in either the title or author fields of each record). This is where the final factor of "Popularity" comes into play.

As noted above, this could reflect any notion of popularity relevant to the particular data set involved. In one embodiment, that includes the availability of the referenced book (eg, in the most number of libraries). In another embodiment, it could include the most recent publication year. In any event, at this point, if the user is not satisfied with the results, an additional query search term is very likely to yield a more desirable ranking

TABLE 0

Mark Twain's Adventures of Huckleberry Finn: a documentary volume by Tom Quirk
Detroit: Gale Cengage Learning, c2009.
Book: Bibliography; English
Mark Twain on the move: a travel reader by Mark Twain; Alan. Gribben; Jeffrey Alan Melton
Tuscaloosa: University of Alabama Press, c2009.<br>Book:
Bibliography; English
Life on the Mississippi by Mark Twain; Justin. Kaplan
New York, N.Y.: Signet Classics, 2009.
Book: Bibliography; English
A Connecticut Yankee in King Arthur's court by Mark Twain
Waterville, Me.: Kennebec Large Print, 2009.
Book: Fiction; English TABLE 0-continued Mark Twain and the river by Sterling North
New York: Puffin Books, 2009.
Book: Biography; English Another ranking optimization involves moving the ranking process inside the "inner loop" (where multiple lists are retrieved into memory and intersected in parallel), as opposed to ranking the records in the result list after it has been generated by intersecting the multiple lists. In one embodiment, while generating (in the "inner loop") the record IDs that are present in all of the lists being intersected, the ranking calculation (regardless of which factor or combination of factors is being calculated) is performed.

In this embodiment, the heap priority is reversed, with the "worst" record being placed on the top of the heap. Moreover, the size of the heap is limited to the number of results desired by the user (eg, 20 records if the 20 "best" resulting records will be displayed). This is in contrast to the heap process that derives the 20 best results from the (already generated) results list, which would employ a heap the size of the (typically much larger) entire results list.

As each new result is generated, it is compared to the record at the top of the heap, which contains the currently lowest-ranked result in the heap. If the new result ranks even lower, then it is discarded. Otherwise, it replaces the result at the top of the heap, and the heap is rebalanced.

Thus, the heap will remain at a small constant size (eg, 20 records), minimizing the performance impact of rebalancing the heap, and many results will be discarded after a single comparison (with the record at the top of the heap). Moreover, a significant number of memory/disk accesses will be eliminated. A smaller heap, for example, has a better chance of being stored completely in a processor's L1 cache, thereby significantly reducing overall processing time.

III. Dynamic Menus

As noted above, a consistent search mechanism, particularly one that employs variations of the interactive, multi-prefix and multi-tier techniques described above, facilitates targeted searches in a mobile communications environment by reducing the requirements for user interaction and data entry, which in turn reduces the use of local processing and network bandwidth resources. As also noted above, results of these targeted searches are often organized into lists of "records" that share common attributes or "fields" (from train schedules and movie times to famous people, places and events, to restaurant addresses and phone numbers, and various other diverse types of relatively structured information).

As a result, these data fields, such as phone numbers, often can be "recognized" and extracted to enable actions specific to a particular record, such as calling a selected restaurant (even if the phone number data associated with that restaurant was also maintained as unstructured text with respect to the user's query). Other actions may become relevant as a result of the context of a user's query or other state information (such as the time of day, or the user's location, as detected by GPS equipment on the user's mobile phone).

Whether these additional actions are specific to one or more particular records or to all records within one or more particular channels, or are available generally among all channels (or combinations of the above), they can provide users with alternatives to simply selecting and activating a particular record. In one embodiment, dynamic menus are employed to enable a wide variety of alternative actions that are not only appropriate to particular channels or records, but are also well-suited to the limitations of a mobile communications environment, in that they can be invoked with relatively minimal user interaction and use of limited resources.

For example, having located a restaurant via a multi-prefix search within a "favorite" local restaurant channel, a user could place a call to that restaurant via a single menu selection or push of a phone's talk button. Another menu selection might display a map of that restaurant, or directions from the user's current location (utilizing GPS data). A related search for an after-dinner movie (within a movie channel) might include a different set of menu selections, such as "movie reviews" or "starring actors." The result is a consistent targeted search mechanism across different information domains (channels) that provides users with alternative sets of actions appropriate to the information found as a result of one or more user queries. Users can locate this information and invoke these ancillary actions with relatively few keystrokes, menu selections and button presses, which in turn reduces the use of local processing and memory resources, as well as network latency and bandwidth.

A. Dynamic Menu Architectural Overview

In one embodiment, the client portion of this (client-server) dynamic menu mechanism is implemented as a standalone application on a resource-constrained mobile communications device, such as client 118, illustrated in FIG. 1A (components of which are further detailed as device 200 in FIG. 2). The architecture of this dynamic menu mechanism is based on an extensible thin-client model which, as will be explained in greater detail below, permits the bulk of the resource-intensive functionality to be implemented and performed on search server 128 (also illustrated in FIG. 1A), rather than on resource-constrained client 118.

Such reliance on server 128 is also advantageous because mobile communications devices vary widely in their ability to support more complex functionality, such as the use of Javascript and Ajax to create interactive web-based applications. Moreover, additional functionality can be implemented on server 128 without modifying any of the client applications 124 on client 118, thereby providing users over time not only with the promise of new channels, for example, but also with added functionality associated with one or more existing channels.

To facilitate this level of extensibility, the client (implemented, for example, as one of the client applications 124 on client 118, and sometimes referred to herein interchangeably with client 118) provides relatively general-purpose functionality. In other embodiments, such functionality could be integrated into browser 120, or into another application such as a search engine, or into a special-purpose application dedicated to one or more information channels. Server 128, however, remains in control, relying upon client 118 to interpret the specific instances of the "dynamic menu structure" provided to client 118 by server 128 in response, for example, to user queries.

In one embodiment, this general-purpose functionality implemented by a client application on client 118 includes (i) sending HTTP requests to search server 128 (such requests containing, for example, keystrokes of a user's multi-prefix query or a URI resulting from a user's selection of a channel, a record or a dynamic menu item), (ii) receiving HTTP responses from server 128 (containing, for example, HTTP headers along with search results and related data), (iii) parsing these HTTP responses (for example, to extract and render this data on the screen of client 118, as well as to extract dynamic menu information from the HTTP headers), and (iv) interacting with the user of client 118 to facilitate subsequent user queries and selections of search results or dynamic menu items, which can be utilized to generate and send additional HTTP requests (in some cases via browser 120), as well as to invoke "built-in" functionality on client 118, such as placing a phone call or sending an email in response to a user request.

Much of the basic search-related functionality implemented on both client 118 and server 128 has been explained above in great detail. The integrated dynamic menu mechanism described below, however, significantly extends such functionality by providing users with alternatives to simply selecting and activating a particular record.

For example, as explained above, search server 128 generates results at various tiers of a multi-tier user query, and sends those results to client 118. Such results include a collection of records 142 with associated fields 144 (illustrated in FIG. 1B), typically associated with a particular channel being queried by a user of client 118. A given record 142 typically includes one or more fields 144 that are displayed to the user on the screen of client 118, and which identify the record (such as the name of a channel or category of channels, or an item within a channel, perhaps including a name, address and phone number), as well as a field containing a URI (for example, a link) representing the action to be performed when the user selects and activates that record.

For example, when a user activates record 906 in FIG. 9B (representing the "Starbucks Store Locator" channel), client 118 accesses the URI associated with that record (which it previously received from server 128 in response to its single prefix "St" query for a desired channel) and uses it to generate an HTTP request to server 128. In response, server 128 sends to client 118 a landing page 931 associated with that channel for display on client 118, as illustrated in FIG. 9C. Similarly, after the user activates the "Los Altos Rancho" record 935 illustrated in FIG. 9F, client 118 accesses the URI associated with that record (which it had received from server 128 in response to its multi-prefix "Ran 1 a" query for a particular Starbucks store) and uses it to generate an HTTP request to server 128. In response, server 128 sends to client 118 a web page 941 (with additional detail corresponding to selected "Los Altos Rancho" record 935) for display on client 118, as illustrated in FIG. 9G. Note that web page 941 could, in one embodiment, be retrieved and displayed via browser 120 without the assistance of server 128 while, in other embodiments, it could be retrieved by server 128 and displayed on client 118 without the assistance of browser 120.

In one embodiment, Server 128 extends this functionality (to provide users with alternatives to simply selecting and activating a particular record) by generating additional fields associated with the records of a particular channel (or with multiple channels or channel categories). For example, with respect to the Starbucks Store Locator channel 906, server 128 might generate an additional field containing the phone number of each Starbucks store record. Server 128 would send such additional fields to client 118 (for example, in response to user queries) along with the other fields noted above that identify each record and provide a URI representing the action to be taken when the user selects and activates that record. As noted above, while the phone number displayed in record 935 could, in one embodiment, be unstructured text for the purposes of a user's multi-prefix query, server 128 could generate (and reformat, if necessary) a separate phone number field for each record containing the phone number (if available) of that particular Starbucks store.

Moreover, in one embodiment, server 128 generates one or more HTTP headers representing alternative actions a user could invoke, for example, with respect to a particular selected record. Such actions can utilize not only the additional fields generated by server 128, but also any other data or state information discernible by client 118 (such as elapsed time or user location via GPS services).

One such HTTP header might contain a dynamic menu item that enables a user to call the phone number of a selected record. For example, if a user selects "Los Altos Rancho" record 935 and activates the dynamic menu mechanism (rather than the action associated with the record itself), client 118 could display a dynamic menu containing a "Call Store" item and, if the user selects that item, client 118 could then dial the phone number of the Los Altos Rancho Starbucks store (contained in the additional phone number field previously sent to client 118 by server 128 in response to the user's multi-prefix "Ran 1 a" query).

As noted above, users can select a record without activating it in various ways, depending upon the capabilities of the user's particular mobile communications device. For example, some devices have buttons that are dedicated (or can be assigned) to prompt a client application to invoke a menu. Others, such as touchscreen devices, often do not distinguish between the selection and activation of an object, in which case an icon or other visible identifier could be displayed next to each record, or client 118 could distinguish the number of times a record was "tapped," or how long it had been "held down."

In one embodiment, an HTTP header includes not only the name of the dynamic menu item that is displayed to the user (for example, "Call Store"), but also the actions to be performed when the user activates that dynamic menu item (whether directly or indirectly, for example, by pressing a phone button while a particular record is selected). Such actions are designed to be extremely dynamic, taking into account not only the context of a user's queries but also the state of the user's mobile communications device, which can change frequently.

The HTTP header architecture allows dynamic menu items to be applicable globally to all channels, as well as to one or more particular channels, and even to particular records within or across channels. In one embodiment, a dynamic menu item can be specified to appear only if data pertaining to that item is available for a particular selected record. For example, a "Call Store" menu item might not appear if a phone number was not available for the particular store record selected by the user. These HTTP headers can leverage virtually any state information known to the user's mobile communications device (including information obtained via a remote server), such as a user's GPS location or whether a user is logged into a particular channel or web site.

In one embodiment, HTTP headers can reference data fields which not only can vary from one record to the next (such as phone numbers), but which can themselves contain record-specific dynamic menu item names and actions. In other words, distinct data fields can be defined (and populated on a per-record basis) such that the name of the dynamic menu item itself (and its associated action) will vary from record to record, even within a selected channel (due to the ability of the HTTP header to reference these distinct data fields).

This extensible "dynamic dynamic menu" feature enables the generation of record-specific, as well as channel-specific, menu items. For example, a movie channel might contain various types of field data, such as movie titles and actor names. Moreover, the "many-to-many" relationships among such data might well be maintained in a relational database that can be queried, for example, for a list of movie titles in which a given actor has appeared, or for a list of actors that have appeared in a given movie. A dynamic menu could, in one embodiment, display different menu items for search result "actor" records (for example, "Show Bio" or "Show Filmography") than for search result "movie" records (for example, "Show Actors" or "Show Reviews"), even if a user's multi-prefix query was applied to actors as well as movies (provided the type of search result could be ascertained by server 128).

The architecture of these HTTP headers, including their use of state information as well as additional fields added by server 128, is discussed in greater detail below.

B. Dynamic Menu HTTP Header Architecture

One embodiment of this dynamic menu HTTP header architecture is illustrated in Table 1 below, which includes six distinct fields of a dynamic menu HTTP header. The utility of this dynamic menu HTTP header architecture will become apparent from the following explanation of these fields with reference to the "SAMPLE Dynamic Menu HTTP Headers" listed in Table 2 below.

Each row of the SAMPLE Dynamic Menu HTTP Headers" shown in Table 2 represents a distinct dynamic menu HTTP header, delimited from other headers (in one embodiment) by "carriage return\newline" or "\r\n" characters. Each header in turn represents a dynamic menu item (such as "Add to favorites") that might appear when the dynamic menu is invoked and displayed on a user's mobile communications device.

As noted above, in one embodiment, users can also invoke such dynamic menu items via built-in functionality on a mobile device, such as pressing a "Talk" button that is mapped to invoke a "Click to call" dynamic menu item. In this embodiment, the mapping occurs by adding a symbolic name to the header after the Action field (for example, "Talk" in row 2 of Table 2 to invoke this dynamic menu item whenever the client application detects that the user presses the built-in "Talk" button on client 118).

In another embodiment, these symbolic names can also be used to modify the functionality of a dynamic menu item. For

TABLE 1

| HTTP HEADER FIELD | VALUES | COMMENTS |
|---|---|---|
| Header Name | B-Menu-Entry-nnn | Number "nnn" determines Order of Menu Item within Dynamic Menu |
| Context | C Current Channel<br>I Current Selected Item<br>B BOTH | Indicates whether Menu Item can apply to Current Channel, Selected Item or BOTH<br>Menu Item will NOT be visible/enabled if<br>Focus on Channel when "I" set or<br>Focus on Selected Item when "C" set |
| Processing Type | I Processed IN Client<br>O Processed OUT of Client<br>(eg, Launch Browser) | Upon Menu Item activation, Client issues HTTP or other Request (via URI constructed in accordance with "Action" field) either:<br>To Server (to retrieve data for display IN Client, and including built-in client application and mobile device functionality)<br>OR<br>To Browser or Other Client App (launched to retrieve data OUTSIDE of Client, eg, via URI passed from Client) |
| Next Step | F Follow Link<br>R Refresh Channel<br>S Refresh Channel and Clear Search Filter<br>N Do Nothing | After processing the Action (specified below), Client might "Do Nothing" (N) or perform an additional action, such as:<br>"Follow Link" (F) as if user had 21 activated Selected Item (row or record)<br>OR<br>"Refresh Channel" ® to provide updated/refreshed data (or "S" to also clear any existing search filter) |
| Menu Item Name | [TEXT of Menu Item name] | This is the text that will be displayed in the Dynamic Menu Menu Items displayed in the order specified in the "Header Name" field |
| Action | * * * [Used to construct URI] | See explanation below regarding the process for constructing a URI to be processed in accordance with the "Processing Type" field |

TABLE 2

SAMPLE
Dyamic Menu HTTP Headers

B-Menu-Entry-1: BIN; Add to favorites;
http://live.boopsie.com/service/set/?favorite=$1&base=$0&uri=$2\r\n
B-Menu-Entry-3; IIF; Click to call;
tel:$4/; Talk\r\n
B-Menu-Entry-2: IIS; Search from here;
http://live.boopsie.com/service/set/?name=$1&latlon=$3&
response=text\r\n
B-Menu-Entry-4: CIN; Change location;
i:change%20location\r\n
B-Menu-Entry-6: ION; Directions to here;
http://live.boopsie.com/service/directions/?latlon=$3\r\n
B-Menu-Entry-5: BIS; Clear location;
http://live.boopsie.com/service/set/?latlon=\r\n
B-Menu-Entry-7: ION; Movie details;
http://wap.aol.com/moviefone/Movie.do?theaterid=$6&movieid=
$7&showtime=$8&showsynopsis=true\r\n example, a "Map" symbolic name could direct the client application to pass a URI to a third-party mapping application (such as Google Maps), if one is installed on client 118, rather than to a web browser, such as browser 120. In yet another embodiment, a web browser might automatically detect certain location-related information in a URL obtained from the client application and elect to utilize a third-party application that it knows has been installed on client 118 (such as Google Maps), by reformatting the URL (intended for a web server) in accordance with a published API defined by such third-party application.

As noted above, in one embodiment, whenever server 128 (see FIG. 1A) sends data to client 118, it also sends a set of HTTP headers which can include dynamic menu HTTP headers representing dynamic menu items. Thus, a different set of dynamic menu items may be "active" depending upon which HTTP headers were most recently sent. In one embodiment, a set of "global" dynamic menu items is always active, along with any additional dynamic menu items sent by server 128 at any given time. In another embodiment, a set of "default"

dynamic menu items might become active once a channel has been chosen, unless the server overrides some or all of those default dynamic menu items. Many other combinations are apparent and will depend upon the requirements of any particular implementation.

The first field of each header, illustrated in Table 1, is the "Header Name" field. This field identifies the header as a "dynamic menu" HTTP header by virtue of the "B-Menu-Entry-nnn" designation, where "nnn" serves to determine the order in which the "Menu Item Name" (discussed below) will appear when the dynamic menu is displayed. Referring to the headers in Table 2, it can be seen that their display order is determined by the number following the "B-Menu-Entry-" designation, as opposed to the order in which they were transmitted to the client (reflected as the order of the rows in Table 2). For example, the header in row 2 of Table 2 would appear as the third menu item in the dynamic menu actually displayed to the user. Finally, note that this 'Header Name" field is delimited, in one embodiment, from the next field ("Context") by a colon (":") character.

The "Context" field in Table 1 is a single-character field that relates to the context or circumstances in which the header's dynamic menu item will be displayed. In other words, even when the dynamic menu is displayed on a user's device, not every dynamic menu item will necessarily be displayed. In one embodiment, the dynamic menu item might be displayed only when the "focus" is on the current channel (C), or only when the focus is on a particular selected record or item (I) displayed in response to a query within that channel. Otherwise, it might always be displayed (for example, in both (B) cases) whenever the dynamic menu is displayed (assuming, in one embodiment, that referenced data fields are non-empty).

In one embodiment, the "focus" will typically be on the "channel" (or channel category) when results are received from server 128 (for example, in response to a user query or menu selection). But, when a user selects (but does not activate) a particular item or record within a channel, the focus is then switched to that particular item or record.

The header in row 3 of Table 2, for example, containing a "Search from here" dynamic menu item, would, in this example, not be displayed unless the focus was on a particular selected record or item (I). In the case of a "Yellow Pages" channel, for example, it would not make sense (contextually) to display a "Search from here" dynamic menu item before the user enters a search query (in which case no records would be visible) or after the user enters a partial or complete query but before the user selects a record (in which case multiple items might be visible). But, once the user selects a particular record, it makes sense in this context to display the "Search from here" menu item, which, if activated, would replace the "reference location" for future searches with the location associated with that selected store. As noted above, however, in the event that the particular selected store did not have a listed address, then the client application could detect that the "address" field was empty and (using a different mechanism discussed below) prevent the display of the "Search from here" menu item for that particular selected record.

In the case of the "Add to favorites" header in row 1 of Table 2, the "B" designation indicates that this function could apply to the current channel as well as to the selected item. Continuing with the above Yellow Pages example, if the focus is still on the channel (for example, before the user enters a query and selects a record), then activation of the "Add to favorite" dynamic menu item would add the Yellow Pages channel to the user's list of "favorites." But, if the user selects a particular store, and then activates the "Add to favorite" dynamic menu item, then the selected store (not the Yellow Pages channel) would be added to the user's list of "favorites."

Yet, the "Change location" header in row 4 of Table 2 would only be displayed if the focus was on the channel, as opposed to a particular record (due to the "C" designation in the Context field). Continuing with the Yellow Pages example, consider the scenario in which a user first activates that channel, and has not yet entered a query. If the user had previously set a "search center" location, then the client application might initially display a list of stores nearest that location. But, if the user desires to search for stores in another geographical area, then the user most likely would not select one of those displayed store records. Instead, the user could activate the "Change location" dynamic menu item, which might display a list of zip codes and prompt the user to enter zip code digits until the user sees and activates a desired zip code. The user might then enter a query into the Yellow Pages channel, resulting in the display of a list of stores nearby the user's new "search center" location.

Note that, in the SAMPLE Dynamic Menu HTTP Headers in Table 2, the "Context" field (in one embodiment) has no delimiter, as it is a single-character field followed by another single-character field, the "Processing Type" field, which also has no delimiter, as it is followed by a third single-character field, the "Next Step" field, which has a semicolon (";") delimiter to separate it from the following "Menu Item Name" field.

Returning to Table 1, the "Processing Type" field indicates whether, upon activation of the dynamic menu item by the user, the associated action will be performed inside (I) this client application (including invocation of a built-in feature of the user's mobile device, such as placing a phone call) or outside (O) this client application (for example, by launching another client application, such as a web browser or mapping application). In either case, as will be discussed below with respect to the "Action" field shown in Table 1, activation of the dynamic menu item will result in generation of a URI, which will either be transmitted to server 128 (or handled internally, for example, via built-in functionality) or be passed to another client application, such as web browser 120.

Returning to Table 2, it is apparent that many of the actions associated with these headers are performed inside (I) the client application. For example, in addition to the "Add to favorites," "Change location" and "Search from here" headers, the "Clear location" header in row 6 of Table 2 will also direct the client application to transmit an HTTP request (containing the relevant URI) to server 128 (or, in other embodiments, to third-party servers hosting particular channel functionality). Instead of setting the user's "latlon" variable to a selected "zip code" value (containing the latitude and longitude coordinates corresponding, for example, to a desired zip code), the client application would request that server 128 clear that variable by setting it to a null value. Even the "Click to call" header in row 2 of Table 2 will utilize the client application to invoke built-in functionality of the user's mobile device (in this case, to place a call to a selected item, such as a store or movie theater).

Other headers in Table 2, however, include actions that are intended to be performed outside (O) the client application, for example by invoking another client application, such as a web browser. For example, the "Movie details" header in row 7 of Table 2 directs the client application to construct a URI utilizing various field data (discussed below) and then pass it to a client web browser to retrieve a web page from a third-party web server. Moreover, the "Directions to here" header in row 5 of Table 2 will appear only if the user selects a particular item, which typically will include one or more location fields. In one embodiment, the client application will pass the relevant location information (for the starting "search center" as well as the destination of the selected item) to another client application, such as a web browser, which will retrieve a web page containing relevant directions (and perhaps a map of the route). In another embodiment, a dedicated mapping application could be employed instead of a web browser.

The "Next Step" field in Table 1 is also a single-character field that indicates whether the client application, after it performs the action associated with this dynamic menu header, will perform another action. For example, a "Follow Link" (F) action would instruct the client application to perform the same action that it would have performed had the user activated the selected record. For example, after performing the action associated with the "Click to call" header in row 2 of Table 2 (such as calling the phone number associated with a selected store or other record), the client application will then follow the link associated with that selected item (for example, by passing its associated URL to web browser 120 to retrieve a merchant's web page). In another embodiment, in which client 118 cannot initiate voice and data communications simultaneously, the (F) designation could be ignored.

Other options include a "Refresh Channel" (R) action, in which the current channel is refreshed by virtue of the client application again sending the most recent HTTP request to server 128 (or, in other embodiments, to another third-party server hosting channel data). As a result, server 128 sends back updated results to the client application and the screen is refreshed. A related option is the "Refresh Channel and Clear Search Filter" (S) action, which clears any search filter (such as a multi-prefix search query) from the HTTP request before sending it to server 128.

For example, if a user searched a "Starbucks Store Locator" channel for a store near a particular city, and saw a nearby store in the results list, the user might select that store record and activate "Search from here" dynamic menu item, which would update the user's "search center" based upon the location of that selected store. In that case, however, the user likely would want to see updated search results reflecting the new location, but would not necessarily want those results filtered by any particular city. The "S" designation in the "Search from here" header in row 3 of Table 2 would direct the client to issue a "Refresh" request after removing the existing search filter. Note that, in one embodiment, all of these steps occur without requiring the user to leave the client application, access the web browser or supply a user ID externally.

The fourth and final "Next Step" action is to "Do Nothing" (N), in which case the client application performs only the action specified in the "Action" field shown in Table 1. For example, the "Add to favorites" header in row 1 of Table 2 would simply add the channel or selected record to the user's list of "favorites" (due to the "N" designation in the header's "Next Step" field). In another embodiment, a different "Next Step" action might cause the user's list of "favorites" to appear (for example, as it would when the client application is initially invoked). As noted above, the "Next Step" field, in one embodiment, is delimited by a semicolon (";").

The next to last field illustrated in Table 1 is the "Menu Item Name" field which, in one embodiment, is also delimited by a semicolon (";") to separate it from the final "Action" field. This "Menu Item Name" field contains the text of the name that will appear in the dynamic menu when it is displayed to the user on the screen of client 118. As noted above, the order of these menu items is determined by the "Header Name" field.

The sixth and final field of the embodiment of a dynamic menu HTTP header illustrated in Table 1 is the "Action" field. This field determines the action that the client application will perform if the dynamic menu item in this header is activated by the user. This field provides a flexible and dynamic mechanism that facilitates the construction of a URI that can be sent to server 128 (or used to invoke a built-in function of the user's mobile device) or passed to another client application, such as browser 120 (depending upon the value of the "Processing Type" field discussed above).

The dynamic features of this Action field, in one embodiment, include the ability to extract data fields associated with a current channel or selected record by referencing a "field number" or "column" with a dollar sign (for example, "$1" for field 1, and so forth). The text in the data field associated with the referenced column replaces the reference ("$1") and is inserted into the URI under construction. Moreover, the URI can include variable names to which a server will assign values, such as the value of a referenced data field (such as "varname=$1").

For example, the action associated with the "Add to favorites" header in row 1 of Table 2 is a template for a URI the first portion of which (for example, http://live.boopsie.com/service/set/) appears to be a typical HTTP request to server 128 (or, in another embodiment, to another server hosting channel data). Based upon its use of the service/set directory structure, server 128 (in one embodiment) implicitly knows to set variables to specified values based upon the remainder of the URI (following the "?" delimiter, indicating that parameters will follow).

In this case, the remaining portion of the URI consists of three variable assignments separated by "ampersand" ("&") delimiters, followed by (as noted above) "carriage return/newline" or "\r\n" characters, which serve to separate individual dynamic menu HTTP headers from one another. Thus, the "favorite" variable will be assigned the value contained within "field 1" (in one embodiment, the name of a channel, category or selected record). The "base" variable is used, in one embodiment, to provide a standard reference directory location (stored in "field 0") to which additional directories can be appended, such as the "uri" (assigned to the value of "field 2"), which might contain the channel-specific location, for example, of the selected favorite channel.

Looking at row 2 of Table 2, this "Click to call" dynamic menu item will perform a special "tel" action that is built into the user's mobile device and accessible from the client application. In one embodiment, the client application would extract the data from "field 4" (for example, the phone number of the selected record) and pass it to the built-in function of the user's mobile device to initiate a phone call. Depending upon the capabilities of this built-in functionality, the phone number might be dialed automatically, or a dialog box might pop up displaying the phone number and asking the user whether to initiate the phone call. As noted above, this functionality can even be invoked without requiring the user to activate the dynamic menu item. For example, if the client application detects that the user pressed the "Talk" button on client 118, it would know to invoke this "Click to call" dynamic menu item due to the presence of the symbolic name "Talk" after the Action field in this header, as shown in row 2 of Table 2.

The "Action" field of the "Search from here" dynamic menu item in row 3 of Table 2 is similar to that of the "Add to favorites" item discussed above. The "name" variable is set to the value of "field 1," which represents the name of the selected record whose location is being used as the new "search center." The "latlon" variable is set to the value of "field 3," which contains the latitude and longitude data defining the location of the selected item. The "response" variable simply indicates, in one embodiment, that the server is to generate a textual response, as opposed to returning a web page.

The "Change location" action in row 4 of Table 2 is a special command, in one embodiment, to enable the current channel to be changed temporarily and then refreshed after the user specifies a new "search center" location. For example, upon activating the "Change location" dynamic menu item, the special URI sent to server 128 requests a temporary change of channel (the data for which is located via that URI) in response to which server 128 sends a list of zip codes (the data corresponding to a "Change location" channel) to be displayed on the client. The user can then search into, select and activate a desired zip code, whereupon the user will be returned to the prior channel, which will be refreshed to reflect the new location.

The "Directions to here" action in row 5 of Table 2 is processed, in one embodiment, outside the client (based on the "I" designation in the "Processing Type" field) and passed to web browser 120 on the user's mobile device. The URI will also include the user's current "search center" location (not shown). In one embodiment, this URI is sent via web browser 120 to a web server on server 128 which, based on the use of the "directions" directory, will set the "latlon" variable to the value of the data extracted into the URI from "field 3," and use both the "to" and "from" locations passed in the URI to return a web page containing, for example, a map along with textual directions. In one embodiment, server 128 relies upon a third-party web server to return this web page, after passing it the location data.

The "Action" field of the "Clear location" dynamic menu item in row 6 of Table 2 is also similar to that of the "Add to favorites" item discussed above. The "latlon" variable is set to the value of "field 3," which contains the latitude and longitude data defining the location of the selected item. After setting this variable, server 128 is directed (by the "S" designation in the "Next Step" field) to clear the search filter and refresh the currently selected channel (as described above).

The "Action" field of the "Movie details" dynamic menu item in row 7 of Table 2 is processed outside of the client application (as is the "Directions to here" dynamic menu item). In this case, the user, after querying the AOL Moviefone channel for a desired movie, selects that movie record and activates the "Movie details" dynamic menu item. The client application constructs a relatively complicated URI (explained below) and passes it to web browser 120. In one embodiment, this URI is sent via browser 120 to a third-party site (AOL's Moviefone web site) with a standard HTTP command and a set of parameters (assigning data extracted from channel data columns to specified variables). The "Movie.do" command instructs the Moviefone web server to return a "movie details" web page to browser 120 based upon the specified parameter values.

The "theaterid" variable is set to the data extracted into the URI from "field 6" (containing a unique ID of the theater at which the selected movie is playing). The "movieid" variable is set to the data extracted into the URI from "field 7" (containing a unique ID of the selected movie). The "showtime" variable is set to the data extracted into the URI from "field 8" (defining showtimes for the selected movie). Finally, the "showsynopsis" variable is set to a constant value of "true," indicating that the selected movie's synopsis should be included with the other movie details.

As noted above, in one embodiment, dynamic menu items are not displayed if data fields referenced in a header's "Action" field (for example, using the "$" replacement mechanism discussed above) are empty. This behavior can be modified, in another embodiment, by including a "question mark" ("?") character after the "$" character (for example, "$?1"), in which case the dynamic menu item would be displayed even if the referenced data field is empty. Similarly, use of an "exclamation point" ("!") character (for example, "$!1") would invert this behavior, and cause the dynamic menu item to be displayed only if the referenced data column is empty. In yet another embodiment, a "percent" ("%") character (following a "$" or "$?" or "$!" character combination) will direct the client application not to URL-encode the referenced field data.

In still another embodiment, a "$p" character combination is used to reference the mobile device's GPS latitude/longitude coordinates (if GPS functionality is present on the device). An HTTP header sent by server 128, such as "B-GPS: 45.394280, -132.224830," could inform the client of the current "search center" location (for example, previously set by the user via a "Search from here" dynamic menu item). In another embodiment, client 118 sends a standard "geo.position: lat; lon" header to server 128 with every request, which server 128 can use, for example, to sort search results. In other embodiments, additional HTTP headers can be employed to cause channel "refreshes" under program control. For example, a "B-Action: refresh=10 sec" header would direct the client to request a refresh of the current channel every 10 seconds. Such a feature could be useful, for example, to obtain updated sporting event scores (perhaps even based upon the time remaining in an event). Similarly, a "B-Action: refresh=0.25 mi" header would direct the client to request a refresh of the current channel whenever the user's mobile phone device had traveled one-quarter of a mile (as indicated by the GPS data). This feature could be useful to update a map, for example, showing the nearest Starbucks locations while the user is traveling, or the nearest "homes for sale" while a realtor is driving across town. Server 128 could also notify client 118 when the user is within a certain distance of a selected destination.

Many other dynamic menu and related features will become apparent in the context of the following discussion of operational aspects of dynamic menus with reference to FIGS. 11A-C and FIGS. 12A-G below.

C. Dynamic Menu Operation

Figure 11A:
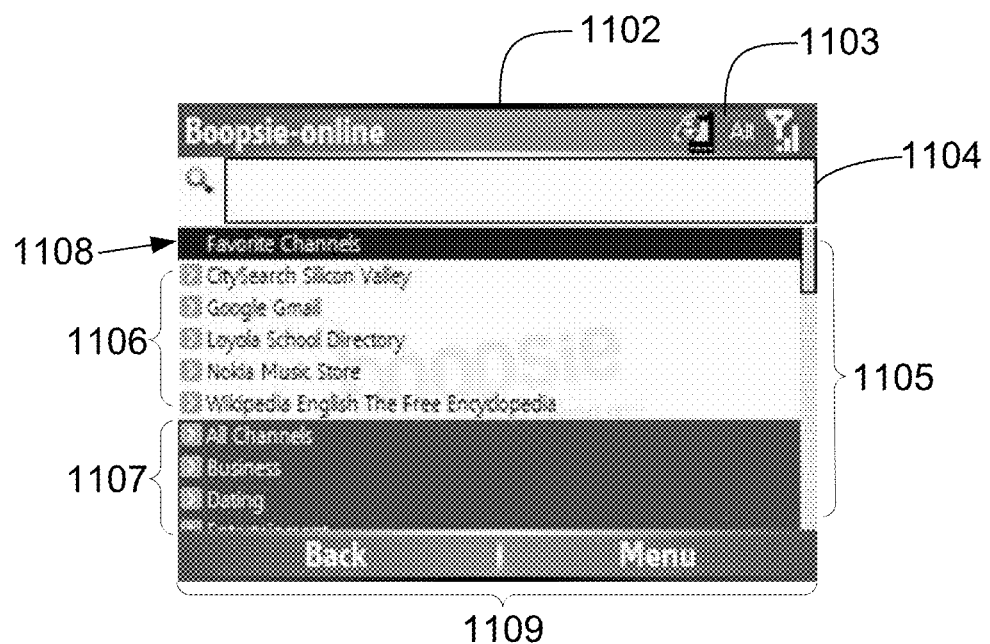
FIGS. 11A-11C illustrate graphical representations of screenshots of a display of a mobile communications device in accordance with an embodiment of the dynamic menu aspect of the present invention.

Referring to FIG. 11A, a client application in one embodiment of the present invention displays a window 1102 when initially invoked by a user of a mobile communications device (such as client 118 in FIG. 1A or device 200 in FIG. 2) on which the client application is loaded. It should be noted that another similar embodiment of window 1102 is also illustrated as window 902 in FIG. 9A.

In one embodiment, Window 1102 contains various component display areas, including a small area 1103 for display of real-time and related status information, such as the level of network connectivity to a mobile communications or other network. It also includes a search query field 1104, to facilitate the entry of user queries, including the multi-prefix queries discussed above, as well as a results display area 1105 to display the results of such user queries.

When the client application is initially invoked, results display area 1105 contains a list of various categories of channels, including a user's previously designated "favorite" channels 1106 (as well as links and other previously designated records) and other available channel categories 1107. As noted above, results are provided to client 118 by server 128 (typically in response to user requests), and may be updated over time. In addition, window 1102 may display certain headings, such as the "Favorite Channels" heading 1108, which describes the collection of user-defined "favorites" displayed below heading 1108 (but which cannot, in one embodiment, be selected or activated to perform any additional function).

In one embodiment, window 1102 also includes a "fixed menu" display area 1109 containing certain commonly-used features, such as a "Back" menu item that will refresh window 1102 with the results of the previously entered user query (in one embodiment, by resending the prior user request to server 128 and displaying the updated results of such request). A "Menu" item is also included in display area 1109 to invoke a menu with a set of items that provide additional functionality, as will be explained below. In one embodiment, the "Back" and "Menu" items can be mapped to and invoked by keystrokes or buttons on the user's mobile device.

At this point, a user typically desires to locate a desired channel (for example, in a "first-tier" search) within which desired information can then be located (for example, via a "second-tier" or subsequent-tier query). To facilitate user queries, a user can enter characters into search query field 1104, or simply select and activate a channel or channel category. In either case, client 118 submits such user requests to server 128, which returns a collection of filtered results which client 118 displays in results display area 1105. Examples of such multi-tiered and multi-prefix user queries have been illustrated above in great detail.

In other situations, however, users desire additional functionality beyond that which is afforded by simply entering user queries and activating channel, channel category and intra-channel records. As discussed above, the dynamic menu architecture of the present invention provides such alternative functionality in the context of the user's query and other related state information.

In one embodiment, when the user initially invokes the client application, client 118 sends an HTTP "GET" Request as illustrated in Table 3 below. This request includes the "imenu" function and a reference to the "Home" directory, which is interpreted by server 128 as a request for the initial "top-level" set of channels, categories and favorites that is illustrated in FIG. 11A. The remaining information contains data regarding the capabilities of the mobile device, such as its operating system and version, and display resolution, as well as the version of the client application.

In response, server 128 also sends a "GET" request, which directs client 118 to display the "list" of data that follows the HTTP headers. Server 128 also informs client 118 that the "Incremental Search" capability is turned "on" (to provide interactive results as the user types characters into search query field 1104 in FIG. 11A). Finally, it indicates the length of the data that follows.

The HTTP headers include 3 dynamic menu headers ("Remove from favorites," "Add to favorites," and "Refresh"), as well as a "B-Action: skip-empty-links" header that directs the client, while navigating, to skip over rows of data that do not have associated links (for example, to avoid selecting items such as the "Favorite Channels" heading 1108 in FIG. 11A, since it has no associated action). As explained above, the "Refresh" dynamic menu item will request that server 128 refresh the current channel and remove the user's current search filter, if any. It will be visible regardless of whether the focus is on any selected channel or category.

The "Add to favorites" and "Remove from favorites" dynamic menu items will apply only when an item is selected (due to the "I" designation in the "Context" field), and will refresh this top-level collection of channels and categories to update the list of the user's "favorites" (for example, after adding or removing a selected item). The Action fields of these two headers is similar to that explained in the examples above in Table 2, in that it sets the "base," "favorite," and "uri" variables to the values of the data in fields 0, 1, and 2, respectively. In addition, the "Remove from favorites" Action field includes a "remove" parameter to enable server 128 to distinguish this request from an "Add to favorites" request.

Note, however, that a third field ("field 3") is referenced, which is used by client 118 to determine whether to display the "Add to favorites" or "Remove from favorites" dynamic menu item based on whether the user selected an item on the user's list of favorites. For example, as will be discussed below, each record includes (in one embodiment) a "1" in "field 3" if it is on the user's list of favorites. Otherwise, "field 3" is left empty. By using the "$3" designation, the "Remove from favorites" dynamic menu item will be displayed only if "field 3" is non-empty, and thus only if the user has selected an item on the user's list of "favorites." Conversely, the "Add to favorites" dynamic menu item contains a "$!3" designation, which directs client 118 to display this menu item only if "field 3" is empty, and thus only if the user has selected an item that is not on the user's list of "favorites."

Following these HTTP headers in Table 3 is the body of the transmitted message containing the list of data to be displayed by client 118 in results display area 1105 of window 1102 shown in FIG. 11A. The hex-formatted digits at the beginning of certain rows of data specify standard color and aesthetic display information. The "name" to be displayed for each channel or category (or header) is deemed "field 1" with a space delimiter separating it from the "uri" in "field 2." This "uri," in one embodiment, is a relative path to assist server 128 in locating the data (HTTP headers and channel data) should a particular record be selected and activated. Following the "uri," the data for "field 3" is displayed, which (in one embodiment) includes a "1" if the record is on the user's list of "favorites," and is otherwise left empty.

Figure 11B:
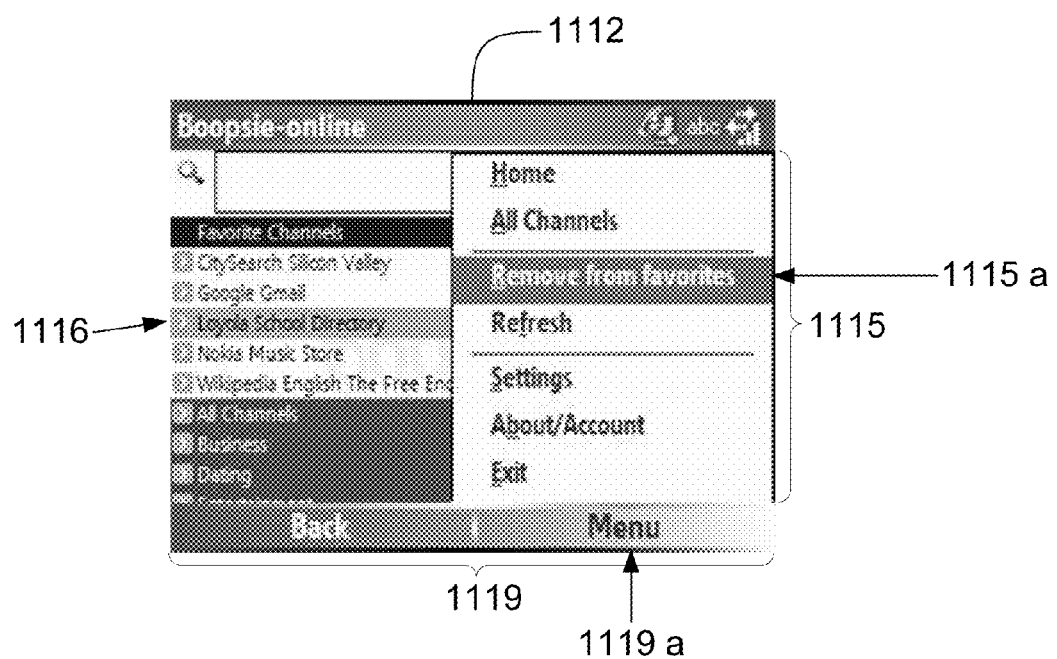

To illustrate how these HTTP headers and associated data records shown in Table 3 are utilized, consider a common scenario illustrated in FIG. 11B. A user might desire to remove a previously defined favorite channel (or other record). In one embodiment, the user selects a favorite channel which the user desires to remove, such as "Loyola School Directory" channel 1116 in window 1112, and invokes menu item 1119*a* in menu display area 1119, which results in the display of dynamic menu 1115. At this point, client 118 detects that selected record 1116 is on the user's list of favorites (based on the presence of a "1" in "field 3"), and thus displays the "Remove from favorites" dynamic menu item 1115*a* (but not the "Add to favorites" dynamic menu item, due to the "$!3" designation in its header). It should also be noted that, in one embodiment, additional menu items are displayed (for example, "Home" and "All Channels" and others) on dynamic menu 1115. These "global" menu items can be "hardwired" into client 118 (for example, not relying on this dynamic menu HTTP header architecture), or can be considered as "default" menu items to be displayed unless server 128 indicates otherwise (as discussed above).

Having selected channel 1116, the user can select and activate "Remove from favorites" dynamic menu item 1115*a*, which will cause client 118 (in accordance with the Action field associated with the "Remove from favorites" header illustrated in Table 3) to construct a URI (extracting information from designated data fields) and send an HTTP request to server 128, which will set the relevant variables (as explained above). It will then issue a "Refresh" request (due to the "R" designation in the "Next Step" field) to server 128 to refresh this "top-level" channel and category list, reflecting the removed record.

Figure 11C:
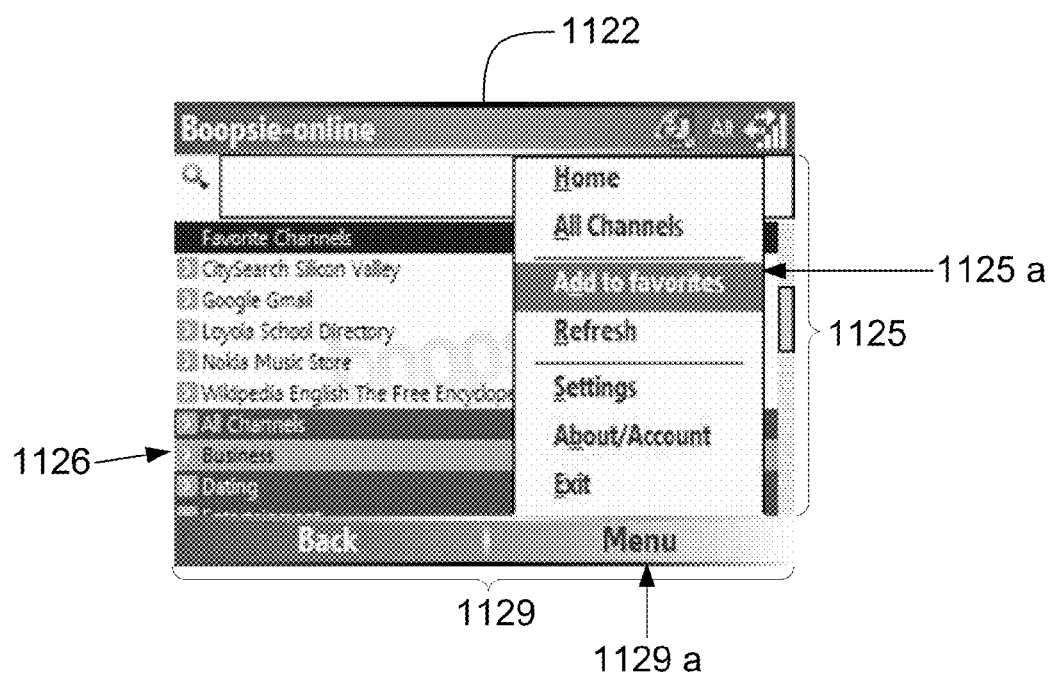

If, however, the user selects a record that is not on the user's list of "favorites," then the "Remove from favorites" item is not contextually relevant and is not displayed (in one embodiment) when the user invokes a dynamic menu. Turning to FIG. 11C, for example, if the user selects a record such as "Business" channel category 1126, and then invokes menu item 1129*a* in menu display area 1129, client 118 displays dynamic menu 1125, which does not contain a "Remove from favorites" dynamic menu item, but does contain an "Add to favorites" menu item 1125*a*.

As discussed above, client 118 detects that selected "Business" channel category record 1126 is not on the user's list of favorites (based on an empty "field 3"), and thus displays the "Add to favorites" dynamic menu item 1125*a* (but not the "Remove from favorites" dynamic menu item, due to the "$3" designation in its header). Having selected channel 1126, the user can select and activate "Add to favorites" dynamic menu item 1125*a*, which will cause client 118 (in accordance with the Action field associated with the "Add to favorites" header illustrated in Table 3) to construct a URI (extracting information from designated data fields) and send an HTTP request to server 128, which will set the relevant variables (as explained above). It will then issue a "Refresh" request (due to the "R" designation in the "Next Step" field) to server 128 to refresh this "top-level" channel and category list, reflecting the added record.

One embodiment of the dynamic menu mechanism illustrated in FIGS. 11A-11C provides users with contextually relevant alternative functionality not only by distinguishing whether a selected record is on the user's list of favorites (and displaying the contextually appropriate dynamic menu item), but also by receiving dynamic menu HTTP headers along with the results of the user's request. In other words, as the user queries different channels for different types of data, the dynamic menu items also can change to reflect such differences, even at the level of a particular record.

TABLE 3

REQUEST

GET /imenu?u=http://live.boopsie.com/i/Home/ HTTP/1.1
UA-OS: WinCE (Smartphone) - Version (5.1); Carrier (none);
Boopsie - Version (2.0.2.2)
UA-pixels: 320 × 240 (9 lines)
RESPONSE (not logged in)

GET /list HTTP/1.1
Incremental-Search: on
Content-Length: 1017
B-Menu-Entry-1: IIR; Remove from favorites;
http://live.boopsie.com/service/set/?remove&favorite=$1&base=$0&uri=$2&if=$3
B-Menu-Entry-2: IIR; Add to favorites;
http://live.boopsie.com/service/set/?favorite=$1&base=$0&uri=$2&if=$!3
B-Menu-Entry-4: BIS; Refresh
B-Action: skip-empty-links
fff#008 Favorite Channels
CitySearch Silicon Valley i: . . . /CitySearch%20Silicon%20Valley/ 1
Google Gmail http://gmail.com/ 1
Loyola School Directory i: . . . /Loyola%20School%20Directory/ 1
Nokia Music Store i: . . . /Nokia%20Music%20Store/ 1
Wikipedia English The Free Encyclopedia
i: . . . /Wikipedia%20English%20The%20Free%20Encyclopedia/ 1
fff#35a All Channels i: . . . /All%20Channels/

TABLE 3-continued fff#35a Business i: . . . /Business/
fff#35a Dating i: . . . /Dating/
fff#35a Entertainment i: . . . /Entertainment/
fff#35a Food and Wine i: . . . /Food%20and%20Wine/
fff#35a Google i: . . . /Google/
fff#35a Health i: . . . /Health/
fff#35a How To i: . . . /How%20To/
fff#35a Local i: . . . /Local/
fff#35a News i: . . . /News/
fff#35a Reference i: . . . /Reference/
fff#35a Religion i: . . . /Religion/
fff#35a Shopping i: . . . /Shopping/
fff#35a Social Networking i: . . . /Social%20Networking/
fff#35a Sports and Recreation i: . . . /Sports%20and%20Recreation/
fff#35a Store Locator i: . . . /Store%20Locator/
fff#35a Technical i: . . . /Technical/
fff#35a Tools i: . . . /Tools/
fff#35a Travel i: . . . /Travel/

Figure 12A:
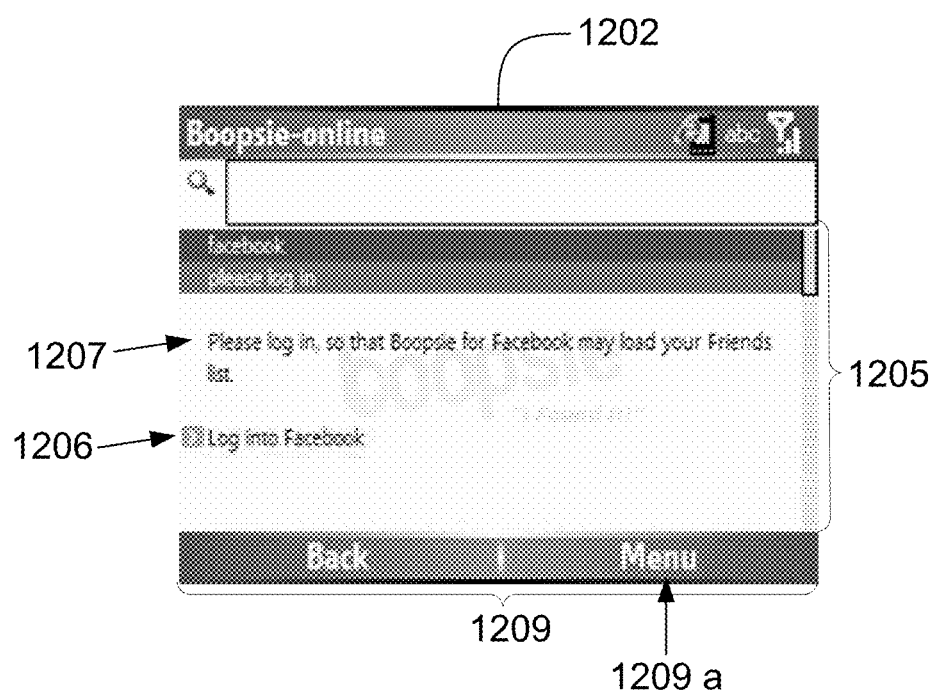
FIGS. 12A-12G illustrate graphical representations of screenshots of a display of a mobile communications device in accordance with another embodiment of the dynamic menu aspect of the present invention.
Figure 12B:
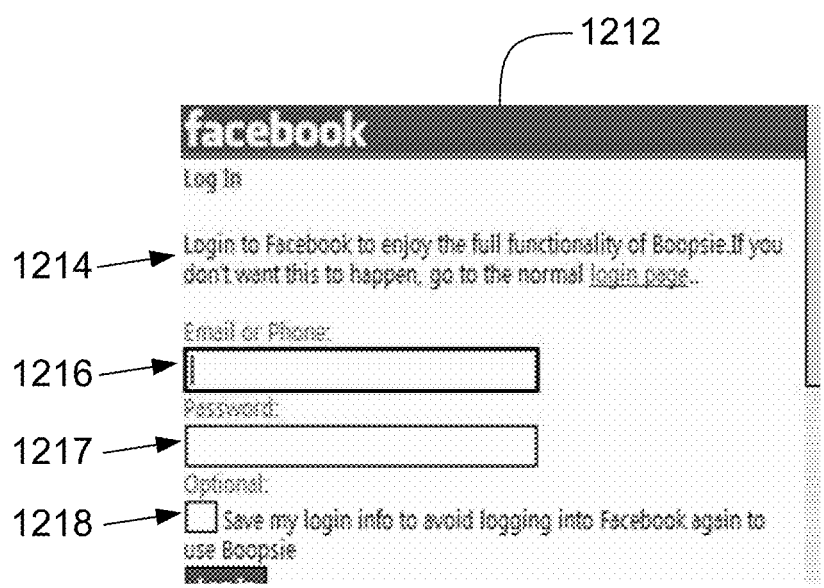

Referring now to FIG. 12A, consider the operation of one embodiment of the dynamic menu mechanism of the present invention in the context of a user activating the "Facebook Friends" channel. Upon locating and activating this channel (in the manner discussed above), client 118 sends a "GET" request to server 128, illustrated in Table 4. This request is very similar to the one shown in Table 3, the primary difference being the URI path to the "Facebook Friends" directory on server 128, instead of to the "Home" directory (containing the list of channels, categories and favorites).

Yet, server 128 detects that the user has not yet logged into the Facebook web site (at least via the client application), and thus cannot yet leverage the client application (including, for example, the interactive multi-prefix, multi-tier and dynamic menu features of the present invention) to obtain user-specific profile information, including information regarding the user's Facebook friends. Although the user could be logged into the Facebook web site via web browser 120, this would not afford the user the benefits of the integrated experience provided by the Facebook Friends channel (described in greater detail below).

In one embodiment, before server 128 delivers to client 118 the "Log into Facebook" page shown in FIG. 12A, server 128 accesses the Facebook web server (via a published API), obtains an "API key" (in effect logging server 128 into Facebook) and provides information to Facebook, including a "user callback URL" that the Facebook web server will supply to browser 120 in response to a successful authentication request (which contains the API key). When browser 120 subsequently accesses this "user callback URL," it will access the web browser on server 128, effectively notifying server 128 of the user's successful authentication, and providing it with the user's "session ID" generated by the Facebook web server.

By leveraging this relatively common API mechanism (and other techniques discussed in greater detail below), server 128 can provide users with a significant degree of interoperability between the client-server application of the present invention and standard web browsers such as web browser 120. For example, because the Facebook web server is aware of server 128 (via the API key), it can deliver to browser 120 the "Log into Facebook" web page shown in FIG. 12A, which includes information specific to the client-server application of the present invention (for example, the message 1207 requesting the user to log into Facebook to enable the "Boopsie" application to deliver the user's list of friends).

Returning to Table 4, the "GET" request in the "Response" from server 128 is also very similar to the one discussed above and shown in Table 3. The associated data is relatively simple, including only textual directions to the user and a single selectable record with an associated "login" action. The single dynamic menu "Refresh" HTTP header is very similar to the Refresh header shown in Table 3, except that it does not clear the user's search filter (due to the "R" designation in the header's "Next Step" field).

One major difference, however, is the presence of security information, since the user must log into (albeit somewhat indirectly) the actual "Facebook" web site. In one embodiment, server 128 generates a "MOFIID," which is a form of user or session ID that is specific to the "pairing" of the user and a particular channel, such as the Facebook Friends channel. To enhance security, each user is assigned different authentication credentials with respect to each channel the user accesses (assuming such channels or web sites require user authentication). This strengthens security (as will become apparent below) by preventing multiple web sites from having access to a user's "common" authentication credentials, while still affording server 128 the ability to communicate with the Facebook web server on behalf of the user to obtain user-specific information and provide enhanced functionality to users of both the Facebook web site and the Facebook Friends channel.

The "B-MOFIID: 2w16n9pX5z4cV" header shown in Table 4 provides the user's MOFIID to the client application. In addition, the URI (shown in Table 4) associated with the user's activation of the "Log into Facebook" record (illustrated in FIG. 12A) contains both the API key (connecting server 128 with Facebook) and the MOFIID (used by server 128 to distinguish among users of the Facebook Friends channel). These mechanisms are used, in one embodiment, to enable users to log into Facebook via a standard web browser, such as browser 120, without foregoing the functionality provided by the Facebook Friends channel.

At this point, the user's only effective choice is to activate the "Log into Facebook" link or record 1206 to initiate the login process. In one embodiment, the client application then passes the URI shown in Table 4 to browser 120, which the client application launches to initiate the process of logging the user into the Facebook web site. In response, the Facebook web server delivers to browser 120 the web page 1212 shown in FIG. 12B. Note that this web page also includes information specific to the client-server application of the present invention, such as the message 1214 requesting that the user log into Facebook via web page 1212 to enjoy the full functionality of the "Boopsie" application. Message 1214 also provides the user with an optional link to log into Facebook directly (for example, if the user desires to circumvent the "Boopsie" client application and the benefits afforded by the Facebook Friends channel).

Figure 12C:
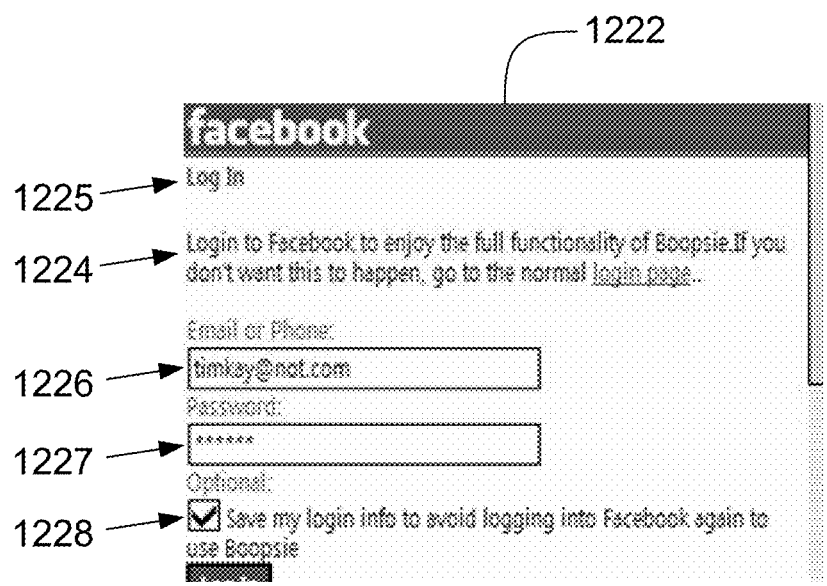

Web page 1212 includes fields in which the user can enter standard authentication information, including email address or phone number field 1216, password field 1217 and an optional save login info checkbox 1218. After filling in the relevant login info, as illustrated in FIG. 12C, and activating the "Log in" link 1225, the Facebook web server proceeds not only to log the user into Facebook and generate a session ID (for subsequent access to user-specific information on the Facebook web site), but also to use the "user callback URL" described above to redirect web browser 120 to a web page on server 128 corresponding to that URL (as well as provide the user's session ID). This process effectively serves to notify server 128 of the user's successful Facebook login, as well as provide server 128 with the user's newly-generated Facebook session ID. Server 128 utilizes the user's MOFIID (which is also forwarded by the Facebook web server, along with the session ID that it generated) to distinguish among its own users that access the Facebook Friends channel.

At this point, server 128 can utilize the user's MOFIID and session ID to issue requests to the Facebook web server for user-specific information, such as the user's list of friends. However, in one embodiment, rather than leave the user in the web browser interface, the web server on server 128 can respond to the request from browser 120 (for the web page at the "user callback URL" located on server 128) by downloading a ".MOFI" file, which will cause browser 120 to invoke the client application automatically—much in the same way that any downloaded file with an extension to a third-party application (such as ".xls" for Microsoft Excel or ".pdf" for Adobe Acrobat), can cause a web browser to launch that application automatically upon downloading that file.

This non-standard use of a relatively standard mechanism enables the user, after having logged into Facebook via browser 120, to automatically be returned to the client application providing the Facebook Friends channel.

TABLE 4

REQUEST

GET /imenu?u=http://live.boopsie.com/i/Facebook%20Friends/ HTTP/1.1
UA-OS: WinCE (Smartphone) - Version (5.1); Carrier (none);
Boopsie - Version (2.0.2.2)
UA-pixels: 320 × 240 (9 lines)
RESPONSE (not logged in)

GET /list HTTP/1.1
Incremental-Search: on
Content-Length: 257
B-MOFIID: 2wl6n9pX5z4Cv
B-Action: skip-empty-links
B-List-Mode: refreshs
B-Menu-Entry-1: BIR; Refresh
fff#3b5998 facebook
fff#6d84b4 please log in
Please log in, so that Boopsie for Facebook may load your Friends list.
Log into Facebook\thttp://m.facebook.com/login.php
?api_key=4a7075ed59a1884c5e741c13a83c25e0&v=1.0&next=
mofiid%3d2wl6nghj5z4cV When the client application "refreshes" its request for the "Facebook Friends" channel (automatically upon activation, for example, in one embodiment), it reissues the same GET request, now shown in Table 5. However, because server 128 now knows that the user is logged into Facebook, it issues a different response, illustrated in FIG. 12D.

The HTTP headers shown in Table 5 include the MOFIID data and progress information (indicating, for example, that records 1 to 20 of 97 records have been retrieved), as well as seven dynamic menu HTTP headers that provide functionality specific to the Facebook Friends channel, in addition to the data that follows, which includes a list of the user's friends and identifying information (including a unique "friend ID" that server 128 can use to obtain information specific to a particular "friend" record from the Facebook web server).

Figure 12D:
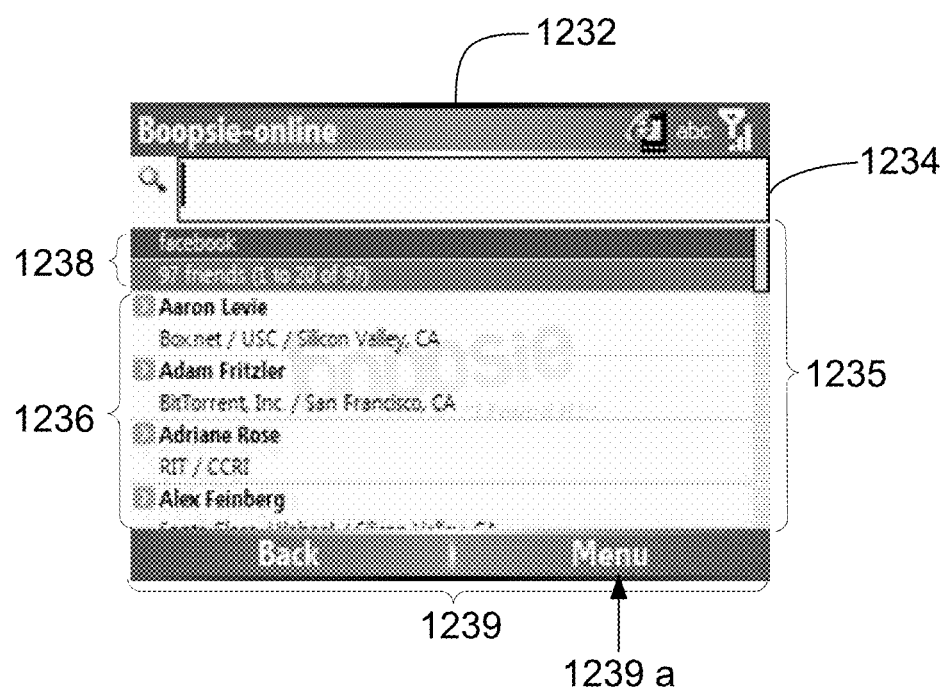

Turning to FIG. 12D, window 1232 includes user search query field 1234 and results display area 1235, which contains data headings 1238 indicating that Facebook friends 1-20 of 97 are displayed below. These "friend" records 1236 contain summary information about the user's friends. If any such record is activated, an associated action will be performed, such as invoking web browser 120 to request a "deep link" from the Facebook web site for a profile of the selected friend. In addition, menu display area 1239 includes menu item 1239*a*, which enables the user to display a dynamic menu.

The dynamic menu HTTP headers shown in Table 5 provide a variety of Facebook-specific functionality. With the exception of the "Refresh" and "Log out" headers, which are performed by the client application, the remaining headers contains URIs that, when constructed, will be passed to browser 120. Yet, using the mechanisms discussed above with respect to the Facebook login process, the client application can be invoked from browser 120, enabling additional functionality to be performed from within the client application, apart from simply issuing a "deep link" and leaving the user in the web browser.

The "My Profile" header references a location on server 128 in which the user's Facebook profile information is stored. The other dynamic menu headers extract the ID of a selected friend (using, for example, the "$2" replacement mechanism discussed above) to enable server 128 to obtain information relating to that friend from the Facebook web server on behalf of the user (using the "session ID" and "MOFIID" as discussed above).

Figure 12E:
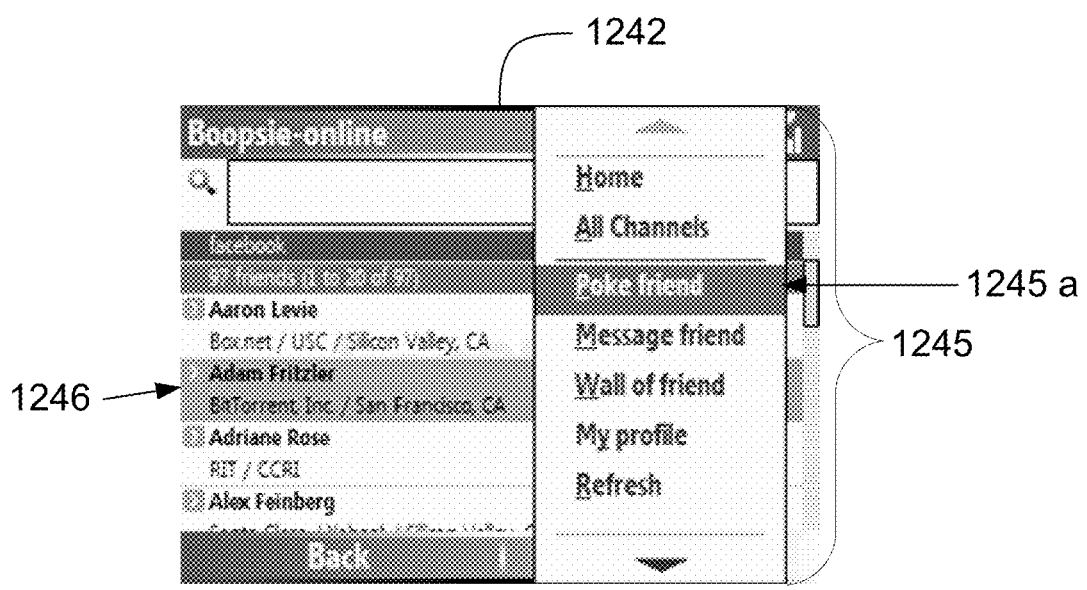

If the user selects a particular friend, such as friend record 1246 shown in FIG. 12E and invokes dynamic menu 1245 (for example, via menu item 1239a in FIG. 12D), the user can elect to perform various alternative Facebook-specific functions related to that selected friend (apart from the retrieval of that selected friend's profile, for example, by activating the selected friend's record). For example, the user could activate dynamic menu item 1245a to "poke" selected friend 1246 (via Facebook).

Upon activation of the "Poke friend" dynamic menu item 1245a, the client application constructs the URI (from the Action field shown in Table 5), and passes it to browser 120 (including the "poke" parameter containing the selected friend's user ID extracted from "field 3" of the data shown in Table 5). In one embodiment, after "poking" the selected friend, browser 120 may notify the user that the "poke" was successful and then (using the ".MOFI" technique discussed above) automatically invoke the client application, which will "refresh" the user's list of friends. In another embodiment, the user will remain in the browser 120, but can still return manually to the client application, which will be refreshed automatically.

TABLE 5

REQUEST (same as before)

GET /imenu?u=http://live.boopsie.com/i/Facebook%20Friends/ HTTP/1.1
UA-OS: WinCE (Smartphone) - Version (5.1); Carrier (none); Boopsie - Version (2.0.2.2)
UA-pixels: 320 x 240 (9 lines)
RESPONSE (logged in)

GET /list HTTP/1.1
Incremental-Search: on
Content-Length: 1140
B-MOFIID: 2wl6n9pX5z4cV
B-Action: skip-empty-links
B-Progress: 1 to 20 of 97
B-Menu-Entry-1: ION; Add to friends; http://live.boopsie.com/host/facebookfriends/?add=$4
B-Menu-Entry-2: ION; Poke friend; http://live.boopsie.com/host/facebookfriends/?poke=$3
B-Menu-Entry-3: ION; Message friend;
http://live.boopsie.com/host/facebookfriends/?message=$3
B-Menu-Entry-4: ION; Wall of friend; http://live.boopsie.com/host/facebookfriends/?wall=$2
B-Menu-Entry-5: BON; My profile; http://live.boopsie.com/host/facebookfriends/?profile
B-Menu-Entry-6: BIS; Refresh
B-Menu-Entry-7: BIR; Log out; http://live.boopsie.com/host/facebookfriends/?logout
fff#3b5998 facebook
fff#6d84b4 97 friends (1 to 20 of 97)
Aaron Levie | Box.net / USC / Silicon Valley, CA 3402659 3402659
Adam Fritzler | BitTorrent, Inc. / San Francisco, CA 545323645 545323645
Adriane Rose | RIT / CCRI 24416529 24416529
Alex Feinberg | Santa Clara / Yahoo! / Silicon Valley, CA 7305243 7305243
Allan Pichler | 651958736 651958736
Andy Wick | Virginia Tech / Washington, DC 691927740 691927740
Ardy F. | Silicon Valley, CA 512018645 512018645
Bahram Afshari | Silicon Valley, CA / Stanford 681147213 681147213
Barbara Meier | Brown / Providence, RI 1013164 1013164
Brad Cleveland | Silicon Valley, CA 587478487 587478487
Brad Kay.Goodman | Boston, MA 713076764 713076764
Brian Greenberg | East Bay, CA 593872292 593872292

The user might also desire to filter a large list of friends to locate a desired friend. For example, the user might enter a "d m" multi-prefix query into search query field 1254 in FIG. 12F, the results of which can be displayed by the client application in window 1252. The heading information 1258 is updated to reflect the filtered list of 4 friends, and only these 4 friend records 1256 are now displayed (in accordance with the results received by client 118 and shown in Table 6).

Figure 12F:
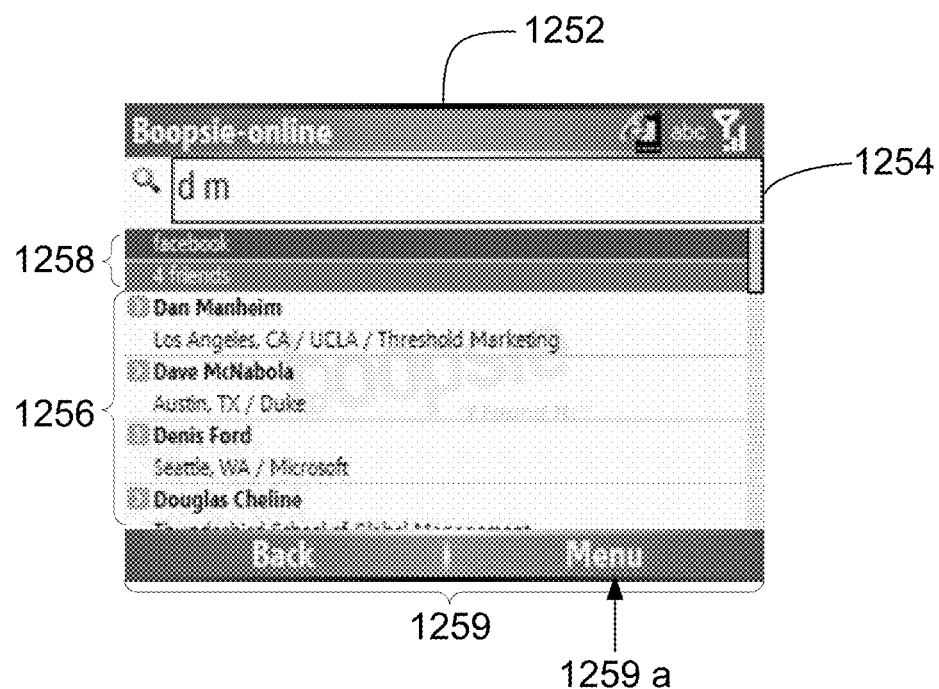
Figure 12G:
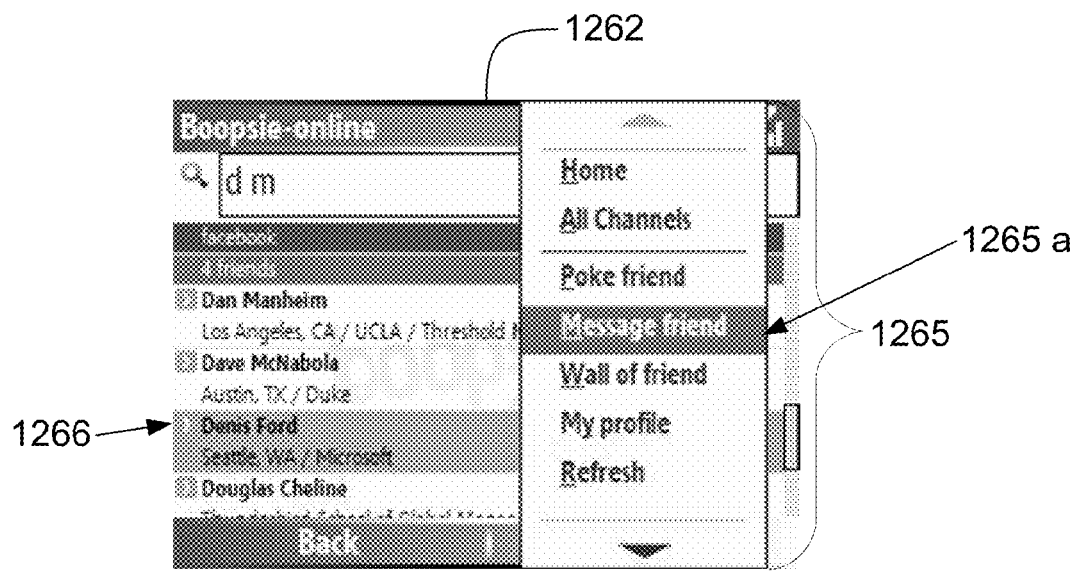

If the user selects friend record 1266 shown in window 1262 in FIG. 12G, and invokes dynamic menu 1265 (for example, via menu item 1259a in FIG. 12F), the user might then elect, for example, to activate dynamic menu item 1265a to "message" that selected friend 1266 (via Facebook).

Upon activation of the "Message friend" dynamic menu item 1265a, the client application constructs the URI (from the Action field shown in Table 6), and passes it to browser 120 (including the "message" parameter containing the selected friend's user ID extracted from "field 3" of the data shown in Table 6). In one embodiment, after "messaging" the selected friend, browser 120 may notify the user that the "message" was sent successfully and then (using the ".MOFI" technique discussed above) automatically invoke the client application, which will "refresh" the user's list of friends. In another embodiment, the user will remain in the browser 120, but can still return manually to the client application, which will be refreshed automatically.

Turning to Table 6, it can be seen that the "GET" request has changed only slightly to reflect the search query ("c=d+ m") and to employ a "wwu" (instead of an "imenu") command, which is a relatively minor implementation decision. The dynamic menu HTTP headers have not changed in response to the user's query (though, in other embodiments, they could be modified under control of server 128 to reflect a different state or context). Finally, the filtered set of results (4 "friend" records) are included for display by client 118, as shown in FIGS. 12F and 12G.

TABLE 6

REQUEST (with filter "d m")

GET /wwu?c=d+m&u=http://live.boopsie.com/i/Facebook%20Friends/ HTTP/1.1
UA-OS: WinCE (Smartphone) - Version (5.1); Carrier (none); Boopsie - Version (2.0.2.3)
UA-pixels: 320 × 240 (9 lines)
RESPONSE GET /list HTTP/1.1
Incremental-Search: on
Content-Length: 305
B-MOFIID: 2wl6n9pX5z4cV
B-Action: skip-empty-links
B-Progress: 1 to 4 of 4
B-Menu-Entry-1: ION; Add to friends; http://live.boopsie.com/host/facebookfriends/?add=$4
B-Menu-Entry-2: ION; Poke friend; http://live.boopsie.com/host/facebookfriends/?poke=$3
B-Menu-Entry-3: ION; Message friend;
http://live.boopsie.com/host/facebookfriends/?message=$3
B-Menu-Entry-4: ION; Wall of friend; http://live.boopsie.com/host/facebookfriends/?wall=$2
B-Menu-Entry-5: BON; My profile; http://live.boopsie.com/host/facebookfriends/?profile
B-Menu-Entry-6: BIS; Refresh
B-Menu-Entry-7: BIR; Log out; http://live.boopsie.com/host/facebookfriends/?logout
fff#3b5998 facebook
fff#6d84b4 4 friends
Dan Manheim | Los Angeles, CA / UCLA / Threshold Marketing 596495304 596495304
Dave McNabola | Austin, TX / Duke 1079384606 1079384606
Denis Ford | Seattle, WA / Microsoft 757528454 757528454
Douglas Cheline | Thunderbird School of Global Management 293500041 293500041

From the above descriptions of the various embodiments of the interactive, multi-prefix, multi-tier and dynamic menu aspects of the present invention, many additional features and applications of these techniques will become apparent. For example, as noted above, these techniques could be incorporated wholly within a web browser (such as Firefox Mobile) or an integrated or standalone search engine (such as Google). One or more channels could be searchable, or simply selected from a list of "smart bookmarks." Moreover, a vertical web site or sites (such as Amazon, Wikipedia or IMDB) could provide various combinations of these features as a standalone application containing one or more channels.

Multiple channels could be searched at one time, particularly if they are related, and dynamic menus could be employed to perform functions and retrieve information from channels/web sites in advance of relying upon a client web browser. Moreover, the interoperability between a client application and a client web browser, as discussed above, greatly enhances the user's experience by enabling the user to switch between these applications when the particular context makes one or the other more useful or desirable.

In a mobile communications environment, the advantages of interactive multi-prefix queries, particularly when targeted across one or more tiers of channels, are quite significant. Avoiding multiple web page refreshes and links, providing results quickly and interactively and enabling users to minimize data entry is of great importance in such a resource-constrained environment. Moreover, adding contextual functionality such as dynamic menus that can vary among channels and even individual records or program states (particularly when deployed using a thin-client server-controlled architecture), significantly enhances these advantages, by providing a high degree of context-specific functionality while minimizing iterations among resource-intensive steps such as following links or refreshing web pages.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing multi-prefix, interactive search capabilities on a mobile communications device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. An information retrieval system including a non-transitory computer-accessible storage medium for conducting, and caching results of, multi-prefix and multi-tier user queries of a database of content items across a plurality of channels, each channel representing a category of content items within the database, the system comprising:
   (a) a multi-prefix search module that retrieves from an index, for each prefix term, a list of records containing at least one word having a prefix matching that prefix term;
   (b) a multi-tier search module that limits a first user query to a first tier of content that contains names of channels in the database, and, upon receiving an indication of the user's selection of the name of a first channel, limits a second user query to a second tier of content that contains items within the category represented by the name of the first channel; and
   (c) a result delivery module that:
       (i) generates a result list by intersecting the lists of records retrieved from the index,
       (ii) organizes the result list based on at least one positional ranking factor,
       (iii) computes the value of a query function to determine whether to cache the result list, wherein the value of the query function is dependent upon a plurality of factors, including the total number of characters in the user query and the processing time required to retrieve and intersect the lists of records from the index to generate the result list, and
       (iiv) conditionally caches the result list in storage, based upon a comparison of the value of the query function to a predefined threshold,
   (d) whereby the processing time for a subsequent user query is decreased by retrieving the cached result list from storage.

2. The information retrieval system of claim 1, wherein the step of organizing the result list based on at least one positional ranking factor utilizes position data of at least one word in each record in the result list.

3. The information retrieval system of claim 1, wherein the step of organizing the result list based on at least one positional ranking factor utilizes location data of each record in the result list.

4. The information retrieval system of claim 1, wherein the step of organizing the result list based on at least one positional ranking factor utilizes location data of the user.

5. The information retrieval system of claim 1, wherein the step of organizing the result list based on at least one positional ranking factor utilizes a number of adjacent pairs of query prefix terms within each record in the result list.

6. The information retrieval system of claim 1, wherein the step of organizing the result list based on at least one positional ranking factor utilizes at least one user-input location.

7. The information retrieval system of claim 1, wherein the step of organizing the result list based on at least one positional ranking factor utilizes popularity data from a source external to the database.

* * * * *